(12) United States Patent
Frohwein et al.

(10) Patent No.: US 11,574,330 B2
(45) Date of Patent: Feb. 7, 2023

(54) DISTRIBUTED SYSTEM TO ENABLE DYNAMIC, ON-DEMAND SALES FORCE WITH MERCHANT, SELLER AND BUYER NETWORKED

(71) Applicant: Drum Technologies, Inc., Atlanta, GA (US)

(72) Inventors: Robert James Frohwein, Atlanta, GA (US); Kathryn Tison Petralia, Atlanta, GA (US); Troy Adam Deus, Atlanta, GA (US); Kathryn Honderd O'Day, Decatur, GA (US)

( * ) Notice: Subject to any disclaimer, the term of this patent is extended or adjusted under 35 U.S.C. 154(b) by 6 days.

(21) Appl. No.: 16/395,997

(22) Filed: Apr. 26, 2019

(65) Prior Publication Data

US 2020/0342482 A1    Oct. 29, 2020

(51) Int. Cl.
G06Q 30/02    (2012.01)

(52) U.S. Cl.
CPC .................. *G06Q 30/0214* (2013.01)

(58) Field of Classification Search
CPC combination set(s) only.
See application file for complete search history.

(56) References Cited

U.S. PATENT DOCUMENTS

| | | | |
|---|---|---|---|
| 7,702,536 B1 * | 4/2010 | Alabraba | G06Q 30/0601 705/26.1 |
| 2009/0259547 A1 * | 10/2009 | Clopp | G06Q 30/02 705/14.16 |
| 2010/0287282 A1 * | 11/2010 | MacLaughlin | G06Q 50/01 709/226 |
| 2014/0108104 A1 | 4/2014 | Stancioff | |
| 2015/0324748 A1 * | 11/2015 | Ranade | G06Q 10/105 705/321 |
| 2018/0189816 A1 * | 7/2018 | DeVore | G06Q 30/0214 |
| 2018/0293603 A1 * | 10/2018 | Glazier | G06Q 50/01 |
| 2019/0087847 A1 * | 3/2019 | Peasley | G06Q 50/01 |

FOREIGN PATENT DOCUMENTS

EP    0672994 A1    9/1995

OTHER PUBLICATIONS

Covic Zlatko et al, "Usage of QR Codes in Promotion on Social Networks", 2016 International Conference on Smart Systems and Technologies (SST), IEEE, Oct. 12, 2016, EX033016442, ISBN: 978-1-5090-3718-6, pp. 123-127, figures 1,8.

* cited by examiner

*Primary Examiner* — Chrystina E Zelaskiewicz
(74) *Attorney, Agent, or Firm* — Smith Tempel Blaha LLC; Gregory Scott Smith

(57) ABSTRACT

A distributed system that includes a merchant application, a buyer application and a seller or drummer application. The applications reside and run on personal computing devices and operate together to allow a merchant to create an offer, drummers to select, present and share the offer with buyers, and buyers to receive and save the offers in anticipation of a conversion. Upon a conversion, revenue derived from the transaction is provided to the merchant but, some of revenue is shared with one or more drummers involved in pushing the offer.

10 Claims, 42 Drawing Sheets

| DRUM | | | | © COMPANY ▾ |
|---|---|---|---|---|
| DASHBOARD | OFFER LIST | | | |
| OFFERS | 🔍 SEARCH  ACTIVE 12 ▾ | | | CREATE OFFER |
| TRANSACTIONS | | | | |
| QR CODE | OFFER TITLE ▾ | START DATE | EXP DATE | BUDGET | STATUS |
| PROFILE | | | | | |
| PAYMENTS | 50% OFF DINNER AND DRINKS | 1/10/19 | 2/10/19 | N/A | |
| VIEW TEST DATA ⬤ | | | | | EDIT |
| | 50% OFF DINNER AND DRINKS | 1/10/19 | 2/10/19 | 100/1000 | COPY |
| | | | | | PAUSE |
| | 50% OFF DINNER AND DRINKS | 1/10/19 | 2/10/19 | $223/$100 | ARCHIVE |
| | | | | | DELETE |
| | 50% OFF DINNER AND DRINKS | 1/10/19 | 2/10/19 | N/A | ACTIVE ⋯ |
| | 50% OFF DINNER AND DRINKS | 1/10/19 | 2/10/19 | N/A | ACTIVE ⋯ |
| CREATE AN OFFER | | | | | |

DRUM | © COMPANY ▾

DASHBOARD
OFFERS
TRANSACTIONS
QR CODE
PROFILE
PAYMENTS

VIEW TEST DATA ⬤

CREATE AN OFFER  DETAILS ①  PHOTO ②  REDEMPTIONS ③  TARGET ④

SETUP YOUR TARGET AUDIANCE ⓘ

● LOCATION   ○ RADIUS

ENTER A LOCATION TO TARGET OR EXCLUE

FOR EXAMPLE, A COUNTRY, CITY, REGION, OR POSTAL CODE

TARGETED LOCATIONS (2)             TOTAL REACH: 22,227,000 ✕

11372, NEW YORK, UNITED STATES POSTAL CODE        527,000 ✕
MANHATTAN, NEW YORK, UNITED STATES BOROUGH     21,700,000 ✕

MAP

[PUBLISH]  [SAVE AS DRAFT]   BACK

FIG. 8F

DRUM

- DASHBOARD
- OFFERS
- TRANSACTIONS
- QR CODE
- PROFILE
- PAYMENTS

VIEW TEST DATA ⬤◯

© COMPANY ▾

CREATE AN OFFER   DETAILS ①   PHOTO ②   REDEMPTIONS ③   TARGET ④

SETUP YOUR TARGET AUDIANCE ⓘ

⦿ LOCATION   ◯ RADIUS

ENTER A LOCATION TO TARGET OR EXCLUE

ASTORIA

| MATCHES | REACH ⓘ | TARGET/EXCLUDE |
|---|---|---|
| ASTORIA, NEW YORK, UNITED STATES NEIGHBORHOOD | 684,000 | |
| ASTORIA, OREGON, UNITED STATES CITY | 68,000 | |
| ASTORIA, ILLINOIS, UNITED STATES CITY | 6,000 | |
| ASTORIA, SOUTH DAKOTA, UNITED STATES CITY | - | |

⚠ LIMITED REACH ⓘ

| LOCATIONS THAT INCLUDE: ASTORIA, NEW YORK, UNITED STATES | |
|---|---|
| QUEENS, NEW YORK, UNITED STATES BOROUGH | 5,420,000 |
| QUEENS COUNTY, NEW YORK, UNITED STATES COUNTRY | 5,420,000 |
| NEW YORK, NEW YORK, UNITED STATES CITY | 24,400,000 |
| NEW YORK NY, UNITED STATES NIELSEN® DMA® REGIONS | 35,500,000 |
| NEW YORK, UNITED STATES STATE | 30,500,000 |
| UNITED STATES COUNTRY | 243,000,000 |

RELATED LOCATIONS

MAP

FIG. 8G

| DRUM | | © COMPANY ▾ |
|---|---|---|
| DASHBOARD | CREATE AN OFFER   DETAILS — PHOTO — REDEMPTIONS — TARGET | |
| OFFERS | ①  ②  ③  ④ | |
| TRANSACTIONS | SETUP YOUR TARGET AUDIANCE ⓘ | |
| QR CODE | ○ LOCATION  ● RADIUS | |
| PROFILE | ENTER A PLACE NAME, ADDRESS OR COORDINATES  RADIUS DISTANCE | MAP |
| PAYMENTS | [                    ]   [ 20MI ] | |
| VIEW TEST DATA ⬤ | TOTAL REACH: 22,227,000 × | |
| | TARGETED LOCATIONS (2) | |
| | 11372, NEW YORK, UNITED STATES POSTAL CODE          527,000 × | |
| | MANHATTAN, NEW YORK, UNITED STATES BOROUGH       21,700,000 × | |
| | [PUBLISH]  [SAVE AS DRAFT]  BACK | |

DRUM

- DASHBOARD
- OFFERS
- TRANSACTIONS
- QR CODE
- PROFILE
- PAYMENTS

VIEW TEST DATA ⬤

© COMPANY ▾

CREATE AN OFFER

DETAILS ① — PHOTO ② — REDEMPTIONS ③ — TARGET ④

SETUP YOUR TARGET AUDIANCE ⓘ

○ LOCATION   ● RADIUS

ENTER A LOCATION TO TARGET OR EXCLUE

ASTORIA

LOCATIONS THAT MATCH: ASTORIA

ASTORIA, QUEENS, NY /////TARGET/////   22,227,000 ✕

ASTORIA, OR

ASTORIA BOULEVARD, LONG ISLAND CITY, NY   527,000 ✕

ASTORIA PARK, 19TH STREET, ASTORIA, NY   21,700,000 ✕

CHAIN STORES THAT MATCH: ASTORIA

WESTERN UNION WITHIN ASTORIA, NEW YORK, UNITED STATES

DUNKIN' DONUTS WITHIN ASTORIA, NEW YORK, UNITED STATES

SUBWAY WITHIN ASTORIA, NEW YORK, UNITED STATES

BASKIN ROBBINS WITHIN ASTORIA, NEW YORK, UNITED STATES

[PUBLISH]  [SAVE AS DRAFT]   BACK

MAP

| DRUM | © COMPANY ▾ |
|---|---|
| DASHBOARD | < 50% OFF DINNER AND DRINKS (3,433 REDEMPTIONS) //MANAGE// DUPLICATE |

DETAILS [ACTIVE]

★ ★ ★ ★ ☆ 1,333
DATE 01/15/19 - 02/10/19
TYPE ONE TIME DEAL
QR/R QR CODE AND REMOTE
URL PRINCEPIZZA.COM

COST $5 PER REDEMPTION  LIMIT $100/$350
LOYALTY 20

DESCRIPTION
THIS WILL BE A DESCRIPTION. LOREM IPSUM DOLOR SIT AMET, CONSECTETUR ADPISCING ELIT. MAURIS PRETIUM FAUCIBUS METUS AT FERMENTUM. SUSPENDISSE SED SAGITTIS

NOTE TO DRUMMER
LOREM IPSUM RISUS. SED NEC ODIO SOLLICITUDIN, ALIQUAM DIAM EU, SCELERISQUE QUAM.

FILES (DRUMMER VIEW ONLY)
HOW_TO_SELL.PDF
HOW_TO_SELL.JPG

STATS

SHARED BY DRUMMERS ▾  [1W] [1M] [1Y] [ALL]

350
300
250 — 245
200
150
100
50
0  SUN MON TUE WED THU FRI SAT

TOP DRUMMER  VIEW ALL >
○ @THERESAROBIN
SHARED: 134  REDEEMED: 134  SUCCESS: 100%

TARGETED LOCATIONS (2)  TOTAL REACH: 22,227,000
11372, NEW YORK, UNITED STATES POSTAL CODE  527,000
MANHATTAN, NEW YORK, UNITED STATES BOROUGH  21,700,000

OFFERS
TRANSACTIONS
QR CODE
PROFILE
PAYMENTS

VIEW TEST DATA ⬤

[CREATE AN OFFER]

| | | RANK ▽ | DRUMMER | NAME | SHARED | REDEEMED | SUCCESS RATE | |
|---|---|---|---|---|---|---|---|---|
| | | 1 | ○ @THERESAROBIN | THERESA ROBINSON | 102 | 50 | 50% | ⋮ |
| | | 2 | ○ @THERESAROBIN | THERESA ROBINSON | 102 | 50 | 50% | ⋮ |
| | | 3 | ○ @THERESAROBIN | THERESA ROBINSON | 102 | 50 | 50% | ⋮ |
| | | 4 | ○ @THERESAROBIN | THERESA ROBINSON | 102 | 50 | 50% | ⋮ |
| | | 5 | ○ @THERESAROBIN | THERESA ROBINSON | 102 | 50 | 50% | ⋮ |
| | | 6 | ○ @THERESAROBIN | THERESA ROBINSON | 102 | 50 | 50% | ⋮ |

DRUM
DASHBOARD
OFFERS
TRANSACTIONS
QR CODE
PROFILE
PAYMENTS

< BUYERS FOR "2 SLICES FOR $5"
Q SEARCH

VIEW TEST DATA

CREATE AN OFFER

© COMPANY ▽

FIG. 8L

| DRUM | | | | © COMPANY ▾ |
|---|---|---|---|---|
| DASHBOARD | PAYMENT HISTORY | | | |
| OFFERS | Q SEARCH  PAST MONTH ▾ | | | |
| TRANSACTIONS | | | | |
| QR CODE | AMOUNT | OFFER(S) | REDEMPTIONS | DATE ▾ |
| PROFILE | ˅ $320 | 2 SLICES FOR $5, BOGO DEAL, ... | 1,120 | 1/2/19 |
| PAYMENTS | | | | |
| | ˅ -$100 (REFUND) | BOGO DEAL | N/A | 1/2/19 |
| VIEW TEST DATA ⬤ | ˅ $320 | 2 SLICES FOR $5, BOGO DEAL, ... | 1,120 | 1/2/19 |
| | ˅ $320 | 2 SLICES FOR $5, BOGO DEAL, ... | 1,120 | 1/2/19 |
| | ˅ $320 | 2 SLICES FOR $5, BOGO DEAL, ... | 1,120 | 1/2/19 |
| CREATE AN OFFER | ˅ $320 | 2 SLICES FOR $5, BOGO DEAL, ... | 1,120 | 1/2/19 |

DISTRIBUTED SYSTEM TO ENABLE DYNAMIC, ON-DEMAND SALES FORCE WITH MERCHANT, SELLER AND BUYER NETWORKED

BACKGROUND

Personal computing devices ("PCDs"), such as cellular telephones and other "smart" devices, have become ubiquitous in today's society. And, due to the inherent portability of most PCDs, a buyer's personal PCD may be easily carried along just about anywhere. Similarly, a sales person's personal PCD may be easily carried along just about anywhere too. Consequently, when a consumer and a sales person cross paths, an opportunity exists for their respective PCDs to be used as mechanisms for presentment and collection of a temporally and/or geographically and/or contextually relevant promotion.

It's easy to see that because many people carry PCDs, an opportunity exists for any type of entity offering goods or services to benefit. These entities can include, but is certainly not limited to, retailers, sellers, merchandisers, leasers, renters, service providers and pretty much any type of entity that is moving, offering or presenting goods and/or services. In some instances, these entities may not be involved in selling or offering goods and/or services but rather, may be providing promotional information, incentives, general information (such as the launching of a new company, or an announce about a pending product release, etc.). Thus, it should be appreciated that within this description, any such entity is collectively be referred to as a "retailer", but it should be appreciated that the term retailer is to be broadly construed to include any entity that is moving goods and/or services, offering incentives, information, announcements or anything that could be made available for consumers. Further, throughout the description, the term "offer" should also be construed broadly to not just include goods and/or services offered for consumption, but rather could be any type of a benefit, such as incentives, information, goods, services, promotions, etc.

Retailers need consumers and, to attract consumers, retailers need efficient and effective ways to promote their products and services. Direct sales forces, contract sales forces, advertising campaigns through various media (print, radio, Internet/social media, etc.) all have their place in a comprehensive marketing effort for a retailer, but the most efficient marketing almost always includes a person-to-person promotion. Most people make buying decisions through the referrals by other people. And so, the more people a retailer has promoting its offerings to potential consumers, especially in a personal and meaningful way, the more sales that retailer is likely to generate.

Therefore, there is a need in the art for a system and method that enables a retailer to post promotional offers and create incentives for an on-demand sales force to present the promotional offers to would-be consumers. More specifically, there is a need in the art for a system and method that enables a retailer to leverage PCD users as a dynamic, on-demand sales force for promotion of retail offers to other PCD users who may be likely consumers for the retailer.

SUMMARY OF THE DISCLOSURE

A method and system are described for promoting sales offers through a dynamic, on-demand sales force through a distributed and networked system. An exemplary embodiment includes a distributed system for providing one or more conversion services on behalf of one or more entities. The entities may be any of a wide variety of merchants or business that are offering products and/or services to others. The exemplary distributed system may include a server or computer system that operates as a benefit defining engine. The benefit defining engine receives a parameter definition of one or more benefits on behalf of an entity. For instance, a user interface may allow a user to select and enter various parameters to define the benefit. In some embodiments, the benefit defining engine may receive a description of the benefit, a consumer cost for the benefit, and a conversion share for the entity that promoted to offer to a customer (i.e., salesman or drummer). As a non-limiting example, if the benefit is the sale of a food item at a restaurant, the parameters may identify the food item, a discounted price or an inclusion with the purchase, the dates and times the offer is active, and a percentage share that is received by the salesman or drummer. In some embodiments, the benefit defining engine may receive an identification of a class of drummers that can access the benefits.

Distributed devices are communicatively coupled to the benefit engine and each of the distributed devices is associated with a particular drummer. The device can access the defined benefits and then to create a conversion hook. The conversion hook identifies a particular benefit that is being accessed/offered and a particular drummer associated with the distributed device accessing the benefit. The conversion hook can be a QR code or other unique code that can be associated with the benefit and the drummer. The device can then be used to share the conversion hooks with one or more potential customers or buyers.

The distributed system also includes a settlement engine that receives a conversion notification when a customer/buyer utilizes a conversion hook to convert the benefit associated with the conversion hook. The settlement engine responds to the reception of the conversion notification by first converting the benefit (i.e., completing the transaction). During this process, the settlement engine extracts from the customer, or from funds received by a merchant from a customer, a conversion value required for converting the benefit. The settlement engine then operates to direct a compensation value to the drummer associated with the conversion hook.

The distributed system may include a control engine that allows an entity to define a domain of drummers that can access benefits of the entity or allow an entity to define classes of drummers. The control engine may allow selectively enabling and disabling one or more classes for accessing the benefits of the entity. Further, the control engine can be configured to receive a marketing definition for an entity and then select the number and type of drummers that have access to the benefits of that entity. In some embodiments, the control engine may allow an entity to enter parameters that define a marketing effort for the entity, the parameters comprising: the geographic region to target, the number of drummers for each geographic region and the demographics of customers.

The distributed system may also include a monitoring engine or service. The monitoring engine includes a drummer interface to convey information pertaining to the compensation value received for a particular drummer and/or a user interface to convey information pertaining to activity related to the benefits. As such, the monitoring engine can present statistics related to the activity of each of the benefits for an entity, including the number of shares, the number of conversions, and the demographics of the customers.

The distributed devices can share the conversion hook in one or more of a variety of manners, including but not limited to, transmitting it to a customer device via email, SMS, Bluetooth, etc., and/or displaying the conversion hook on a display of the distributed device to enable scanning by a customer device.

An exemplary embodiment of the distributed system may include the benefit defining engine, the settlement engine, the control engine and the monitoring engine existing within an app or application that is downloaded to mobile devices. In such an embodiment, the drummers and the consumers gain access to the functions of the distributed system using the mobile devices.

These and other features, aspects, benefits and advantages are presented in greater detail in connection with drawings and the detailed description.

BRIEF DESCRIPTION OF THE DRAWINGS

In the Figures, like reference numerals refer to like parts throughout the various views unless otherwise indicated. For reference numerals with letter character designations such as "110A" or "110B", the letter character designations may differentiate two like parts or elements present in the same figure or figures. Letter character designations for reference numerals may be omitted when it is intended that a reference numeral encompass all elements having the same reference numeral in all figures.

FIGS. 9A-9F are exemplary screens that could be displayed by the exemplary buyer application of FIG. 9.

DETAILED DESCRIPTION

Figure 1:
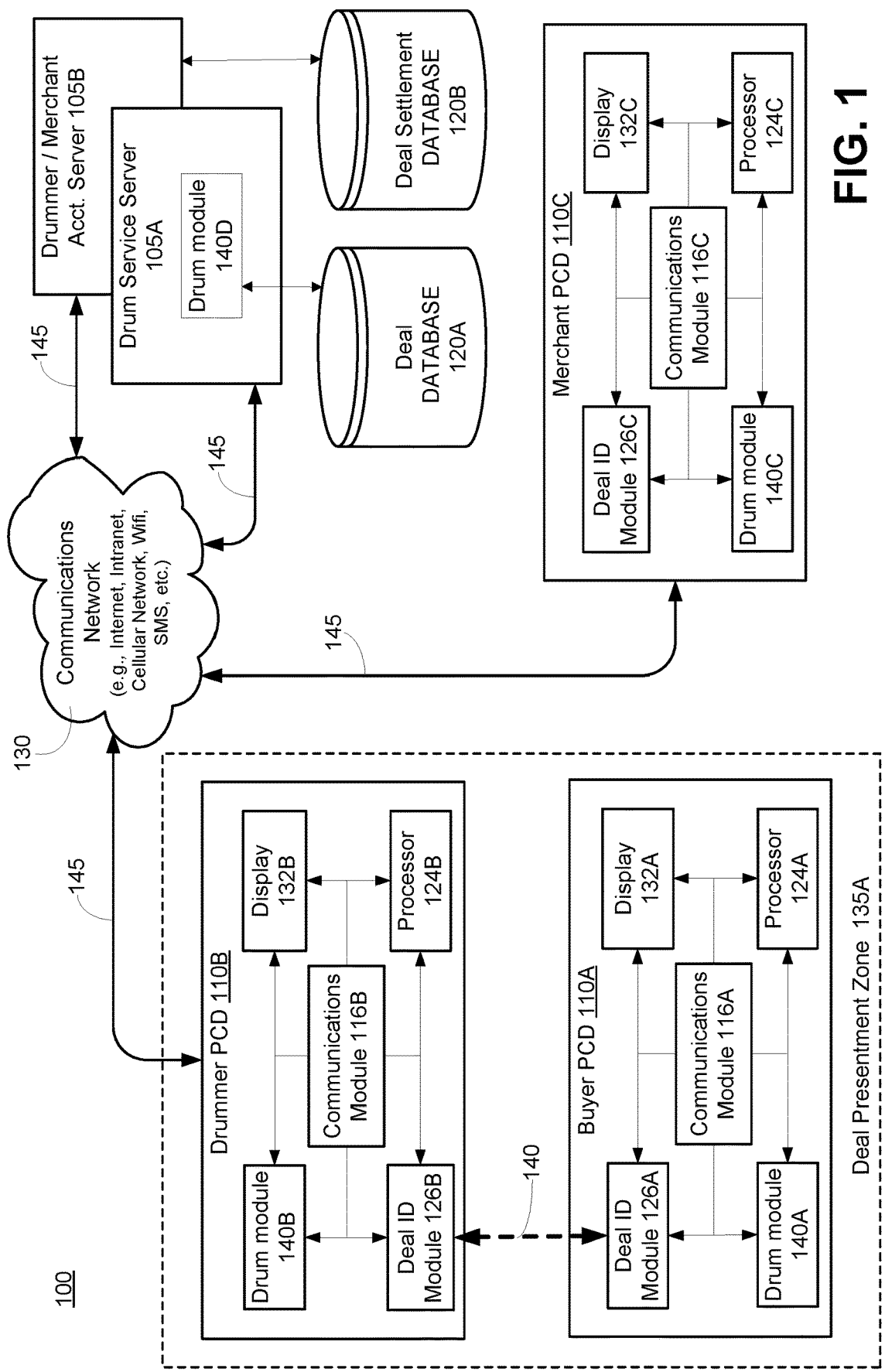
FIG. 1 is a high level diagram illustrating exemplary components of a system for leveraging personal computing device ("PCD") users as a dynamic, on-demand sales force for promoting retail offers ("deals") to other PCD users who may be likely consumers for a retailer.

The word "exemplary" is used herein to mean "serving as an example, instance, or illustration." Any aspect described herein as "exemplary" is not necessarily to be construed as preferred or advantageous over other aspects.

In this description, the terms "application" or "app" may also include files having executable content, such as: object code, scripts, byte code, markup language files, and patches. In addition, an "application" or "app" referred to herein, may also include files that are not executable in nature, such as documents that may need to be opened or other data files that need to be accessed. Further, an "application" or "app" may be a complete program, a module, a routine, a library function, a driver, etc.

The term "content" may also include files having executable content, such as: object code, scripts, byte code, markup language files, and patches. In addition, "content" referred to herein, may also include files that are not executable in nature, such as documents that may need to be opened or other data files that need to be accessed, transmitted or rendered. For example, in this description, reference to "deal content" may include a QR code and other related data pushed to a consumer PCD or, in some embodiments, requested by a consumer PCD. Similarly, responses or inputs generated by a user of a PCD may also be considered "deal content" depending on the context.

In this description, the term "QR code" is used generally to refer to any type of matrix barcode (or multi-dimensional bar code) or trigger to a deal presentment event and is not meant to limit the scope of any embodiment to the use of the specific type of barcode understood in the art to be a quick response code. That is, it is envisioned that any given embodiment of the systems and methods within the scope of this disclosure may use triggers in and of a wide variety of forms, including forms such as barcodes, plain text user entries, NFC transmissions, WiFi transmissions, short wave radio transmissions (e.g., Bluetooth), light modulations, sound modulations, voice detection systems, home automation system, etc. as well as other techniques including those that may be later developed. But, as a more specific but non-limiting example, the trigger may be a matrix barcode. As one of ordinary skill in the art understands, a matrix barcode is an optical machine-readable label that may be associated with data such as data representative of a promotional offer or "deal" of a retailer. An exemplary matrix barcode may include black modules (square dots) arranged in a square grid on a white background. The information encoded by the barcode may be comprised of four standardized types of data (numeric, alphanumeric, byte/binary, Kanji) or, through supported extensions, virtually any type of data. As one of ordinary skill in the art further understands, a matrix barcode may be read by an imaging device, such as a camera, and formatted algorithmically by underlying software using error correction algorithms until the image can be appropriately interpreted. Data represented by the barcode is then extracted from patterns present in both horizontal and vertical components of the image.

The term "benefit" is defined as any type of product, service, commodity, asset, discount, award, reward, recognition, coupon, promotional offer, ticket, pass, entrance, right or otherwise that can be used, purchased, rented, leased, licensed, traded, bartered, redeemed and/or given away. The term benefit may also include a deal or offer as also presented herein.

The term "conversion hook" is any type of a method, device or instrument that enables or can be used by a user or device to either use, purchase, rent, lease, license, trade, barter, redeem and/or received a benefit. Non-limiting examples include a QR code, bar code, URL, hyperlink, promotional code, PIN, entering a drum user ID, etc. The service hook can be shared with customers through a variety of channels including being visually displayed for the customer, or being transmitted to the customer through email, text, SMS, social media platforms (i.e. twitter, facebook, Instagram, etc), tagging the customer in a social media posting, scanning, Bluetooth or other wireless transfer, media device and/or optical scanning.

The term "conversion service" is any activity that (a) results in a benefit, either partially or wholly, transferring from an entity to another party or (b) presents the benefit as available for being used, purchased, rented, leased, licensed, traded, bartered, redeemed and/or received.

The term "engine" is an operational element that performs a function. An engine may be comprised of hardware, software, firmware, programmable hardware, mechanical, pneumatic, magnetic, executable code and a combination of any of these elements as well as other elements that can perform tasks, present queries and/or perform functions, and may even include human activity. An engine may operate entirely or partially on a server, a distributed server, a computer, a handheld device, a mobile device, an electromechanical platform or other platform to perform a specific function but may also perform other functions as well as integrate with other engines, processes or servers. As a distributed element, portions of the engine may operate on different platforms. As a non-limiting example, a portion of an engine may reside on a mobile platform and another portion on a network accessible server in one embodiment, and in another embodiment a portion of an engine may reside on one mobile platform while another portion of the engine resides on a different mobile platform.

The term server can be a single computer, multiple computers working together, distributed computer systems operating over a network, and a server can imply a single server or a cluster of two or more servers or simply a computer with a processor.

Reference is made in this description to "pushing" deals. A deal, and responses triggered by a deal, may be "pushed" from a drum service server, through a drummer PCD (in some embodiments), to a buyer PCD or from a buyer PCD or drummer PCD back to a drum service server, as the case may be. Thus, one of ordinary skill in the art will recognize that the use herein of "push" or "pushing" to describe a promotional offer or benefit being delivered to a consumer's PCD includes not only cases where a drum service server causes content under its control to be transmitted to a PCD, but also cases where a PCD using a browser application or other means may request content from the drum service server. Moreover, one of ordinary skill in the art will recognize that in this description "pushing" content may alternatively be the result of content transmitted between a server and PCD by any means including, but not limited to, short messaging service ("SMS"), WiFi, short wave radio, cellular transmissions, Internet protocol, etc. Further, depending on the embodiment, content may be "pushed" between a PCD and one or more other components such as a point of sale ("POS") system, survey server, third party PCD, etc. Further, in some embodiments, a Buyer may open the buyer app (independent from a Drummer) and with the intent of discovering potential deals. Thus, in such embodiments, rather than the benefits or potential deals being a self-discovery approach, this approach allows a buyer to "follow" a drummer—similar to following a user on twitter—and the Buyer can then see the deals that the Drummer is promoting. Also, the Buyer can follow categories of deals or benefits. When they want a deal in "follow drummer" mode, they simply select the deal and that drummer gets credit for the deal. If the Buyer is using the "follow a category" mode, the select the deal and it is posted out to the network. At this point a Drummer can claim the deal and thus receive credit. Or, as described further, the code that identifies the deal may include information encoded within it that fully defines the compensation structure and all other aspects of the deal.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component.

One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," "wireless handset" and personal computing device ("PCD") are used interchangeably. With the advent of third generation ("3G") and fourth generation ("4G") and fifth generation ("5G") wireless technology, greater bandwidth availability has enabled more personal computing devices with a greater variety of wireless capabilities. Therefore, a personal computing device ("PCD") may include a cellular telephone, a pager, a PDA, a smartphone, a navigation device, a tablet personal computer ("PC"), or a hand-held computer with a wireless connection or link. Moreover, even though embodiments of the solution are illustrated and described herein within the context of PCDs, it will be understood that the scope of the solution is not limited to system architectures consisting of only PCDs. That is, it is envisioned that any one or more of the functions and steps of the solution may, in some embodiments, be performed by and through a computing device having a wired connection (such as, but not limited to, a personal desktop computer).

In this description, embodiments of a solution are illustrated and described for "drumming up" business. Embodiments of a unique and novel system and method provide retailers or merchants with the ability to push offer promotions or "deals" to potential consumers by and through a dynamic sales force network, i.e. a "drum service," "drum system," "drum method," or the like. Theoretically, anybody associated with a PCD may be a salesperson within the dynamic sales force network (termed herein as a "drummer") and, likewise, anybody associated with a PCD may be a consumer (termed herein as a "buyer" or "consumer"). Depending on embodiment, drummers and/or consumers may not necessarily be associated with a PCD in order to participate in, and benefit from, the drum service.

For the purpose of this description, the term "deal" is used to comprehensively refer to any offer, discount, loyalty reward, enticement or the like, associated with a QR code and pushed by a merchant to buyers through drummers associated with the drum service. As will be better understood from the figures and the following description, a "deal" may be created and managed by a merchant, selected and promoted by a drummer, acquired and redeemed by a buyer, accepted and applied by the merchant, and ultimately settled through the drum service. In this way, merchants benefit from sales transactions generated by promotion of a deal, buyers benefit from the terms of a deal, and drummers benefit from commission or fees paid them after settlement of a deal.

Referring to FIG. 1, a high level diagram illustrates exemplary components of a system 100 for leveraging personal computing device ("PCD") 110B users as a dynamic, on-demand sales force for promoting retail offers ("deals") to other PCD 110A users who may be likely consumers for a retailer. The illustrated components of the exemplary system 100 use a drum module 140 and a deal ID module to create and manage deals, select and promote deals, acquire and redeem deals, accept and apply deals, and ultimately settle through a drum service and account servers 105.

Embodiments of a system 100 for leveraging user PCDs 110B as a dynamic, on-demand sales force for promoting retail offers to other user PCDs 110A has many potential advantages. Briefly, and to provide the basis for an exemplary, non-limiting application scenario in which aspects of some embodiments of the disclosed systems and methods may be suitably described, consider a driver for an on-demand ride share service. The driver earns income by responding to ride share requests—picking up passengers and transporting them to a desired location. Drivers for ride share services tend to be very knowledgeable of the area in which they offer their ride share services and, therefore, are in a great position to suggest restaurants, entertainment, local shops and the like to their passengers. Advantageously, embodiments of the solution provide a way for such a ride share driver to earn additional income through promotion of "deals" relevant to a passenger.

To further the example, suppose a ride-share driver is transporting passengers from the local airport to a hotel on the other side of the city. Using the drum service, the driver may recognize a posted deal for a great restaurant around the corner from the hotel, promote the deal to his passengers, transmit a unique QR code to the passenger that associates the deal with the driver, and then later receive a commission if/when the passenger uses the QR code to activate the deal at the local restaurant. In this non-limiting example, the restaurant is the merchant, the driver is the drummer, and the ride-share passenger is the buyer. The drum service system 100 enables the entire deal cycle.

Returning to the FIG. 1 illustration, a merchant using PCD 110C may be in communication with the drum service servers 105 via communications module 116C and communication links 145 through network 130. The merchant may first establish an account with the drum service via communication with drummer/merchant account server 105B. As would be understood by one of ordinary skill in the art, creating an account may include, among other things, establishing user login credentials. In this way, the drum service may uniquely identify a given merchant and, in turn, uniquely associate generated deals with the merchant. Account information associated with the merchant may be stored in deal settlement database 120B.

Drum module 140C, which may work with processor 124C to execute part or all of a drum app supported by servers 105, may be used to generate a deal. For the purpose of this description, generating a deal may include, but is not limited to including, word processing, graphic design, QR code generation, etc. For example, if the merchant was a restaurant proprietor, a generated deal may be for a 20% discount off all entrees purchased after 9:00. The drum module 140C may be operable to generate a deal or, alternatively, operable to communicate with drum module 140D to generate a deal. Once generated, a deal may be stored by drum module 140C in a memory 719 (see FIG. 7), as would be understood by one of ordinary skill in the art of computer processing.

With a deal generated by a merchant using merchant PCD 110C, drum module 140D may store the deal in deal database 120A, associate the deal with a merchant account in deal settlement database 120B, and subsequently publish the deal such that it is accessible by drummer PCD 110B running drum module 140B.

A drummer using PCD 110B may be in communication with the drum service servers 105 via communications module 116B and communication links 145 through network 130. The drummer may first establish an account with the drum service via communication with drummer/merchant account server 105B. As would be understood by one of ordinary skill in the art, creating an account may include, among other things, establishing user login credentials. In this way, the drum service may uniquely identify a given drummer (or, rather, drummer PCD 110B) and, in turn, uniquely associate selected deals with the drummer PCD 110B or a drummer account. Account information associated with the drummer may be stored in deal settlement database 120B.

With an account established, the drummer may use drum module 140B of PCD 110B to communicate with drum module 140D for query and selection of published deals stored in deal database 120A. Depending on embodiment, published deals may be queried in view of any number of criteria including, but not limited to, by subject matter, by geographic location of the associated merchant, by drummer commission rates, by eligibility dates/times, etc. As will be further explained below, criteria associated with a given deal may be used by the drum service as a trigger for causing the drummer to present the deal at an opportune time.

The drummer may subsequently select one or more deals for promotion. Deals selected by a drummer for promotion may be stored in drummer PCD 110B for access by drum module 140B or, depending on embodiment, may be stored in deal database 120A in association with the drummer account. Regardless, once a drummer selects a published deal for promotion, the drum service server 105A may generate a unique QR code that associates the deal (which is necessarily already associated with a merchant account) with the drummer account.

With deals selected by the drummer for later promotion, the drum service may recognize that the drummer PCD 110B is in local proximity with a buyer PCD 110A, i.e., both the drummer PCD 110B and the buyer PCD 110A are in deal presentment zone 135A. The drum service may accurately conclude that both PCD 110B and PCD 110A are in deal presentment zone 135A by monitoring and comparing geographic positioning system ("GPS") coordinates transmitted to the drum server 105A from communications modules 116B and 116A. Alternatively, the drummer associated with PCD 110B may conclude without help from the drum service that PCD 110A, or the buyer associated with PCD 110A, as the case may be, is within deal presentment zone 135A. As an example, briefly referring back to the exemplary drummer who is a ride-share driver, deal presentment zone 135A may be defined by the driver's automobile or, perhaps, may be defined by a geographic location associated with the driver's automobile.

Based on presentment triggers, some embodiments of the solution may leverage criteria associated with drummer selected deals to push certain deals to the forefront. In this way, a drummer perusing previously selected deals via display 132B may be presented with those previously selected deals which are likely most relevant to the deal presentment zone 135A. For example, a criteria associated with a previously selected deal may indicate that the geographic location of the merchant establishment associated with the deal is in near proximity to the deal presentment zone 135A—such a deal may be the most optimum deal for presentment by the drummer to the buyer since the merchant establishment is nearby. And so, based on a presentment trigger determined with a comparison of the geographic location of the presentment zone 135A with the geographic location of a merchant establishment, drum module 140B may prioritize presentment of a deal associated with the given merchant.

Briefly turning back to the ride-share driver example, the ride-share driver (i.e., the drummer) may recognize that the ride-share client (i.e., the buyer) is later attending a local theatre production. The local theatre location, and/or the show time for the production, may serve as presentment triggers to prioritize a previously selected deal by the drummer for half off cocktails after the production at a restaurant nearby the theatre. Accordingly, the drummer may present a QR code associated with the deal to the buyer.

To present a deal to a buyer in deal presentment zone 135A, the drummer PCD 110B may display a QR code on display 132B and/or transmit 140 the unique QR code using deal ID module 126B. The buyer PCD 110A may execute a drum service app using drum module 140A and deal ID module 126A in order to receive the transmission of the unique QR code. In turn, the unique QR code may be stored in drum module 140A. Notably, the unique QR code acquired by buyer PCD 110A from drummer PCD 110B is not only associated with the particular deal originally generated and published to the drummer by the merchant via PCD 110C, but is also uniquely associated with the drummer PCD 110B. Importantly, a different drummer associated with a different drummer account and drummer PCD may also promote and transmit a QR code associated with the same merchant deal, however, such QR code would be uniquely associated with the different drummer. That is, no two drummers associated with a common deal may present a common QR code. QR codes are uniquely associated with a merchant, a deal published by the merchant, and a drummer.

With the unique QR code stored in buyer PCD 110A (or stored in deal database 120A in association with a drum account previously established by the buyer and accessible via drum module 140A in conjunction with communications module 116A), the buyer may visually present the unique QR code via display 132A, or otherwise transmit the code via communications module 116A, for redemption by the associated merchant. Recognizing the unique QR code, the merchant may apply the promotional offer associated with the deal and communicate with drummer/merchant account server 105B to reconcile and settle the backend transaction with the drummer (see FIG. 2). In this way, the drummer may receive commission or other compensation for promotion of the deal. The account server 105B may debit a merchant account and credit a drummer account in deal settlement database 120B, as would be understood by one of ordinary skill in the art of accounting and electronic banking.

With a more broad reference to the system 100 shown and illustrated in FIG. 1 (and FIG. 2), exemplary embodiments of a PCD 110 envision remote communication, real-time software updates, extended data storage, etc. and may be leveraged in various configurations by users of system 100. Advantageously, embodiments of PCDs 110 configured for communication via a computer system such as the exemplary system 100 depicted in FIG. 1 may leverage communications networks 130 including, but not limited to cellular networks, PSTNs, cable networks and the Internet for, among other things, software upgrades, content updates, database queries, data transmission, etc. Other data that may be used in connection with a PCD 110, and accessible via the Internet or other networked system, will occur to one of ordinary skill in the art. Moreover, one of ordinary skill in the art will recognize that, because of the networked relationship of the various components of the system 100, all or parts of given functions may be performed or executed within a single or multiple components of the system 100, as required or preferred.

The illustrated computer system 100 may comprise a server 105, or servers 105, that may be coupled to a network 130 comprising any or all of a wide area network ("WAN"), a local area network ("LAN"), the Internet, or a combination of other types of networks. It should be understood that the term server 105 may refer to a single server system or multiple systems or multiple servers. The server 105 may be coupled to a deal database 120A and/or a deal settlement database 120B. The databases 120 may store various records related to, but not limited to, generated and published deals, drummer selected deals, real-time analytic data associated with deals (e.g., how many times selected by a drummer, how many times tendered by a buyer, peak times for presentment, etc.), PCD user-specific contact or account information, historical content, presentment trigger algorithms, filters/rules algorithms, survey content, previously recorded feedback, etc.

When the server 105 is coupled to the network 130, the server 105 may communicate through the network 130 with various different PCDs 110 associated merchants, drummers, and/or potential customers of a retailer. Each PCD 110 may run or execute web browsing software or functionality to access the server 105 and its various applications including drum module 140B. Any device that may access the network 130 either directly or via a tether to a complimentary device, may be a PCD 110 according to the computer system 100. The PCDs 110, as well as other components within system 100 such as, but not limited to, a wireless router (not shown), may be coupled to the network 130 by various types of communication links 145. These communication links 145 may comprise wired as well as wireless links. The communication links 145 allow a PCD 110 to establish virtual links 140 with the server 105 and/or other PCDs 110. The particular link 140 depicted in the FIG. 1 illustration may only be used to relay the deal ID (e.g., QR code) to the PCD 110A as a uni-directional communications channel. In other exemplary embodiments, the PCD 110 may establish bi-directional communications with the server 105 and/or other PCDs 110 as understood by one of ordinary skill in the art.

A PCD 110 may include a display 132, a processor 124 and a communications module 116 that may include one or more of a wired and/or wireless communication hardware and a radio transceiver 717. It is envisioned that the display 132 may comprise any type of display device such as a liquid crystal display ("LCD"), a plasma display, an organic light-emitting diode ("OLED") display, a touch activated display, and a cathode ray tube ("CRT") display, a brail display, an LED bank, and a segmented display. A PCD 110 may execute, run or interface to a multimedia platform that may be part of a plug-in for an Internet web browser.

The communications module 116 may comprise wireless communication hardware such as, but not limited to, a WiFi card or NFC card for interfacing with deal ID module 126. Further, the communications module 116 may include a cellular radio transceiver to transmit a unique QR code for a deal as well as other information to exemplary drum service server 105A and/or buyer PCD 110A, as depicted in the system 100 embodiment. One of ordinary skill in the art will recognize that a communications module 116 may include application program interfaces to processor 124.

It is envisioned that a PCD 110 may be configured to leverage the cellular radio transceiver of the communications module 116 to transmit data, such as a unique QR code and account information by way of a secure channel using a wireless link 145 to the drum servers 105. Communication links 145 and 140, in general, may comprise any combination of wireless and wired links including, but not limited to, any combination of radio-frequency ("RF") links, infrared links, acoustic links, other wireless mediums, wide area networks ("WAN"), local area networks ("LAN"), the Internet, a Public Switched Telephony Network ("PSTN"), and a paging network.

An exemplary PCD 110 may also comprise a computer readable storage/memory component 719 (shown in FIG. 7) for storing, whether temporarily or permanently, various data including, but not limited to, deal and account content. Data added to, extracted or derived from a deal ID (e.g., a QR code) may comprise a buyer ID, a drummer ID, a merchant ID, loyalty account data, a transaction ID, a directory number ("DN") or calling line ID ("CLID") associated with PCD 110, a hash value, a codec key, encryption or decryption data, account numbers and other account related data, etc.

Figure 2:
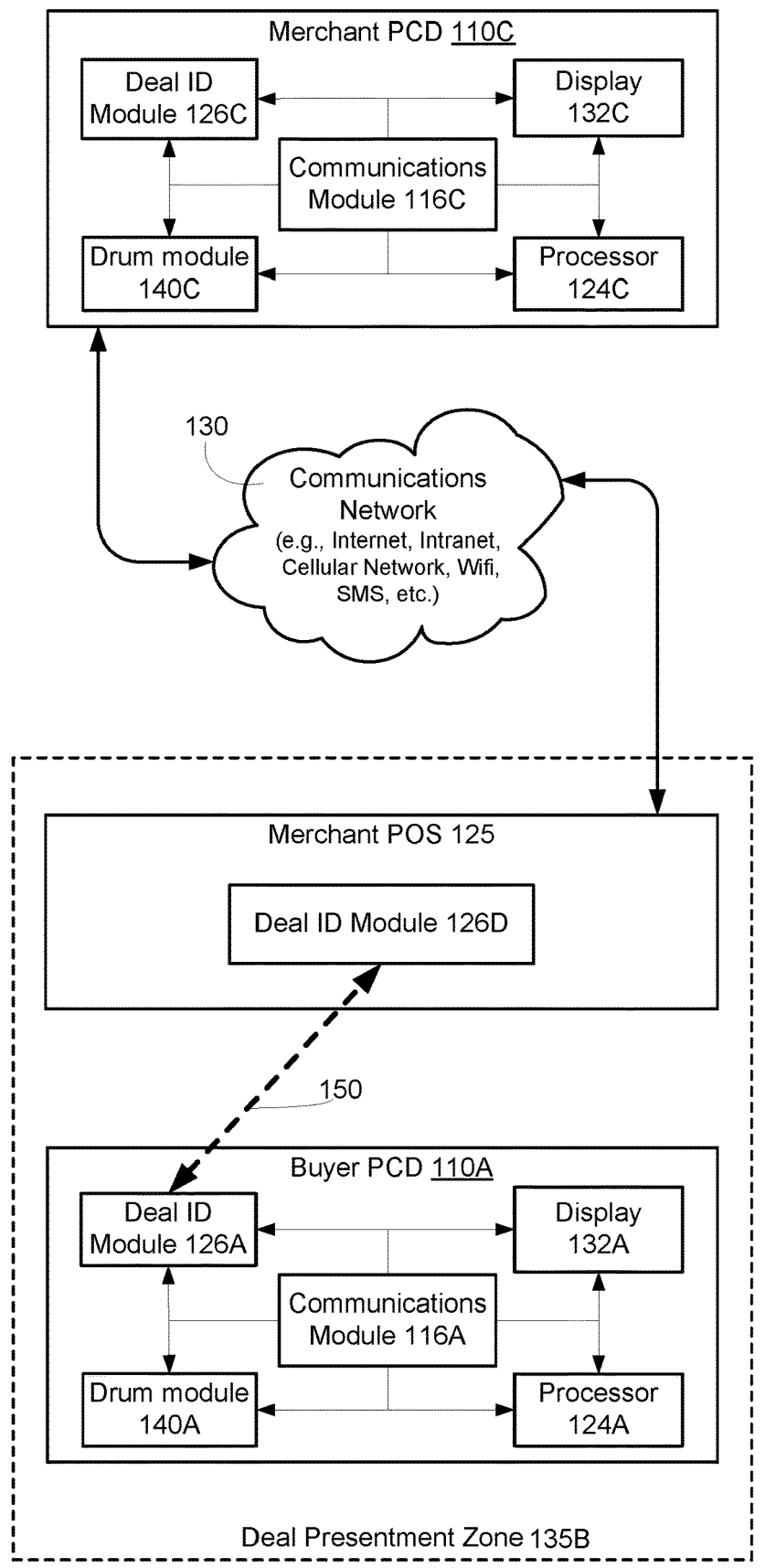
FIG. 2 is a high level diagram illustrating an additional aspect of the system illustrated in FIG. 1 for redemption and settlement of a deal.

Turning now to FIG. 2, a high level diagram illustrating an additional aspect of the system illustrated in FIG. 1 for redemption and settlement of a deal is depicted. In the FIG. 2 illustration, the deal presentment zone 135B represents the event wherein a buyer has elected to redeem an offer, or deal, represented by a unique QR code previously acquired from a drummer, such as the drummer associated with PCD 110B. Notably, although the solution is being described herein within the context of embodiments that transmit a unique QR code from a drummer PCD 110B to a buyer PCD 110A for later presentment by the buyer using PCD 110A, it will be understood that embodiments are not limited to QR codes transmitted from a PCD 110B to a PCD 110A. For example, it is envisioned that some embodiments of the system 100 may provide for a drummer to present a unique QR code via a social media interface, email, physical postcard/flyer, etc.

Returning to the FIG. 2 illustration, the deal ID module 126A may work with the drum module 140A to identify a certain acquired QR code representing a given deal and display the QR code on display 132A. Or, the code representing the deal may be transmitted by communications module 116A. Subsequently, deal ID module 126D of the merchant's point of sale ("POS") system may read the QR code, or receive transmission of the code, as would be understood by one of ordinary skill in the art. Alternatively, the merchant PCD 110C may leverage its deal ID module 126C to read the QR code, or receive transmission of the QR code, if so configured and positioned within the deal presentment zone 135B. Notably, although the deal present zones 135 are described within the contexts the exemplary embodiments to be physical zones, it is envisioned that some embodiments may provide for virtual deal presentment zones 135 such that a QR code may be redeemed from a physically remote location from a merchant associated with the deal via network 130, such as might be optimum for redemption of a deal to an online merchant.

With the QR code redeemed by the buyer, the merchant may apply the given terms of the deal (e.g., a discount rate) to a purchase transaction between the buyer and the merchant. Subsequently, and as described above, the QR code and/or other data associated with the purchase transaction may be transmitted to the drum service servers 105. Analytics associated with the deal may be updated, commission or payment may be settled to an account of the drummer associated with the QR code, and an account of the merchant may also be updated.

Figure 3:
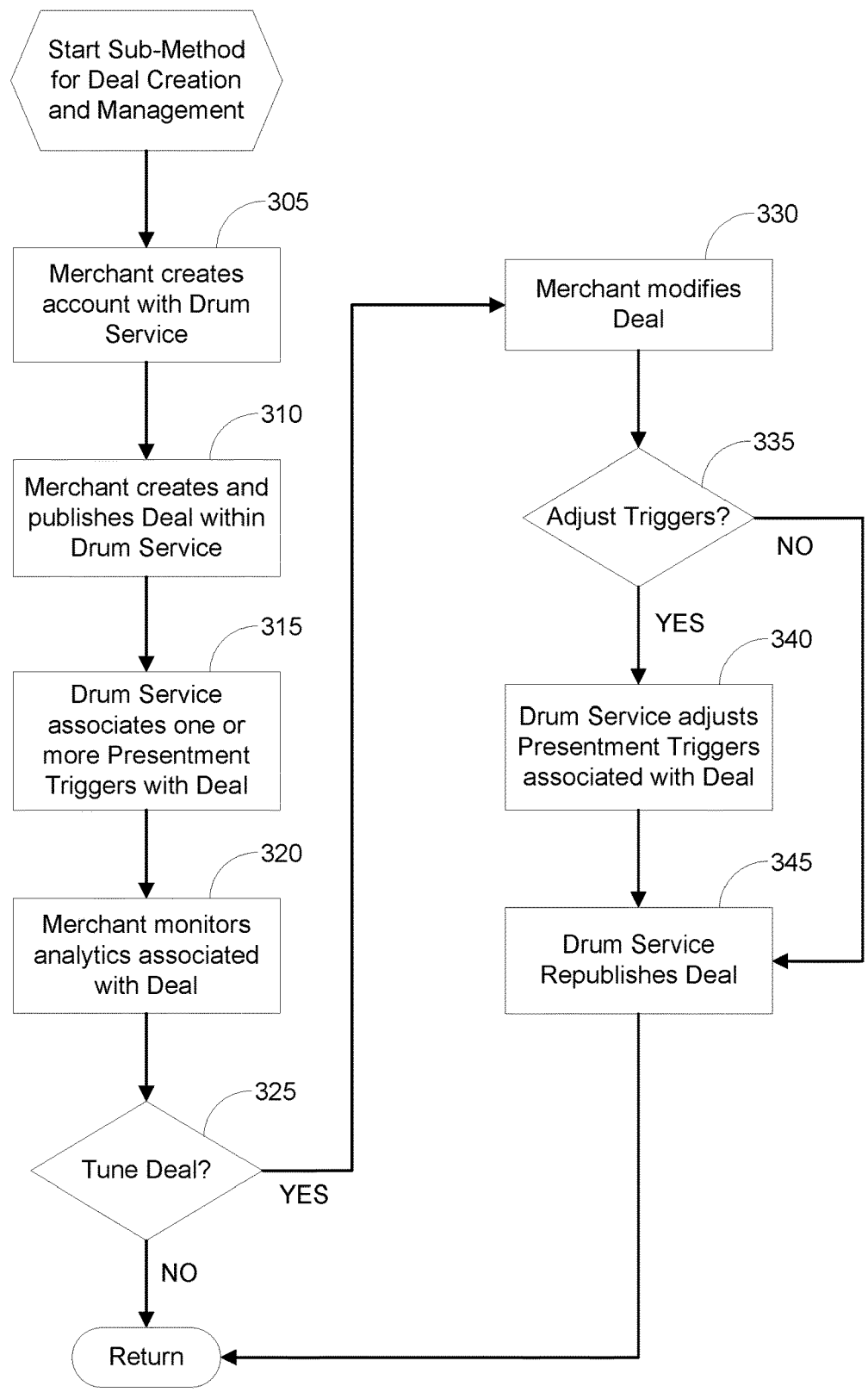
FIG. 3 illustrates an exemplary sub-method for deal creation and management within the overall method for leveraging PCD users as a dynamic, on-demand sales force for promoting deals to other PCD users who may be likely consumers for a retailer.

FIG. 3 illustrates an exemplary sub-method 300 for deal creation and management within the overall method for leveraging PCD users as a dynamic, on-demand sales force for promoting deals to other PCD users who may be likely consumers for a retailer or merchant. Beginning at block 305, a merchant creates an account with the drum service. By and through the account, the merchant may be able to create and publish deals, i.e. promotions or offers, for dissemination to potential consumers through a network of drummers. Accordingly, at block 310 the merchant may create and publish a deal within the drum service. As previously described, the drum service may host the deal and publish it for access and viewing by drummers. At block 315, the drum service may associate one or more presentment triggers with the deal created at block 310. The presentment triggers may include, but are not limited to including, a geographic zone or range, a time window, a consumer gender, a subject matter or content, etc.

Next, at block 320, the merchant may monitor the performance of the deal by reviewing analytics gathered by the drum service. The analytics may include, but are not limited to including, the number of drummers who have viewed the deal, the number of drummers who have selected the deal for possible promotion to consumers, the number of times a deal has been presented by a drummer to a consumer, the number of times the deal has been redeemed, the amount of time the deal has been published, the aggregate commission paid to drummers from the deal, time of day that the deal has been most redeemed, etc.

At decision block 325, the merchant may decide to tune the deal in view of the analytics monitored at block 320. Based on the performance of the deal, the merchant may decide to adjust the deal structure such as, but not limited to, adjusting the drummer commission rate, adjusting a discount rate offered to a consumer, adjusting quantities of goods associated with the deal, etc. If the merchant elects to leave the deal as presently published, the method 300 follows the "NO" branch from decision block 325 and the method 300 returns. If, however, the merchant decides to tune or adjust the deal in some manner, the method 300 follows the "YES" branch to block 330.

At block 330, the merchant may modify one or more aspects of the deal. Next, with the deal modified, the method 300 advances to the decision block 335 and determines whether one or more presentment triggers should be adjusted for the deal. As a non-limiting example, suppose the original deal was a "half-price off cocktails from 5:00-6:00" and the merchant adjusts the deal to be "half-price off cocktails from 6:00-7:00." In such a case, the drum service may recognize a need to adjust a presentment trigger such that the deal is not pushed or prioritized to drummers after 7:00, thereby adjusting a previous presentment trigger that dictated the deal was not pushed or prioritized to drummers after 6:00.

Returning to the method 300 at decision block 335, if the drum service (or the merchant, depending on embodiment) determines not to adjust any presentment triggers associated with the deal, the method 300 follows the "NO" branch to block 345 and the new, modified deal is republished for viewing and selection by drummers in the drummer network. If, however, it is determined that one or more presentment triggers require adjustment, or it is determined that one or more presentment triggers should be eliminated or added, the method 300 follows the "YES" branch to block 340 and the drum service adjusts the presentment trigger set associated with the deal. Subsequently, at block 345 the modified or tuned deal is republished for viewing and selection by drummers in the drummer network. The sub-method 300 returns.

Figure 4:
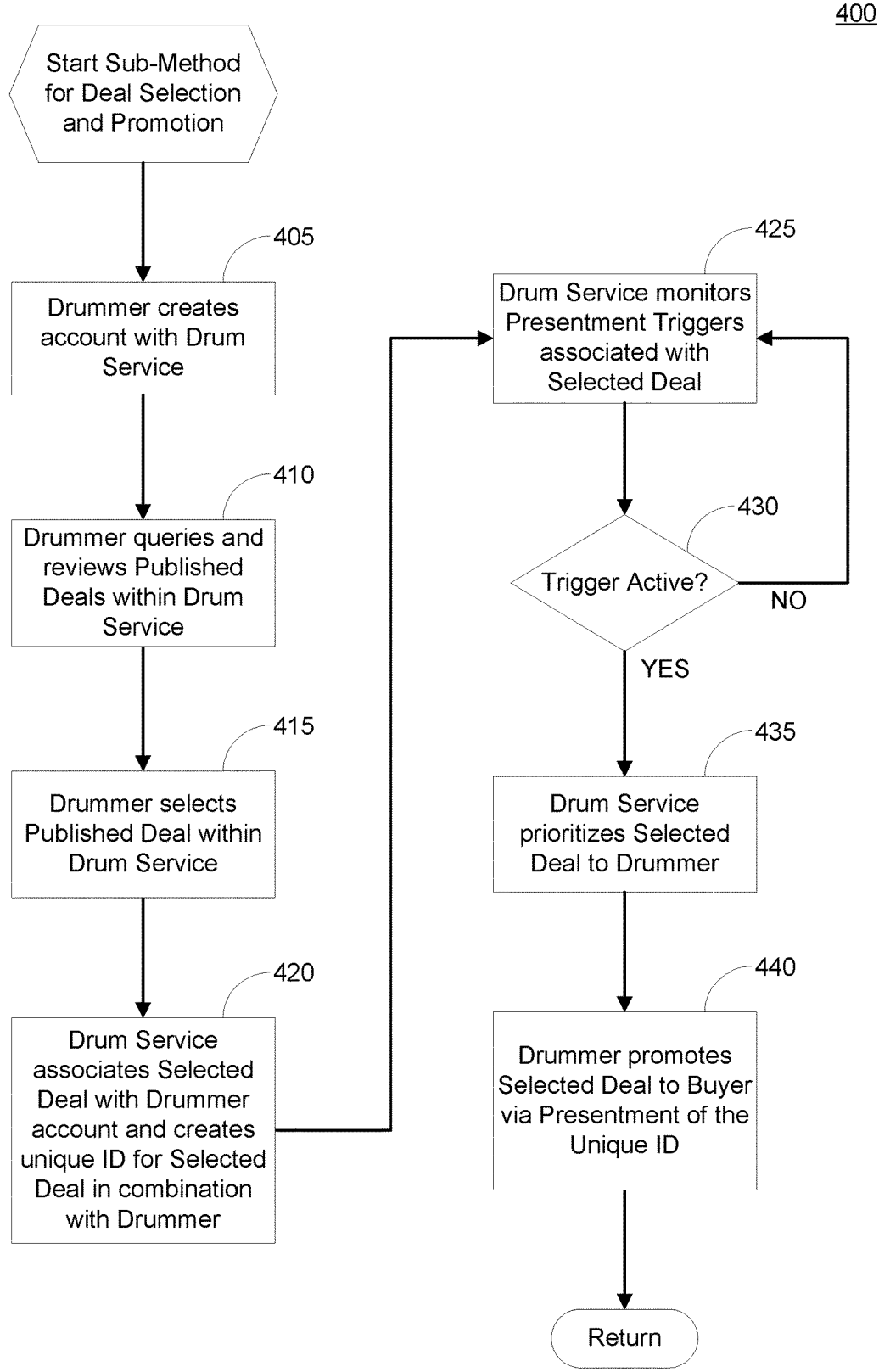
FIG. 4 illustrates an exemplary sub-method for deal selection and promotion within the overall method for leveraging PCD users as a dynamic, on-demand sales force for promoting deals to other PCD users who may be likely consumers for a retailer.

FIG. 4 illustrates an exemplary sub-method 400 for deal selection and promotion within the overall method for leveraging PCD users as a dynamic, on-demand sales force for promoting deals to other PCD users who may be likely consumers for a retailer. Beginning at block 405, a drummer creates an account with the drum service. Advantageously, with an account within the drum service, a drummer may promote deals generated and published by merchants within the drum service and, in doing so, earn commissions or fees when a promoted deal is redeemed by a consumer.

Next, at block 410, the drummer may query and review published deals within the drum service. It is envisioned that the published deals may be queried based on any number of criteria including, but not limited to, by subject matter, by geographic location of the associated merchant, by drummer commission rates, by eligibility dates/times, etc. Advantageously, depending on embodiment, such criteria associated with a given deal may also be used by the drum service as a presentment trigger for causing the drummer to present the deal at an opportune time. As such, and as will become more apparent in view of all the Figures and description provided herein, a drummer may select deals to promote based on presentment triggers associated with the deals. Moreover, it is envisioned that drummers may set their own prioritizations of selected deals in view of the associated triggers. For example, if a drummer anticipates being around a large number of potential consumers of a same gender, the drummer may prioritize selected deals to be pushed to the forefront that have presentment triggers consistent with the given gender.

Returning to the sub-method 400, at block 415 the drummer selects one or more published deals and, at block 420, the drum service associates the selected deals with the drummer's account and creates a unique ID, such as a QR code, that associates the given deal with the given drummer. Consequently, later presentment of the unique QR code by a buyer seeking to redeem the deal will enable the drum service to appropriately credit the given drummer with promotion of the deal.

At block 425, the drum service may monitor various presentment triggers associated with the deal. For example, one exemplary presentment trigger may be a geographic location of a merchant associated with a deal that has been selected by a drummer. The geographic location of the drummer's PCD 110B may be monitored such that when the geographic location of the PCD 110B is within a certain range of the location of the merchant establishment, the drum service may recognize activation of the presentment trigger and "push" the deal to the drummer to consider it for presentment to a potential buyer. This is just one, non-limiting example of a presentment trigger that may be used by an embodiment of the solution.

Next, at decision block 430, the drum service may determine whether one or more presentment triggers associated with a deal selected by a drummer is active. If no presentment trigger is active, the "NO" branch is followed back to block 425 and the drum service continues monitoring. If, however, a presentment trigger associated with a given deal previously selected by a drummer is active, then the "YES" branch is followed to block 435 and the drum service may prioritize or "push" the selected deal to the drummer. Advantageously, if a given drummer has selected many possible deals for promotion, the use of presentment triggers may help the drummer to quickly identify given deals that may more likely be relevant to the deal presentment zone 135A in which the drummer is a part at a given point in time.

Next, at block 440, the drummer may promote the selected deal that has been prioritized according to the presentment trigger recognized at decision block 430. Promotion of the deal, as previously described, may include transmission of a unique QR code from the drummer PCD 110B to the buyer PCD 110A, although other means for promotion of the unique code are envisioned such as, but not limited to, a code printed on print media, a code distributed through a social media advertisement, etc. Also, it is envisioned that a drummer may be provided with a means for overriding a particular deal that has been pushed based on a presentment trigger and, in such a situation, may elect to present a different deal previously selected and available for promotion by the drummer. For example, a geographic zone trigger may cause a "½ off cocktails" deal to be prioritized as a suggested deal for promotion, but the drummer having determined that the potential buyer in the active presentment zone 135A is not interested in cocktails may elect to promote a different deal. The sub-method 400 returns.

Figure 5:
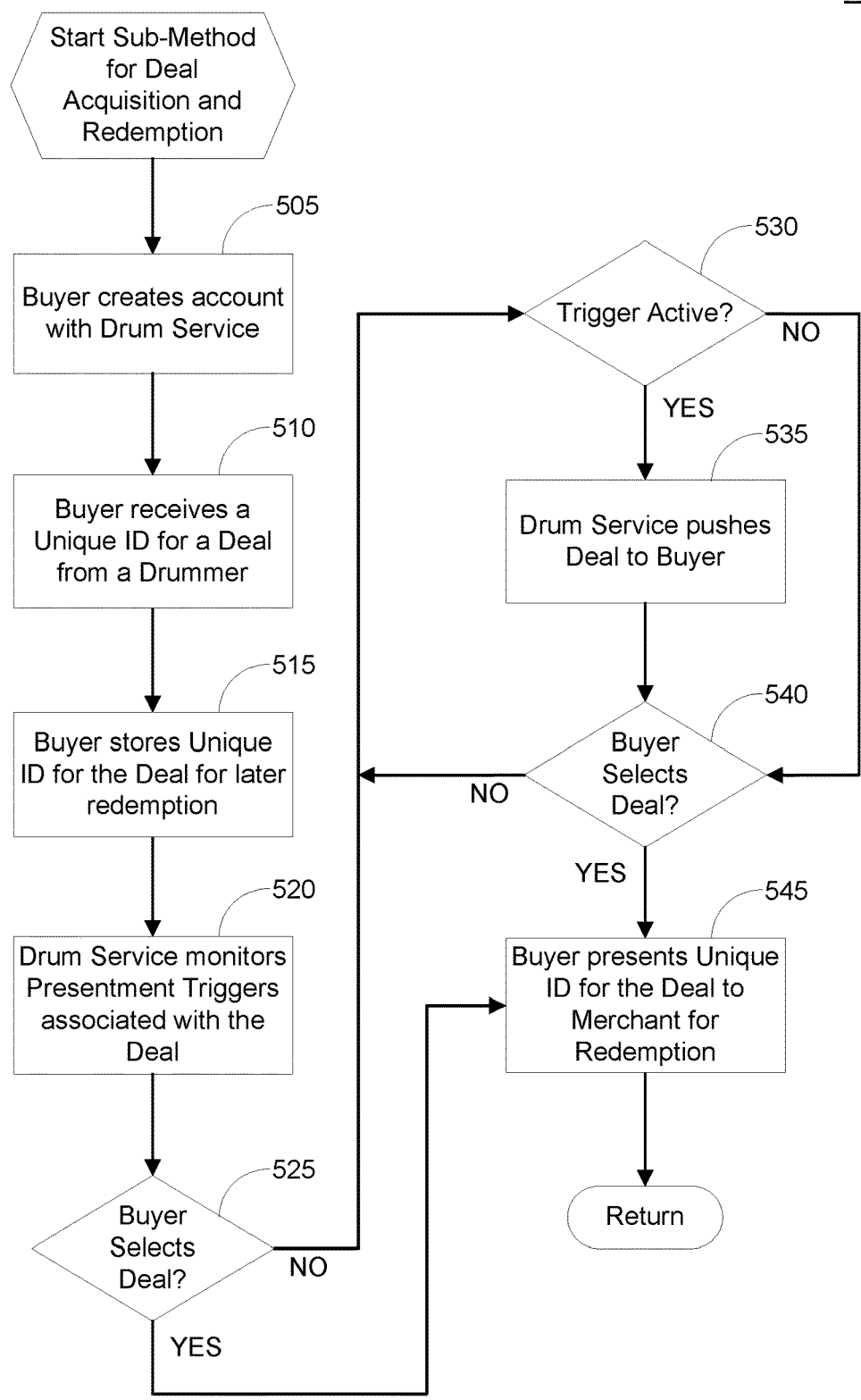
FIG. 5 illustrates an exemplary sub-method for deal acquisition and redemption within the overall method for leveraging PCD users as a dynamic, on-demand sales force for promoting deals to other PCD users who may be likely consumers for a retailer.

FIG. 5 illustrates an exemplary sub-method 500 for deal acquisition and redemption within the overall method for leveraging PCD users as a dynamic, on-demand sales force for promoting deals to other PCD users who may be likely consumers for a retailer. Beginning at block 505, a buyer may create an account with the drum service. Notably, depending on embodiment, buyers may not be required to create a drum account in order to receive or "read" unique QR codes promoted by drummers. It is envisioned, however, that embodiments of the solution that provide for a buyer account within the drum service may be better positioned to push relevant deals through to a buyer, thereby improving the buyer experience and, by extension, the benefit to the merchant(s). Next, at block 510 the buyer may encounter a drummer (deal presentment zone 135A) and receive a unique ID, such as a unique QR code, associated with a deal. At block 515, the buyer may store the unique deal ID in the PCD 110A or, alternatively, in association with the buyer account at server 105/database 120.

At block 520, the drum service may monitor presentment triggers associated with the deal. For example, the drum service may recognize that the geographic location of the buyer's PCD 110A maps to the geographic location of the merchant associated with the previously received and stored deal. As a result, the drum service may conclude that the buyer is in the merchant establishment and push, or otherwise make active, the deal. As a non-limiting example, suppose that a week prior the buyer received a unique deal ID from a drummer for a free coffee at a certain coffee bar. The drum service may determine from a geographic presentment trigger that the buyer is now in, or nearby, the certain coffee bar and, in response, remind the buyer about the deal by pushing or rendering the unique ID and/or a content associated with the deal (e.g., an advertisement with a QR code embedded therein) to the forefront of the buyer's PCD 110A. It is envisioned, however, that a buyer may be able to select a previously acquired deal for presentment and redemption in deal presentment zone 135B without use or need of the drum service leveraging presentment triggers. As such, certain embodiments of the solution may skip block 520 of sub-method 500 without departing from the scope of the solution.

If, at decision block 525, the buyer selects a deal for possible redemption, the sub-method 500 follows the "YES" branch to block 545. At block 545, the buyer may present the deal for redemption (i.e., present the unique ID such as a QR code) to the merchant associated with the deal. If, however, at decision block 525 the buyer does not select a deal for possible redemption, the sub-method 500 follows the "NO" branch to decision block 530.

At decision block 530, if a presentment trigger for a deal previously acquired by the buyer is not active, the "NO" branch is followed to decision block 540. If, at decision block 530 a presentment trigger for a deal previously acquired by the buyer is active, the "YES" branch is followed to block 535 where the drum service may push a deal associated with the active presentment trigger to the buyer and the sub-method 500 continues to decision block 540.

At decision block 540, if the buyer declines to select a deal for redemption, the "NO" branch is followed back to decision block 530. If, however, at decision block 540 the buyer accepts or selects a deal for redemption, the sub-method 500 follows the "YES" branch to block 545 where the buyer may present the deal for redemption (i.e., present the unique ID such as a QR code) to the merchant associated with the deal. The sub-method 500 returns.

Figure 6:
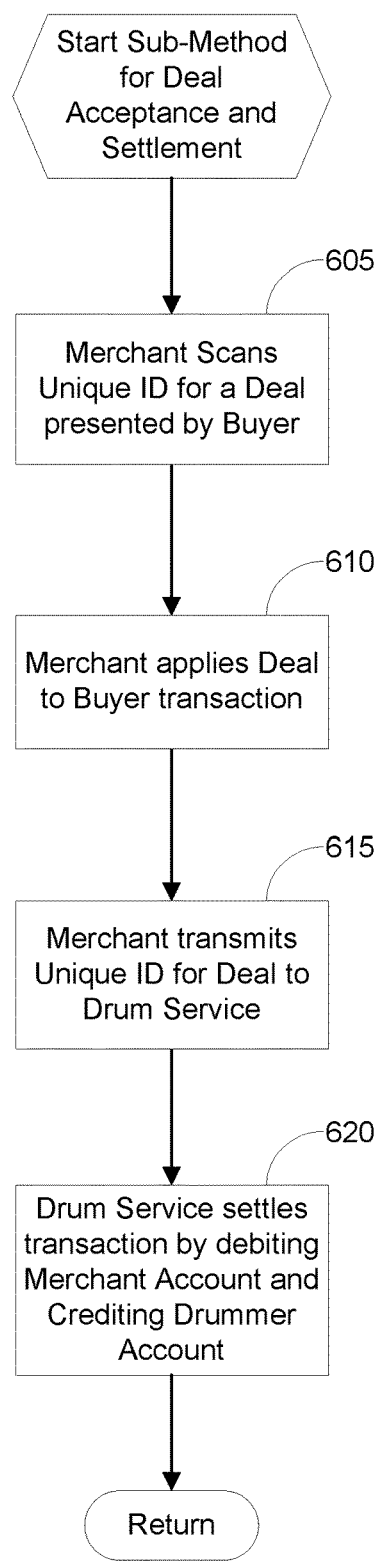
FIG. 6 illustrates an exemplary sub-method for deal acceptance and settlement within the overall method for leveraging PCD users as a dynamic, on-demand sales force for promoting deals to other PCD users who may be likely consumers for a retailer.

FIG. 6 illustrates an exemplary sub-method 600 for deal acceptance and settlement within the overall method for leveraging PCD users as a dynamic, on-demand sales force for promoting deals to other PCD users who may be likely consumers for a retailer. Beginning at block 605, a merchant presented with a unique ID for a deal (e.g., a QR code) scans or otherwise "reads" the unique ID with the deal ID module 126D of the POS 125 or, alternatively, with deal ID module 126C of merchant PCD 110C. By reading the unique ID, the drum module 140C may be able to determine the nature of the deal previously generated and published by the merchant through the drum service. Subsequently, at block 610 the merchant may be able to apply the deal to a purchase transaction between the merchant and the buyer who presented the unique ID.

The sub-method 600 continues to block 615 where the merchant PCD 110C and/or the merchant POS 125 transmits the unique ID, or data associated with the unique ID, to the drum service. At block 620 the drum service may settle a backend transaction between the merchant and the drummer who presented the unique ID to the buyer. In doing so, the drum service may debit an account associated with the merchant and credit an account associated with the drummer. The sub-method 600 returns.

Figure 7:
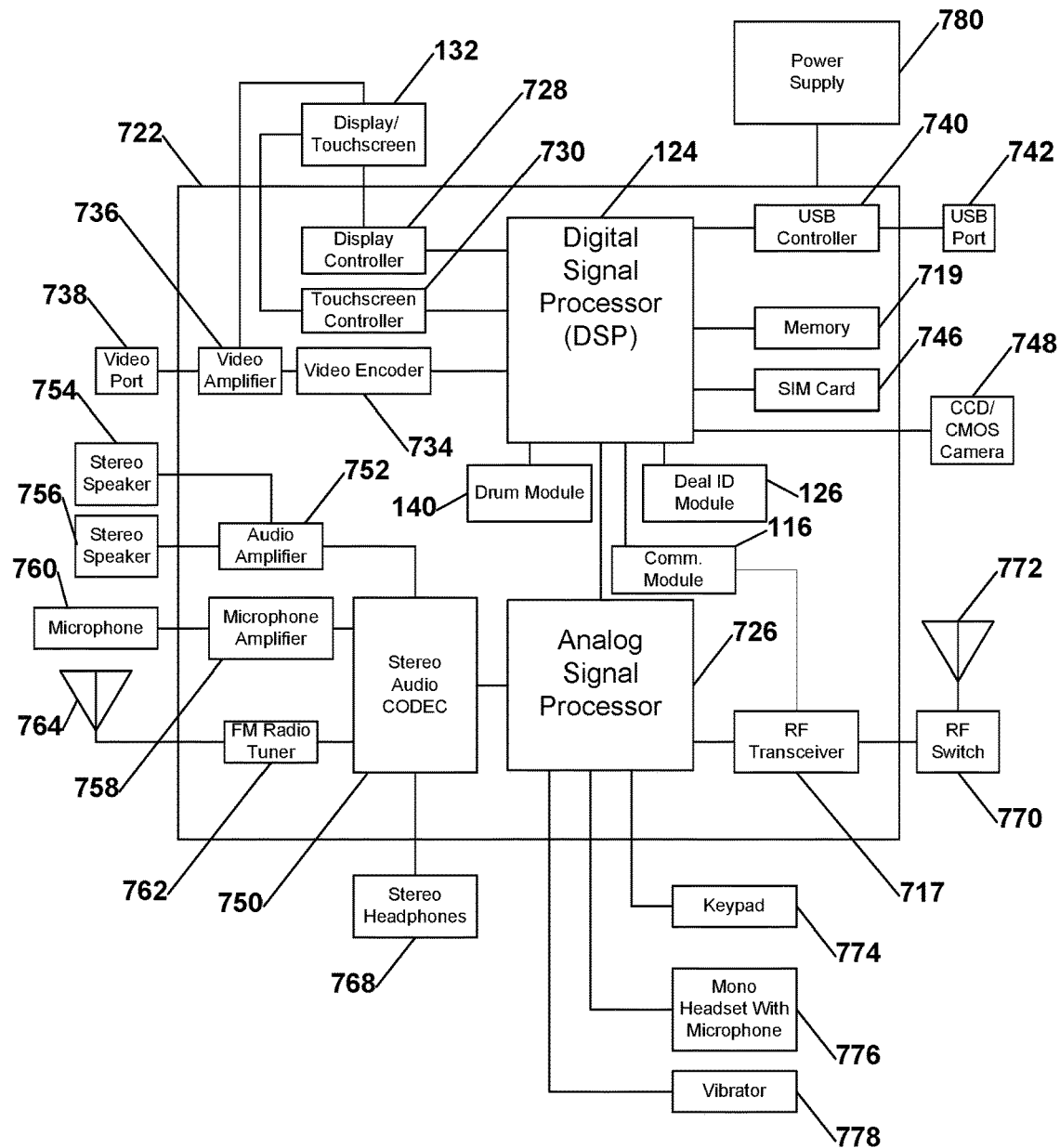
FIG. 7 is a diagram of an exemplary, non-limiting aspect of a personal computing device ("PCD") comprising a wireless telephone that corresponds with FIG. 1 and FIG. 2.

FIG. 7 is a diagram of an exemplary, non-limiting aspect of a personal computing device ("PCD") comprising a wireless telephone that corresponds with FIG. 1 and FIG. 2. As shown, the PCD 110 includes an on-chip system 722 that includes a digital signal processor 124 and an analog signal processor 726 that are coupled together. As illustrated in FIG. 7, a display controller 728 and a touchscreen controller 730 are coupled to the digital signal processor 124. A touchscreen display 132 external to the on-chip system 722 is coupled to the display controller 728 and the touchscreen controller 730.

FIG. 7 further indicates that a video encoder 734, e.g., a phase-alternating line ("PAL") encoder, a sequential couleur avec memoire ("SECAM") encoder, a national television system(s) committee ("NTSC") encoder or any other video encoder, is coupled to the digital signal processor 124. Further, a video amplifier 736 is coupled to the video encoder 734 and the touchscreen display 132. A video port 738 is coupled to the video amplifier 736. A universal serial bus ("USB") controller 740 is coupled to the digital signal processor 724. Also, a USB port 742 is coupled to the USB controller 740. A memory 719 and a subscriber identity module ("SIM") card 746 may also be coupled to the digital signal processor 124. Further, a digital camera 748 may be coupled to the digital signal processor 124. In an exemplary aspect, the digital camera 748 is a charge-coupled device ("CCD") camera or a complementary metal-oxide semiconductor ("CMOS") camera.

As further illustrated in FIG. 7, a stereo audio CODEC 750 may be coupled to the analog signal processor 726. Moreover, an audio amplifier 752 may be coupled to the stereo audio CODEC 750. In an exemplary aspect, a first stereo speaker 754 and a second stereo speaker 756 are coupled to the audio amplifier 752. FIG. 7 shows that a microphone amplifier 758 may be also coupled to the stereo audio CODEC 750. Additionally, a microphone 760 may be coupled to the microphone amplifier 758. In a particular aspect, a frequency modulation ("FM") radio tuner 762 may be coupled to the stereo audio CODEC 750. Also, an FM antenna 764 is coupled to the FM radio tuner 762. Further, stereo headphones 768 may be coupled to the stereo audio CODEC 750.

FIG. 7 further indicates that a radio frequency ("RF") transceiver 717 may be coupled to the analog signal processor 726. An RF switch 770 may be coupled to the RF transceiver 717 and an RF antenna 772. As shown in FIG. 7, a keypad 774 may be coupled to the analog signal processor 726. Also, a mono headset with a microphone 776 may be coupled to the analog signal processor 726.

Further, a vibrator device 778 may be coupled to the analog signal processor 726. Also shown is that a power supply 780 may be coupled to the on-chip system 722. In a particular aspect, the power supply 780 is a direct current ("DC") power supply that provides power to the various components of the PCD 110 that require power. Further, in a particular aspect, the power supply is a rechargeable DC battery or a DC power supply that is derived from an alternating current ("AC") to DC transformer that is connected to an AC power source.

FIG. 7 also shows that the PCD 110 may include a deal ID module 126, a drum module 140 and a communications module 116. As described above, the deal ID module 126 and/or drum module 140 may be operable work with the RF antenna 772 and transceiver 717 to establish communication with drum service servers 105A, 105B and/or another PCD 110 and/or a POS 125.

As depicted in FIG. 7, the touchscreen display 132, the video port 738, the USB port 742, the camera 748, the first stereo speaker 754, the second stereo speaker 756, the microphone 760, the FM antenna 764, the stereo headphones 768, the RF switch 770, the RF antenna 772, the keypad 774, the mono headset 776, the vibrator 778, and the power supply 780 are external to the on-chip system 722.

In a particular aspect, one or more of the method steps described herein may be stored in the memory 719 as computer program instructions. These instructions may be executed by the digital signal processor 124, the analog signal processor 726, or another processor to perform the methods described herein. Further, the processors 124, 726, the memory 719, the instructions stored therein, or a combination thereof may serve as a means for performing one or more of the method steps described herein.

While embodiments have been described as operating within the realm of the Internet or world-wide networking, it should also be appreciated that the realm of operation can be limited. For example, a virtual network could be established to define the realm in which the drum system operates. Thus, a company, group of companies, or other entities or groups of entities may define or establish a private network in which the drum components operate. Thus, within this private network, the drum components can operate as described herein but once a device exits that network or is disconnected from that network, it is no longer active in the system. Advantageously, this aspect that can be incorporated into various embodiments, can be utilized to localize the operation of the drum system, either geographically or electronically. As a non-limiting example, a network can be established in a physical realm, such as a shopping center, a concert venue, an area of town, etc. Within that network, the drum system can be setup to service customers that are within that physical realm. Thus, benefits can be restricted based on the geographic realm, drummers can be limited to benefits within that geographic realm and customers that are within the geographic realm can receive the benefits. In some embodiments, a drummer may be long to multiple realms but benefits that are made available to customer within a particular realm can be limited to benefits associated with that realm. Other realms may also be established that are not physical in nature. For example, realms can be based on gender, age, ethnicity, language, education level, interests, and any and all other demographics.

In some embodiments, the Buyer application may include a do-not-disturb function, or a drum-free mode. Once this mode is invoked, the buyer can be free from receiving push notifications or other alerts or drum related activity. Similarly, the drummer application can also include such a feature to enable the Drummer to go offline for a period of time. Another technique to enable this feature is to provide the ability to create a drum free zone. For example, if the user is within a WIFI zone, the application may allow the user to define that particular WIFI zone as a drum free zone. Thus, if the user connects their mobile device to that particular WIFI network, then all drum activity can be blocked, but if the user switches to a different WIFI network or to a mobile network, then the drum activity can be resumed.

As previously described, the merchants receive compensation from the sell or conversion of the benefit. The Buyers, upon a conversion, then receive the benefit. What remains then is the allocation and provision of a commission to the Drummer. While various embodiments can be configured to award commissions in different manners, a non-limiting example of a Drummer commission schedule is presented herein as an illustration.

The Drummer commission rules may be based on the activity and success rate of the Drummer, which results in conversions. When a conversion occurs, a value is received from the Buyer in exchange for the benefit delivered to the Buyer. Of this value, a percentage or flat fee is received as a Drum Payment with the rest of the proceeds going to the benefit provider. The Drum Payment is then allocated to one or more Drummers and to the Drum System hosting entity. The Drummer receives a percentage of the Drum Payment as compensation or commission for the activity of the Drummer. The Drummer activity can include conversions that occur directly by the actions of the Drummer, conversions related to benefits provided by businesses that have been signed on by the Drummer, conversions related to benefits obtained by Buyers that the Drummer signed up for service, conversions by a second tier Drummer (Drummer B) that was signed on by a first tier Drummer (Drummer A) and conversion by a third tier Drummer (Drummer C) that was signed on by one of the first tier Drummer's second tier Drummers. For instance, the general commission rules can be broken down as follows:

Drummer promotes an offer or benefit—Drummer earns Commission Percentage of the Drum Payment Drummer Signs a business—Drummer earns Business Sign-On Percentage of all Drum Payments for that Business for a Business Sign-On Period Drummer signs a buyer—Drummer earns Buyer Sign-On Percentage of all Drum Payments from that Buyer for a Buyer Sign-On Period Further, if Drummer A signs up a second tier Drummer (Drummer B) who in turn signs up a third tier Drummer (Drummer C), the commission rules can be broken down as follows:

Drummer A earns Second Tier Compensation from Drummer B's activity

Drummer A earns Third Tier Compensation from Drummer C's activity.

These rules can be applied in several manners for calculating the exact compensation that is due. For example, each of the percentages (Commission Percentage, Business Sign-On Percentage and Buyer Sign-On Percentage) may be fixed values in one embodiment, but could be an escalating or decaying value, a value limited for a period of time, a variable value depending on the volume of conversions, etc. In one exemplary embodiment, the percentages are fixed values and assigned as follows, as a non-limiting example:

Commission Percentage=40% in perpetuity

Business Sign-On Percentage=5% for 24 months

Buyer Sign-On Percentage—3% for 24 months

For the multi-tiered compensation, the Drummer A may earn or be allocated a portion of the percentage received by Drummer B and/or Drummer C, or Drummer A's compensation may related back to the Drum Payment directly. For example, if Drummer B attains a conversion, in the example provided above, Drummer B would receive 40% of the Drum Payment. Depending on the embodiment, Drummer A may receive a portion of this 40%, or a portion of the Drum Payment without impacting Drummer B's commission, or a combination of both. Likewise, if Drummer C attains a conversion, Drummer B could be compensated similarly how Drummer A is compensated for Drummer B activity. Then Drummer A could receive a portion of what Drummer B receives, a portion of what Drummer C receives, a portion of the Drum Payment, or a combination of any of these. In one exemplary embodiment, the allocations are made as follows, as a non-limiting example:

Drummer A receives 15% of Drum Payments received that are associated with Drummer B conversions for a period of 24 months Drummer A receives 15% of what Drummer B earns for Drummer C conversions for a period of 24 months It should be appreciated that the payments that are brought into the drummer network may be based on a percentage of the price the merchant sets for a deal, or it may be a fixed amount for all deals or a fixed amount based on the deal. It should also be appreciated that a hybrid of two or more of these techniques for determining compensation to the drummer system. For the purposes of clarity, a few examples are provided.

Figure 11:
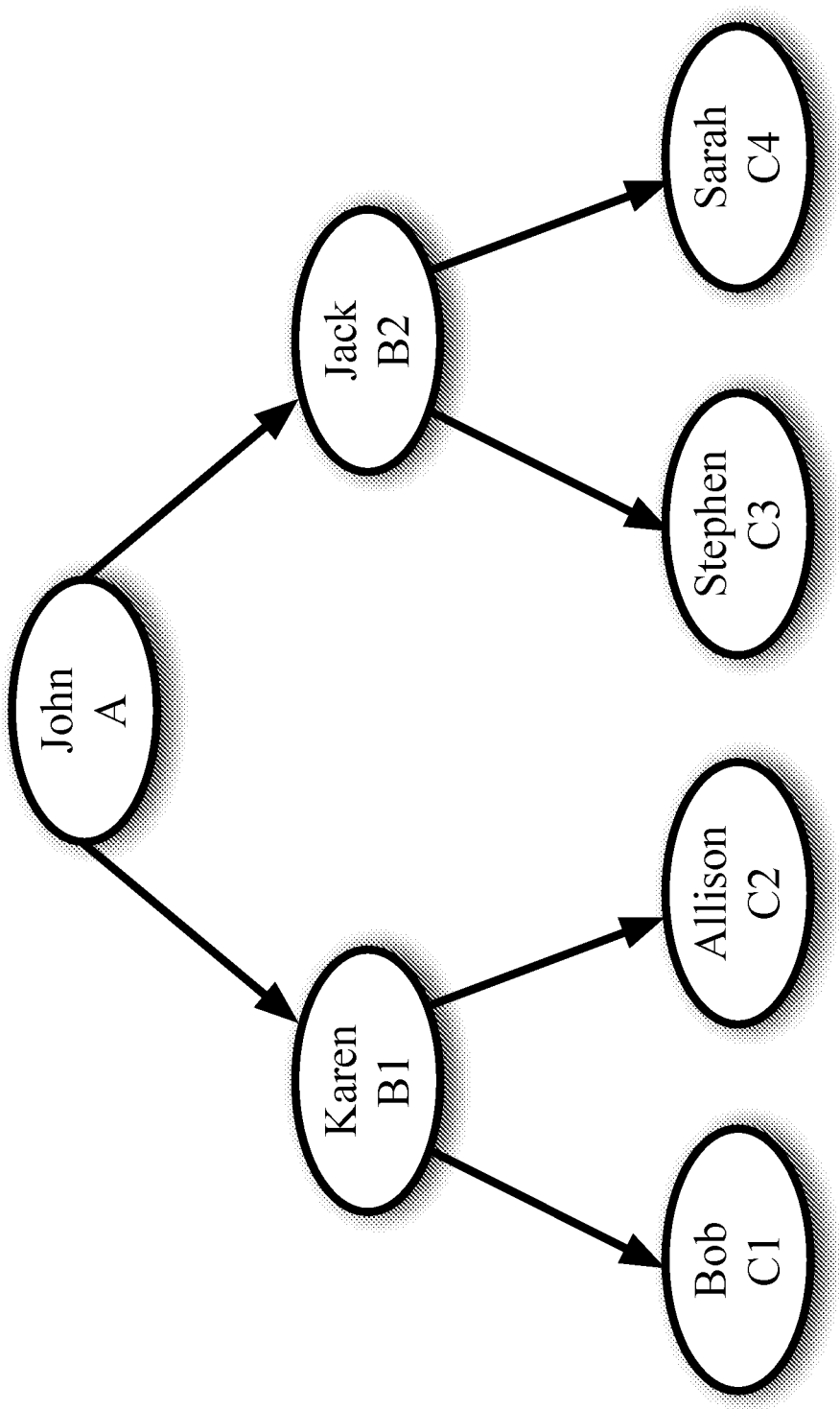
FIG. 11 is a Drummer hierarchical chart.

FIG. 11 is a hierarchical chart of an example in which John is a Drummer and he signs Karen and Jack as Drummers. John would be considered Drummer A and Karen and Jack would be Drummers B1 and Drummer B2 respectively. Karan signs Bob and Allison as Drummers. Bob would be Drummer C1 and Allison would be Drummer C2. Jack signs Stephen and Sarah as Drummers. Stephen would be Drummer C3 and Sarah would be Drummer C4. The following table illustrates how the compensation would be distributed between the various Drummers under a particular scenario of activities for a week and based on the specific non-limiting above-provided example of compensation rules. In the presented example, the earnings for tiered Drummers is based on a percentage of the lower level Drummer's commission.

| Drummer Activity | Drum Payments For Week | Percentage | Earned by John |
|---|---|---|---|
| Sarah C4 | | | |
| Offer Redeemed | $ 450 | 40% | $180.00 |
| Signed business(s) | $ 320 | 5% | $ 16.00 |
| Signed buyer(s) | $ 900 | 3% | $ 27.00 |
| Totals Sarah C4 | $1670 | | $223.00 |
| Stephen C3 | | | |
| Offer Redeemed | $ 60 | 40% | $ 24.00 |
| Signed business(s) | $ 0 | 5% | $ 0.00 |
| Signed buyer(s) | $ 45 | 3% | $ 1.35 |
| Totals Stephen C3 | $ 105 | | $ 25.35 |
| Allison C2 | | | |
| Offer Redeemed | $ 40 | 40% | $ 16.00 |
| Signed business(s) | $ 0 | 5% | $ 0.00 |
| Signed buyer(s) | $ 0 | 3% | $ 0.00 |
| Totals Alison C2 | $ 40 | | $ 16.00 |
| Bob C1 | | | |
| Offer Redeemed | $ 100 | 40% | $ 40.00 |
| Signed business(s) | $ 300 | 5% | $ 15.00 |
| Signed buyer(s) | $ 200 | 3% | $ 6.00 |
| Totals Bob C1 | $ 600 | | $ 61.00 |
| Jack B2 | | | |
| Offer Redeemed | $ 800 | 40% | $320.00 |
| Signed business(s) | $1200 | 5% | $ 60.00 |
| Signed buyer(s) | $2000 | 3% | $ 60.00 |
| Drummer C3 Earnings | 25.35 | 15% | $ 3.80 |
| Drummer C4 Earnings | 223 | 15% | $ 33.45 |
| Totals Jack B2 | $4248.35 | | $477.25 |
| Karen B1 | | | |
| Offer Redeemed | $ 400 | 40% | $160.00 |
| Signed business(s) | $ 800 | 5% | $ 40.00 |
| Sign buyer(s) | $ 900 | 3% | $ 27.00 |
| Drummer C1 Earnings | $ 61 | 15% | $ 9.15 |
| Drummer C2 Earnings | $ 16 | 15% | $ 2.40 |
| Totals Karen B1 | $2477 | | $238.55 |
| John A | | | |
| Offer Redeemed | $ 300 | 40% | $120.00 |
| Signed business(s) | $1200 | 5% | $ 60.00 |
| Sign buyer(s) | $ 900 | 3% | $ 27.00 |
| Drummer B1 Earnings | $ 227 | 15% | $ 34.05 |
| Drummer B2 Earnings | $ 440 | 15% | $ 66.00 |
| Drummer B1 Earnings From C1 | $ 9.15 | 15% | $ 1.37 |
| Drummer B1 Earnings From C2 | $ 2.40 | 15% | $ 0.36 |
| Drummer B2 Earnings From C3 | $ 3.80 | 15% | $ 0.57 |
| Drummer B2 Earnings from C4 | $ 33.45 | 15% | $ 5.01 |
| Totals John A | $3115.80 | | $314.36 |

Thus, it can be appreciated that the structure of the drum system can provide compensation to the drummer in a variety of manners. In an exemplary embodiment, a Drummer is awarded from activity associated with recruited Drummers down two levels from the Drummer. However, in other embodiments, it will be appreciated that more or fewer levels can be considered in the compensation schema. The various percentages, time periods and values can change from embodiment to embodiment and even over time within a single embodiment.

Figure 12:
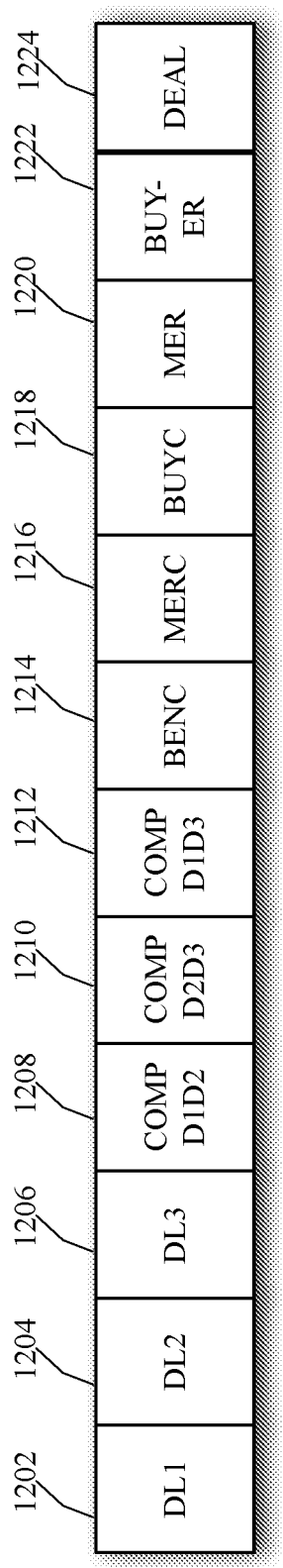
FIG. 12 is a non-limiting example of a coding system that could then be converted into any type of an indicia, such as a QR code.

FIG. 12 is a non-limiting example of a coding system that could be utilized in an exemplary embodiment and converted into any type of an indicia, such as a QR code, bar code, etc. It will be appreciated that the use of unique codes can be used to encode the compensation structure for each deal or benefit converted. This can be done in a variety of manners including hash functions, binary encoding, or other techniques known to those skilled in the art. In the illustrated embodiment, 11 fields are shown as defining the entire compensation structure and deal structure (it should be appreciated that not all fields are used in all embodiments and some embodiments may include different or alternative fields). The fields are defined as follows:

DL1 1202—this field is used to identify the level 1 Drummer

DL2 1204—this field is used to identify the level 2 Drummer

DL3 1206—this field is used to identify the level 3 Drummer

It should be appreciated that for each deal, in a three-tiered compensation system, one to three drummers may be involved. In an n-tiered system, there would be n fields for identifying the Drummers. When one of the Drummer ID fields is set to a null value, it is indicative that that Drummer level is not involved in the deal. For instance, if DL1 contains a valid ID value but DL2 and DL3 are set to null, then the current deal is being offered directly by the level 1 Drummer. Likewise, if DL1 and DL2 contain valid ID values but DL3 is set to a null, then the current deal is being converted by a level 2 Drummer and compensation needs to be attributed to the DL1 as well. If all three DL fields contain valid ID values, then compensation is attributed to DL1, DL2 and DL3.

COMPD1D2 1208—this field defines the percentage of DL2 compensation that is to go to DL1 and the expiration date or period of time that the payments are made COMPD2D3 1210—this field defines the percentage of DL3 compensation that is to go to DL2 and the expiration date or period of time that the payments are made COMPD1D3 1212—this field defines the percentage of DL3 compensation that is received by DL2 that is to go to DL1 and the expiration date or period of time that the payments are made BENC 1214—this field defines the percentage of the Drum Payment that is to go to the primary Drummer (the primary Drummer is the last DL field defined before a null or DL3)

MERC 1216—this field defines the percentage of the Drum Payment that is to go to the signing Drummer and also includes an identifier of DL1, DL2, DL3 or null depending on if one of the Drummers involved in the deal also signed on the merchant involved in the deal BUYC 1218—this field defines the percentage of the Drum Payment that is to go to the signing Drummer and also includes an identifier of DL1, DL2, DL3 or null depending on if one of the Drummers involved in the deal also signed on the Buyer involved in the deal MER 1220—this field is used to identify the merchant involved in the deal BUYER 1222—this field is used to identify the Buyer DEAL 1224—this field is used to identify the deal, such as the Drum Payment that is to be extracted from the conversion value, the identification of the benefit and delivery information for the sameThus, it should be appreciated that the fields of the deal identification can easily be filled in by initializing the entire record to all 1's and then AND'ing in the applicable values. For instance, if DL1 is a value of hexadecimal 3A, then it can be AND'd into the DL1 field. Those skilled in the art will understand that the record could also be initialized to all 0's and the values could be OR'd into the record. Thus, once the record is complete, it can be converted into any form of representation, including a bar code, a QR code, a text string, etc. Advantageously, it should be appreciated that such a structure can completely define the compensation structure of the deal. Thus, this functionality can actually be used to define custom compensation structures for every deal. Thus, one class of deal may result in one set of compensation percentages while another class of deal may have a different set of compensation percentages. Likewise, compensation can be structured differently for different classes of merchants, drummers, buyers, products, etc.

Figure 8:
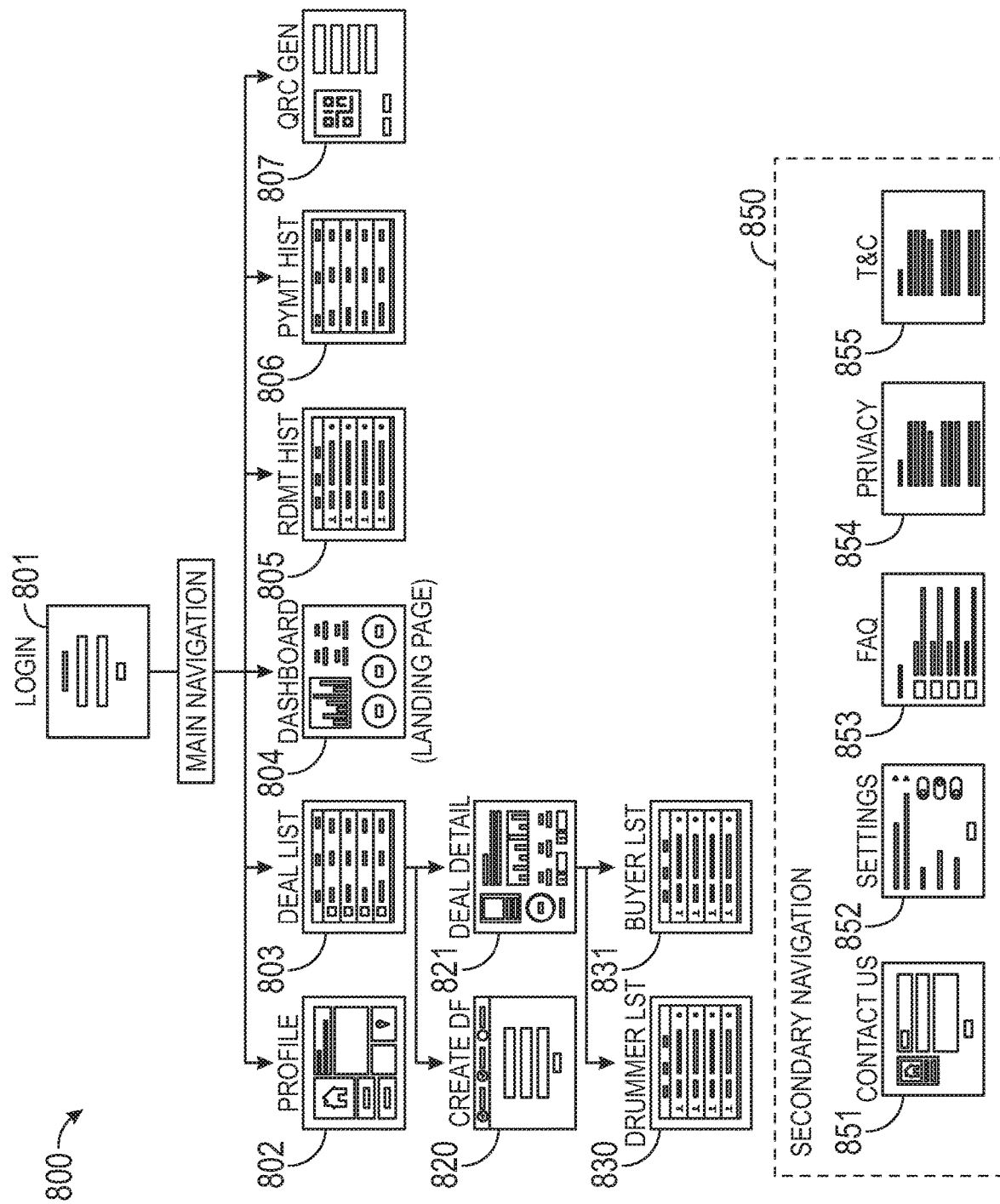
FIG. 8 is a diagram of an exemplary general flow of the business or merchant application.
Figure 8B:
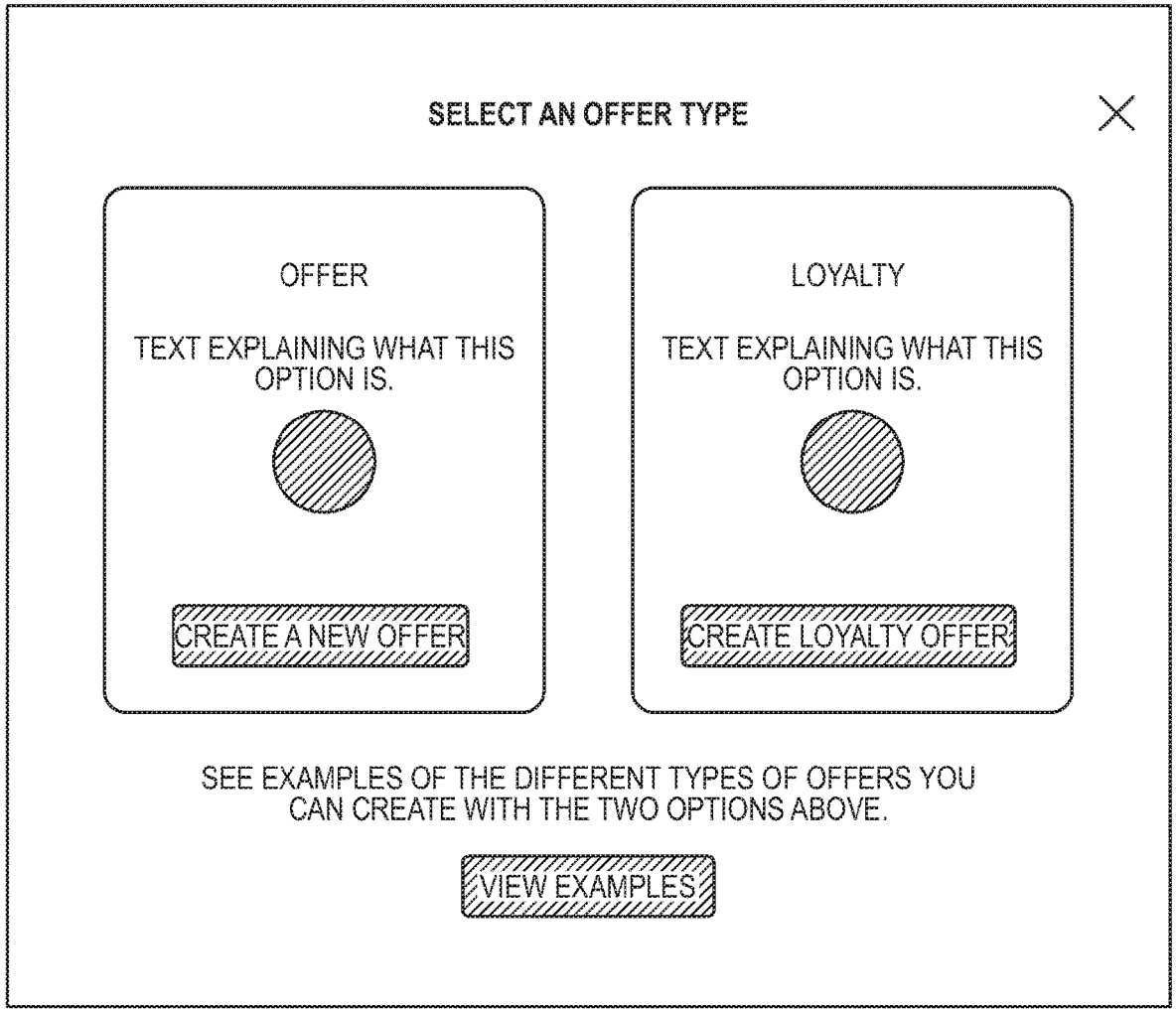
FIGS. 8A-8P are exemplary screens that could be displayed by the exemplary business application of FIG. 8.
Figure 8C:
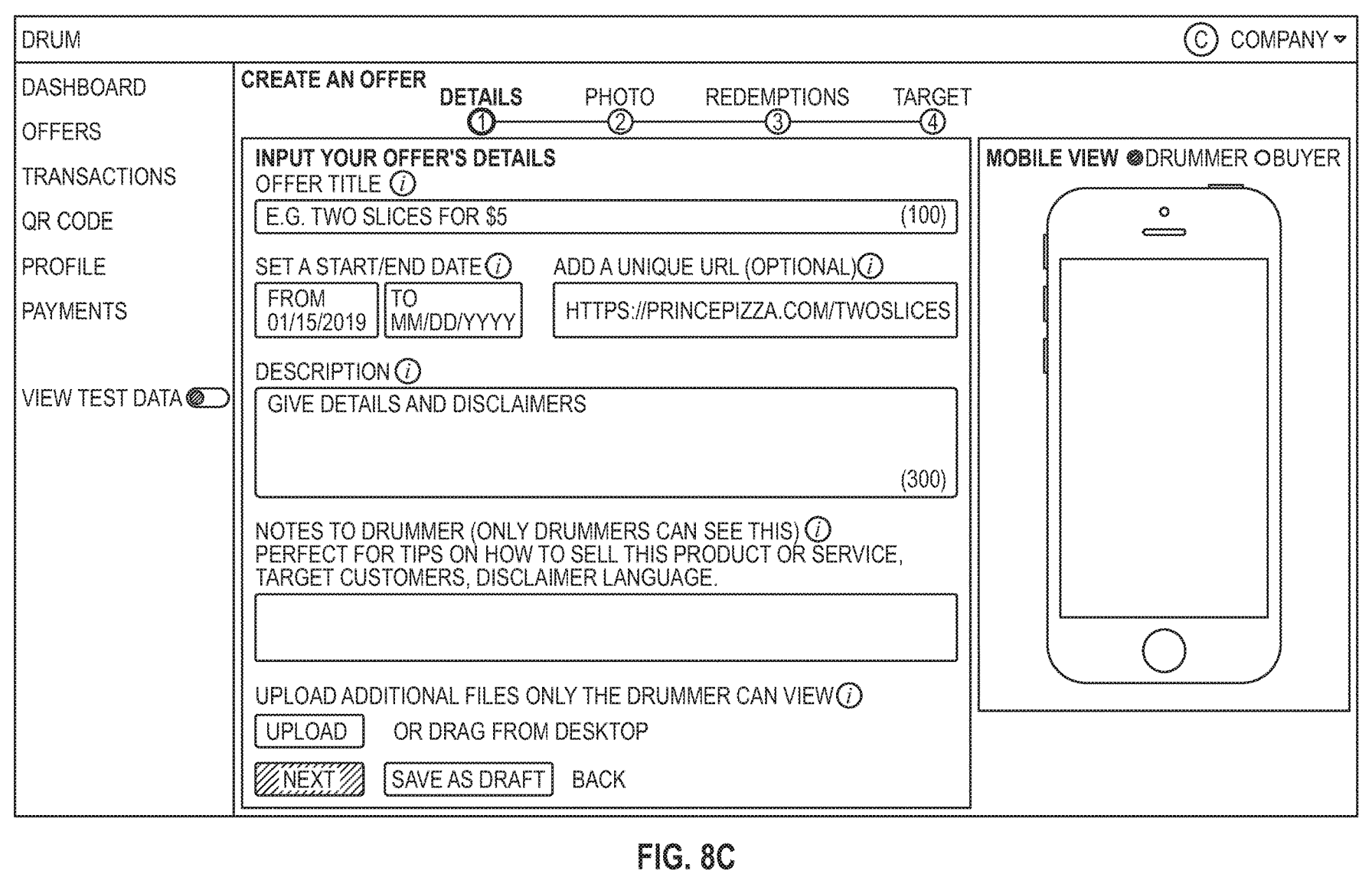
Figure 8D:
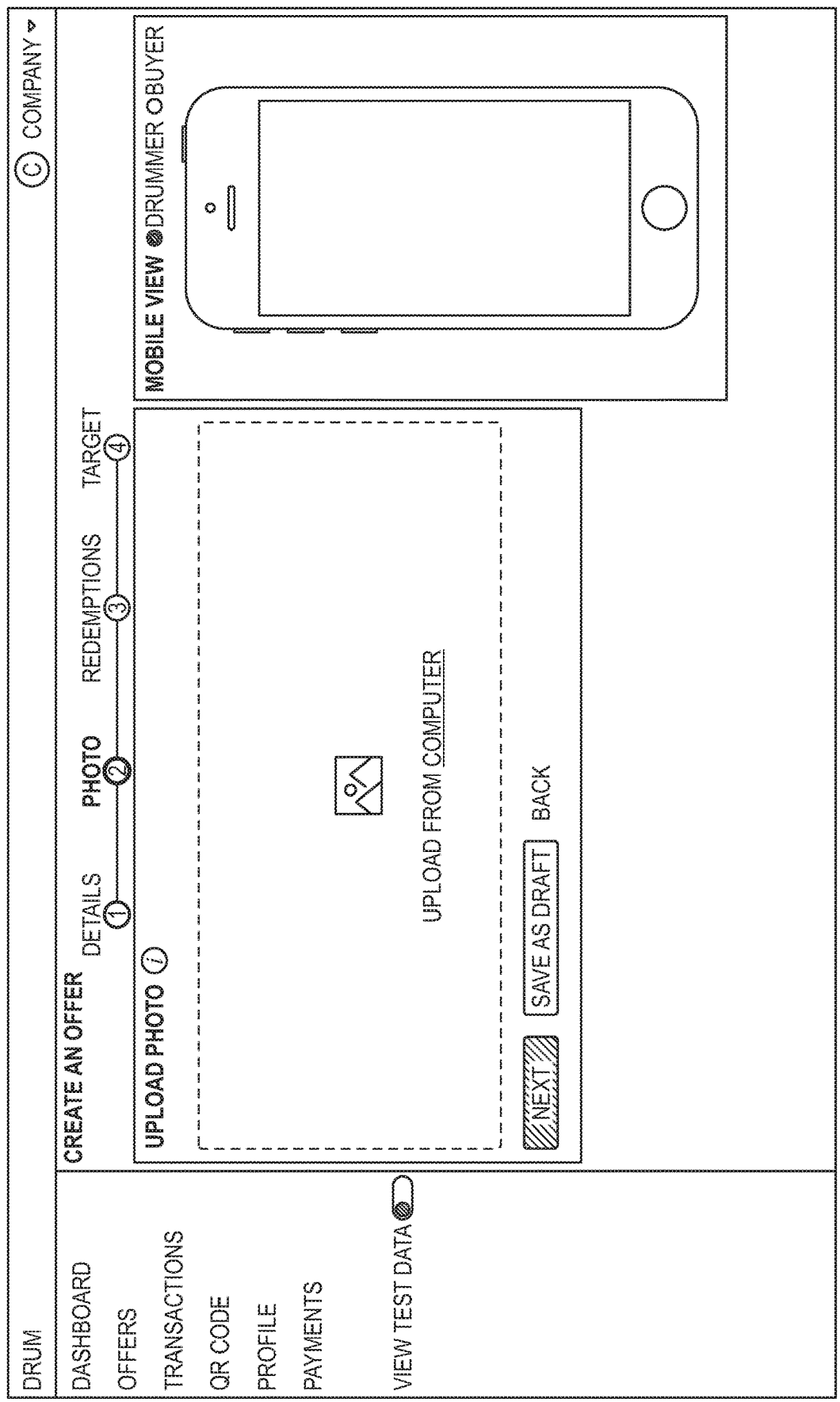
Figure 8E:
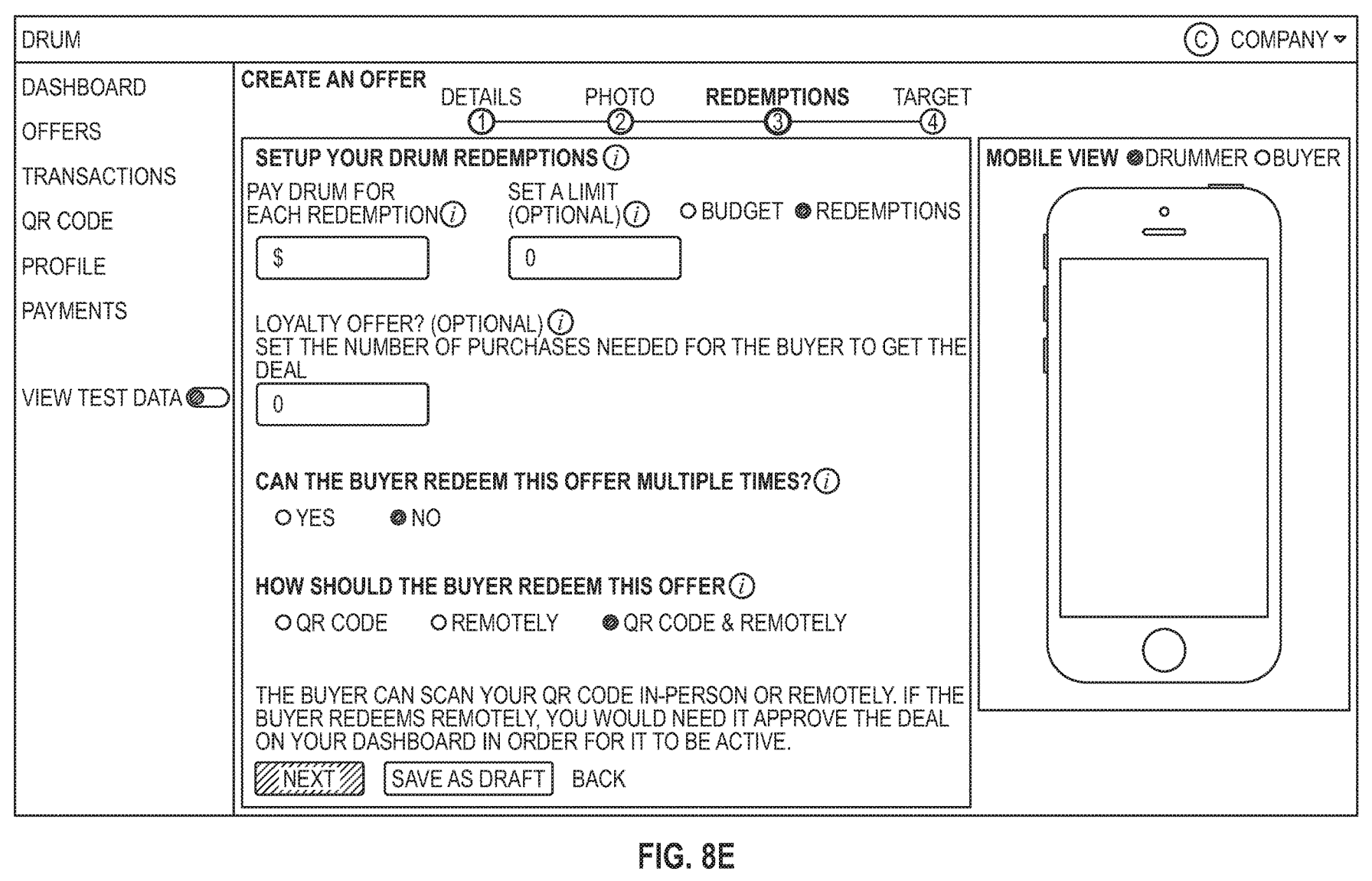
Figure 9:
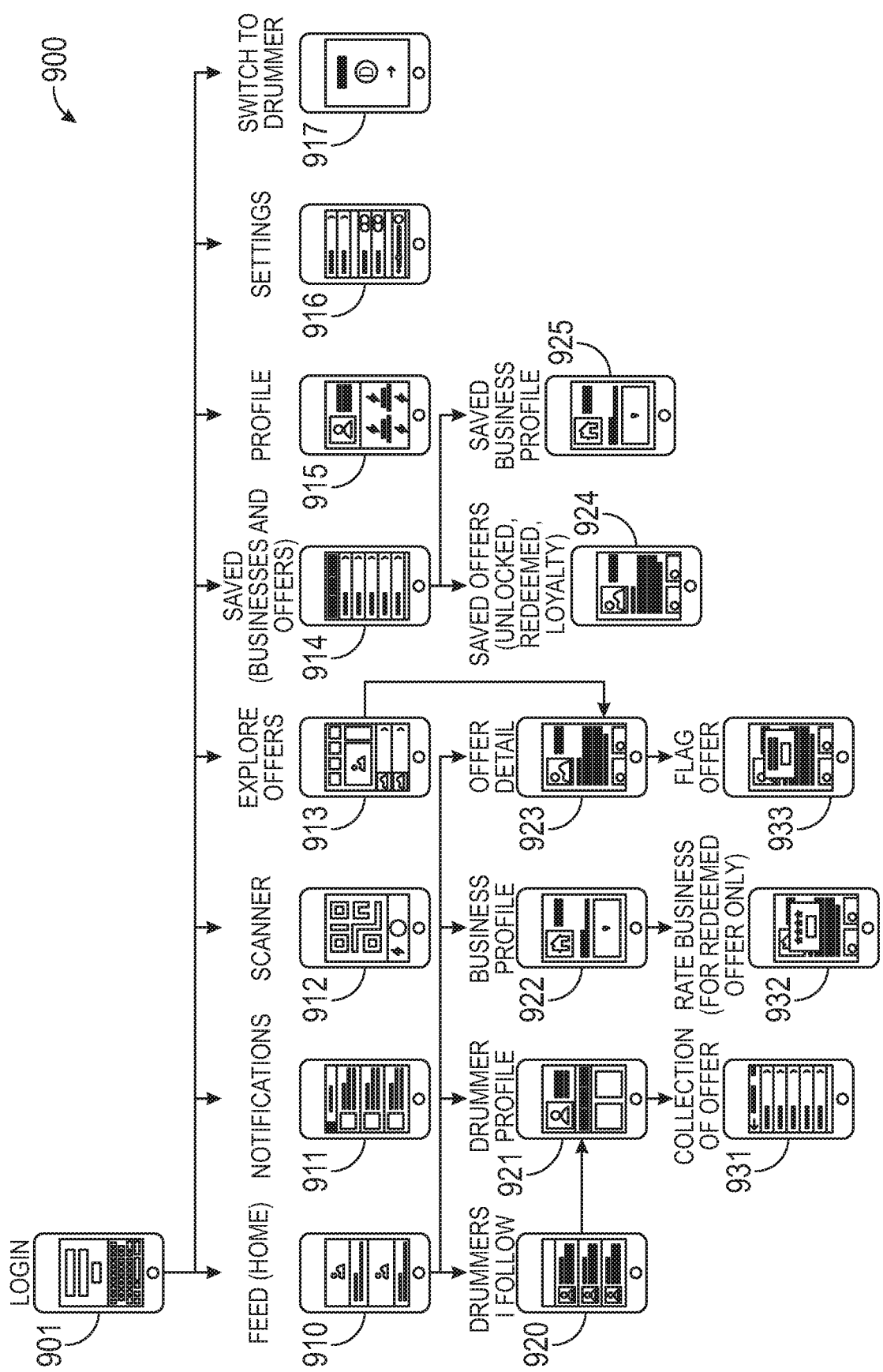
FIG. 9 is a diagram of an exemplary general flow of the buyer application.
Figure 10:
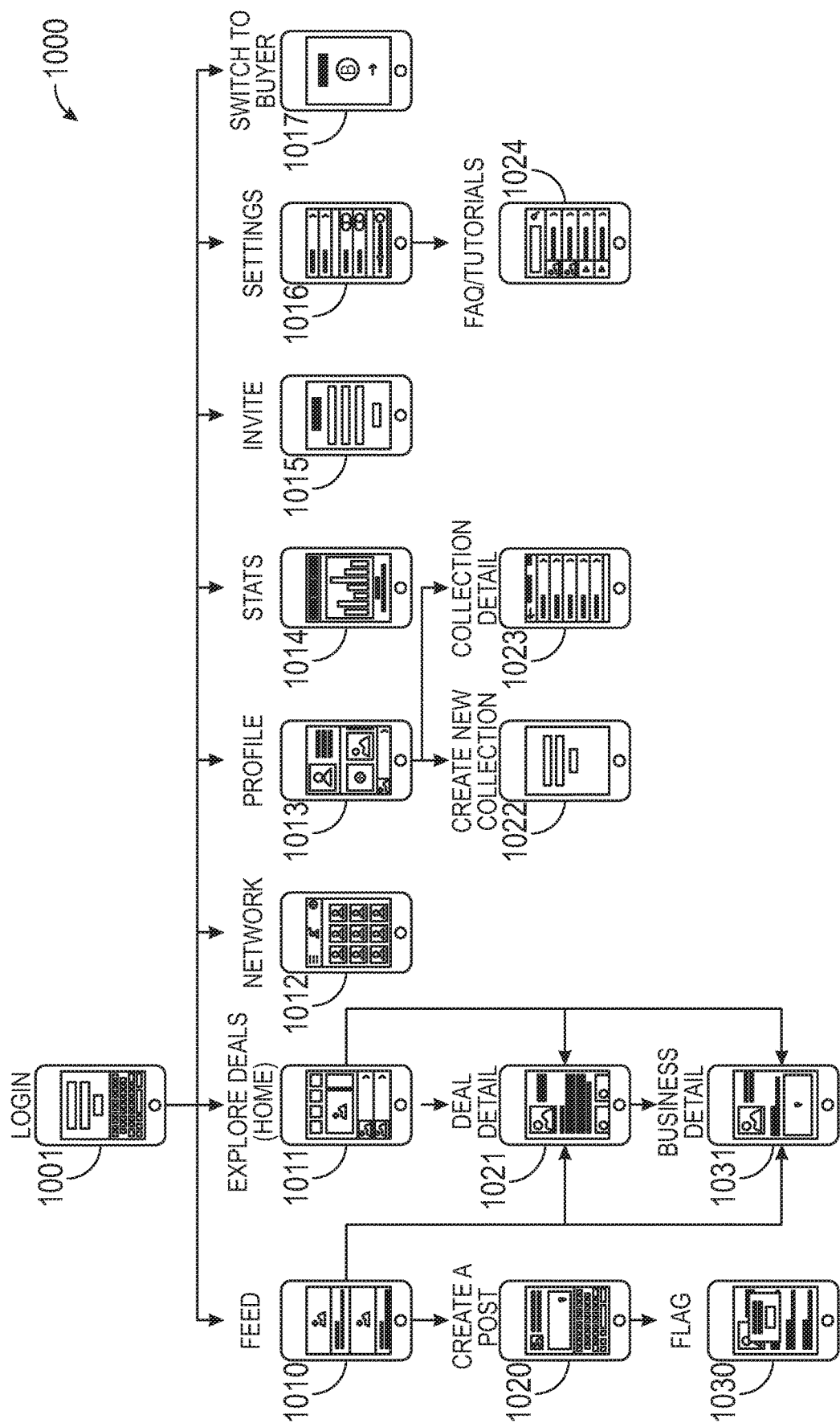
FIG. 10 is a diagram of an exemplary general flow of the drummer application.

As those skilled in the relevant art will appreciate, the above described features, aspects and operations could be implemented in a variety of manners. FIG. 8-10 are utilized to illustrate the flow operation of an exemplary embodiment, from a user's perspective, using mobile applications to implement the functionality. In the illustrated embodiment, the general flow of the three main components are illustrated—the business or merchant app, the buyer app and the drummer app.

Referring to FIG. 8, the general flow of the business or merchant app is illustrated. The merchant app 800, is user specific and thus, requires a user login 801 to grant access to the system by the merchant. The login access operates to ensure that merchant specific information is available and presented to the merchant logging in to the system and, offers protection of the system and system data against adversarial forces.

Once the merchant has successfully entered login 801 credentials, the merchant is presented with the main navigation screens. The user can scroll between these screens by swiping his or her finger, actuating a navigation arrow or other indicia, using a pull down menu or the like. The main navigation screens are illustrated as including the following screens: Profile 802, Deal List 803, Dashboard or landing page 804, Redemption History 805, Payment History 806 and Generation of QR Code 807.

The Profile 802 screen allows the merchant to view, edit, change, delete, post, etc. various forms of information. A few non-limiting examples of the type of information and operation of the Profile 802 screen are presented in the remainder of this paragraph. The Profile 802 presents an interface to present one or more active pictures to the merchant, and gives the merchant the ability to upload additional pictures, photos, graphic files, etc. The uploads may include any of a variety of file types, including but not limited to, PNG, GIF, JPEG, PDF, CSV, WAV, etc. The interface may also allow the merchant to select and drag the uploaded items to particular slots that correspond to particular functions. For instance, one slot may be the cover photo, another slot may be for a particular deal, another slot may be for a directions function, etc. The Profile 802 screen may also include an interface to enable the merchant to enter primary contact information, such as the name, address, email address, phone number, picture, etc. of the primary contact for the merchant.

The Profile 802 screen provides the ability for the merchant to identify and activate particular payment techniques. For instance, the merchant can include one payment technique that is used when the merchant has to pay for services provided by the system. Another payment technique may be entered for receiving payment from the system. The Profile 802 interface allows the merchant to include one or multiple payment provision and reception techniques and to activate the desired techniques. Thus, the Profile 802 may allow the merchant to link to VENMO, ZELLE or PAYPAL, enter credit or debit card information, enter banking account information, enter billing address information, etc. The Profile 802 also includes an interface for the merchant to enter and/or edit specific information pertaining to the merchant. This information may include, but is not limited to: the name, phone number, email address and website of a merchant and the ability to select a category to identify the general characteristics of the merchant. The Profile 802 also allows the merchant to enter one or more business addresses and identify business specific information related to the addresses (i.e., such as multiple locations of a particular merchant). The merchant can also utilize the Profile 802 interface to enter a business description and optionally, a note to drummers regarding the merchant, the offers or just general information.

Another aspect of the Profile 802 is an interface to enable a merchant to enter store hours or operating hours. The Profile 802 may also include an input interface to allow the merchant to provide other information to buyers and drummers, such as the privacy policy of the merchant and regulation adherences and/or warranties of the merchant. The Profile 802 screen may allow the merchant to display and/or edit any of the above-identified information as well as other information, to change the contact information for the merchant and to update the merchant's account, such as changing the user name, password, etc.

The main navigation screen is also illustrated as including a Deal List 803. The Deal List 803 can present a list, thumbnails, etc. of deals that the merchant is offering, has offered in the past, or is in the process of creating for a future offering. In a non-limiting example, the Deal List 803 screen can present each of the three categories of deals as individual thumbnails with a categorization indicium for each one to distinguish if the thumbnail represents an active deal, an inactive deal or a deal that is being created or is scheduled for being offered. FIG. 8A is an exemplary screen that may serve as the Deal List 803. The exemplary screen illustrates a list of deals, and for each deal, the exemplary Deal List 803 includes the start date, expiration date, budget associated with the deal and the status. FIG. 8A also illustrates that the merchant has the ability to edit, copy, pause, archive and delete the deal via a drop down menu or to create an offer or deal by actuating a button.

The main navigation screen may also include a Dashboard 804 (landing page) screen. If the merchant selects a function to create a new deal, the screen may transition to the Create Deal Flow 820, which may include a series of screens, prompts and questions to assist the merchant in defining a new deal. FIGS. 8B-8I present an exemplary example of a screen flow for the creation of a deal. Upon exiting the Create Deal Flow 820, a new thumbnail or list item would appear along with the status of the new deal (i.e., active, inactive, incomplete, etc.).

Figure 8K:
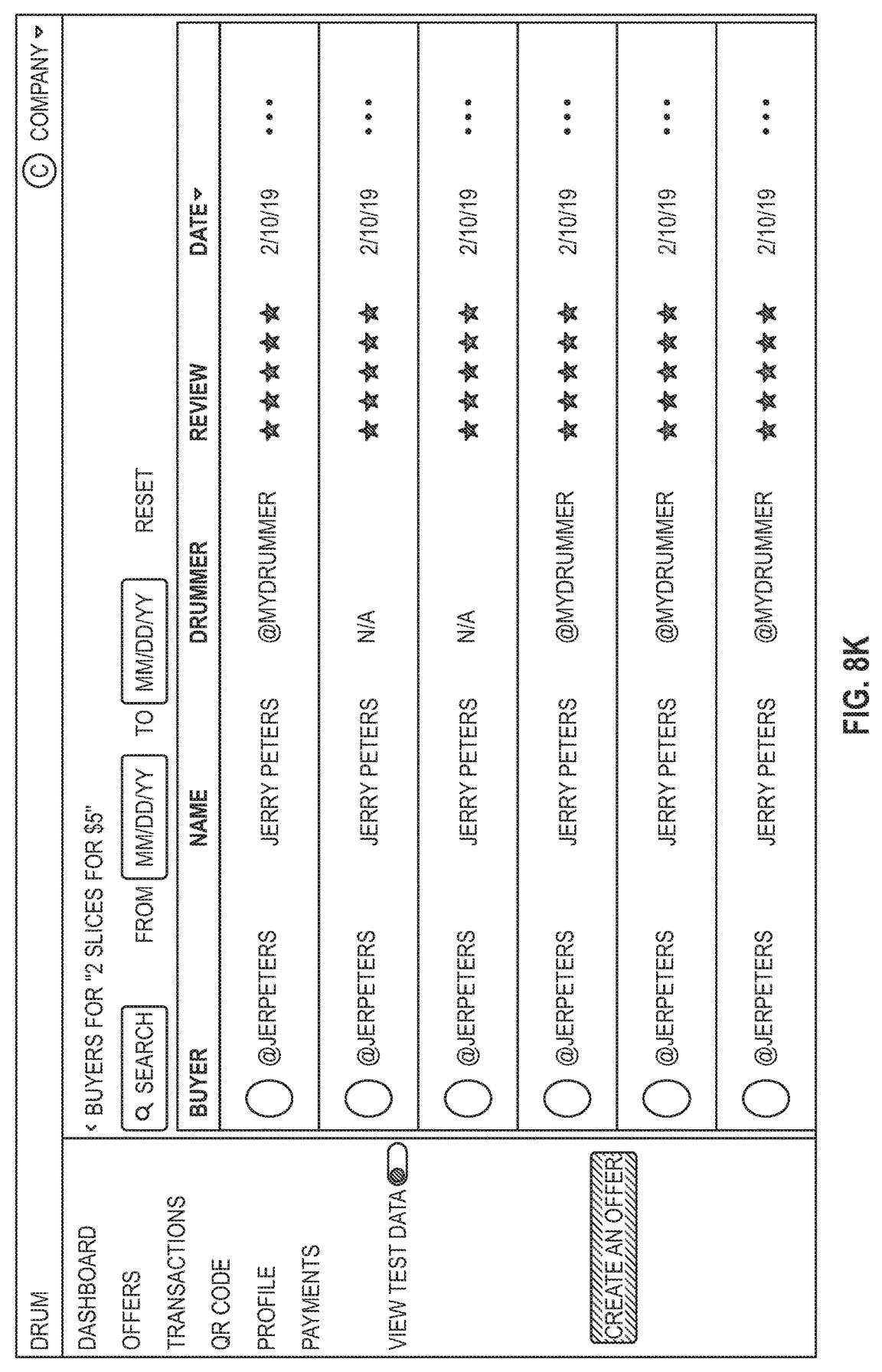

If the merchant selects a thumbnail or list item, the screen can transition to the Deal Detail 821 screen to present details about the specific deal, as well as to include the ability to edit the deal, schedule the offering of the deal, move the deal to being inactive, etc. As a non-limiting example, the detail screen for a deal may include detailed descriptions of the parameters of the deal, the dates and times the deal is active, any limitations associated with the deal, parameters of revenue available for drumming the deal, classes or categories of drummers that have access to the deal, statistics regarding the performance of the deal in the market, identification of most successful drummers related to the deal, targeted locations or demographics for the deal, etc. FIG. 8J is an exemplary screen that could be presented as the Deal Detail 821 screen. In addition, the Deal Detail 821 screen may include navigation buttons to view a Drummer List 830 or a Top Drummer List and a Buyer List 831. The Drummer List 830 may identify drummer activity related to the deal, such as the performance or number of conversions reached by each dealer, as well as categories of dealers that are allowed to have access to or promote the deal and those that cannot. The Drummer List 830 may also include the ability to send and receive messages from the drummers and identify revenue associated with the drummer, awards that have been achieved by the drummers, etc. FIG. 8K is a non-limiting example of a Drummer List 830 screen. The Buyer List 831 may identify parties that have been converted, parties that have been approached or have received information about the deal, parties that have rejected the deal, etc. In addition, the Buyer List 831 may include feedback or ratings by the buyer regarding the particular deal. Further, the Buyer List 831 may include information on how to contact the buyer or the ability to send a message to the buyer, such as similar deals that are available, new deals that are being offered or simply a thank you for the buyer's business. FIG. 8L is a non-limiting example of a Buyer List 831.

Figure 8M:
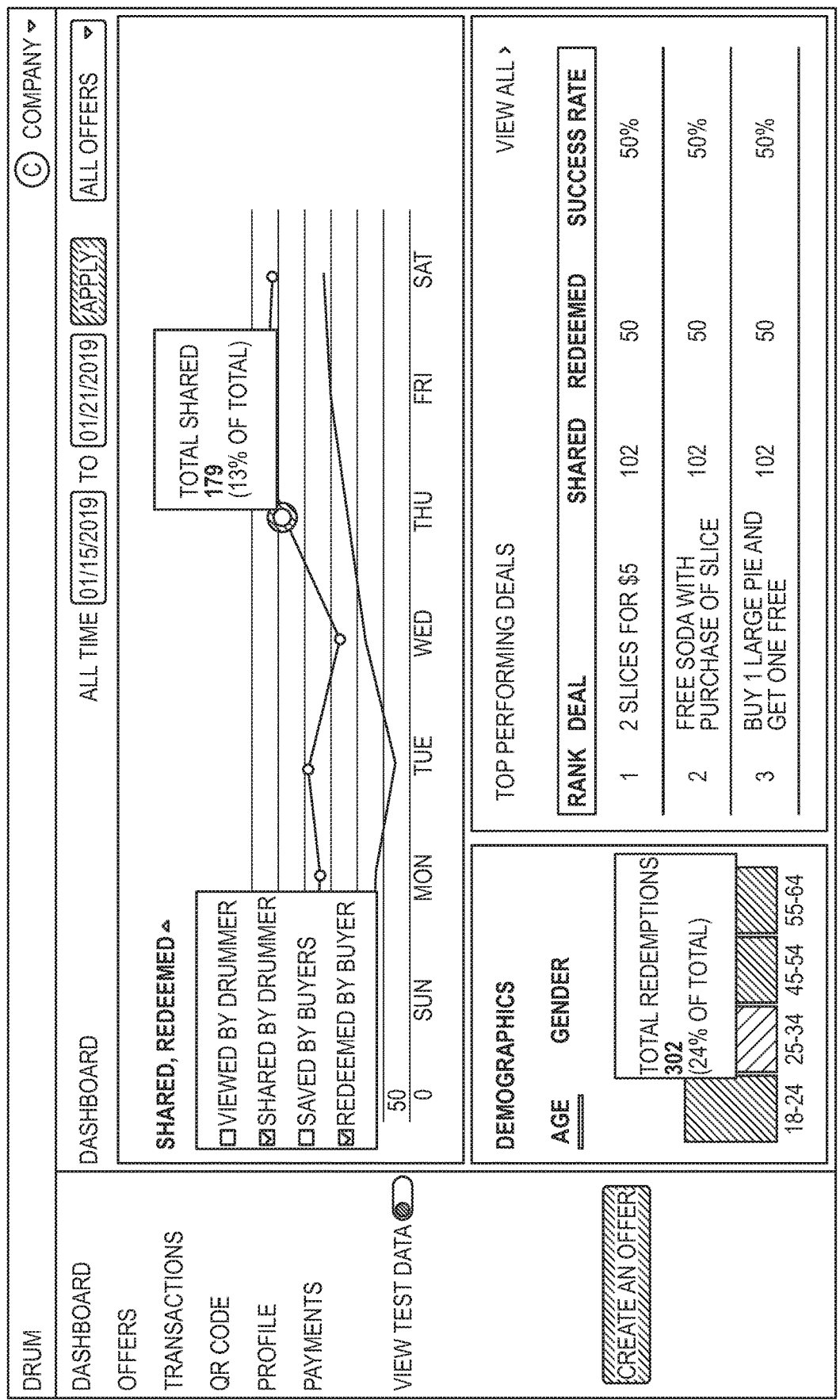

The main navigation may also include a Dashboard 804 (or landing page) screen. The Dashboard 804 can operate as a landing or home page for the merchant. The merchant can define the layout of the Dashboard 804 by selecting what is displayed, the location it is displayed and the size it is displayed. In addition, the Dashboard 804 provides links or buttons to access other features, flows or operations of the merchant app. As a few non-limiting examples, the Dashboard 804 may allow the merchant to select and display the top performing deals along with the number of times the deal has been shared, redeemed and the success rate, the top performing drummers, demographic settings that the merchant has selected, graphic analysis of the performance of a deal, demographic trends of most frequent buyers, etc. In addition, the Dashboard 805 may include the ability to select a date range for limiting or filtering of the displayed data and the ability to select certain offers or all offers to be represented in the data. Further, the Dashboard 804, as well as any of the other screens, may include links to other screens within the main navigation and/or one or more buttons to access certain features, such as one to create an offer. FIG. 8M is a non-limiting example of a Dashboard 805.

Figure 8N:

The main navigation includes a Redemption History/Status 805 screen. The Redemption History/Status 805 screen may present a list of transactions including the name of the buyer, the offer or parameters of the deal, the number of loyalty points attributed to the deal, the status of the deal and the date the deal was chosen by the buyer. Other information may also be included such as the manner in which the buyer selected the deal (i.e., QR Code, email, SMS, clicking a link, etc.). The status of each transaction may be in one of several states, including but not limited to, redeemed, approval needed and in drumroll (meaning the deal has been delivered or is in the process of being delivered). For each of the transactions that require approval, the merchant can be presented with a window or radial button, etc., to identify any updates in the status of the transaction, such as approved, denied, postponed, etc. FIG. 8N is a non-limiting example of a Redemption History 805 screen.

The main navigation may also include a Payment History 806 screen. The Payment History 806 screen could be used to enable a merchant to see a snap shot of the deals or offers that it currently has on the table. The merchant can filter the list of deals by time period, categories, length of run, minimum performance, etc. For example, the Payment History 806 could include a short description of the offer/deal, the amount of revenue that has been generated from the deal, the number of redemptions of the deal and the date the deal was offered, length of time it has run or the date it will expire. FIG. 8O is a non-limiting example of a Payment History 806 screen.

Figure 8P:
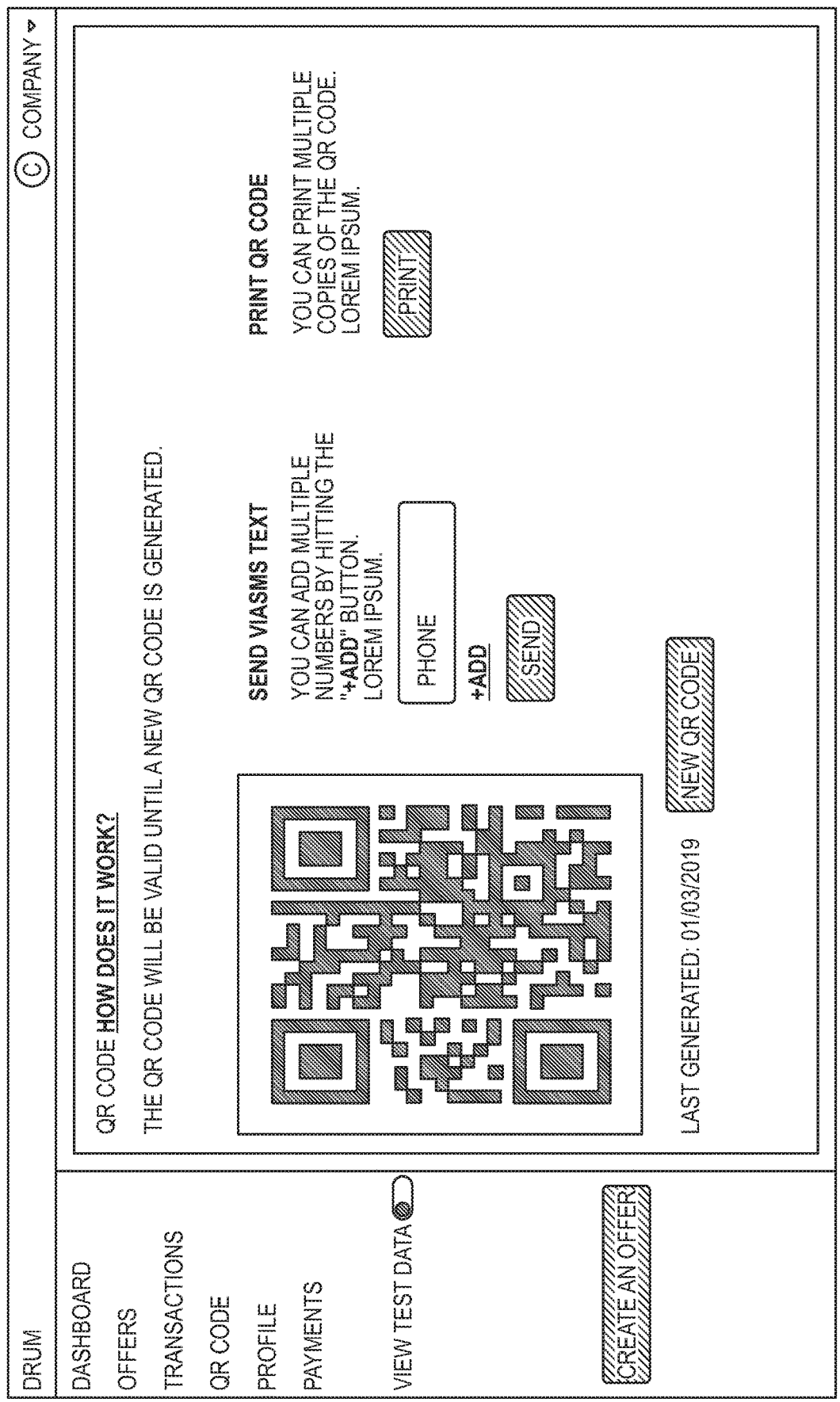

The main navigation also includes a QR Code Generator 807 screen. The QR Code Generator 807 screen may enable a merchant to select an already generated QR code and forward it to the drummer associated with the QR code and/or it may allow the merchant to generate a new QR code. As previously described, the QR code, or any unique link/code that is implemented in an embodiment, is created as, or embeds information including a combination of the specific deal that the merchant has created and the specific drummer that the deal can be offered through. It is important that each QR or link/code is associated with one deal and one drummer. The uniqueness of the QR code enables the operations of the system to be monitored and tracked. The money flow, compensation and payments to the merchants and drummers, in certain embodiments, hinges on the ability to track the convergence of each particular deal back to the drummer. Thus, each QR code or link/code that is generated, uniquely identifies the merchant that is offering the deal, the deal that is being offered and the drummer that is authorized to and has offered up and/or sold the deal to a buyer. As such, the QR code generator receives (or creates) a unique code that is associated with a particular drummer (or drummer grouping) and a unique code that is associated with a particular deal and a particular merchant offering the deal. These codes are then used in the generation of the QR code and are embedded in such a manner that enables the system to identify the drummer, deal and merchant. Thus, in some embodiments, the merchant can enter the identifier of the drummer into a field, and the identifier of the deal into another field and then actuate a QR generate button. In other embodiments, the merchant can simply select a drummer from a first list and a deal from a second list and then actuate a QR generate button. Other techniques may also be used and these techniques are simply presented as non-limiting examples. The QR Code Generator 807 screen may also allow the merchant to select a QR code and then enter the phone number of the intended drummer or drummer grouping. FIG. 8P is a non-limiting example of a QR Code Generator 807 screen. It should be appreciated that the QR Code, or other code or mechanism used to link or identify the drummer, the deal and the merchant can be generated as the result of various triggers. For instance, it has been described that the QR Code generator is actuated by the merchant selecting a deal and a drummer. In some embodiments, when a drummer views or picks up a deal to push, the QR Code generator may be triggered to create the QR Code and provide it to the drummer. In yet another embodiment, when a buyer hears about a deal or becomes interested because of the drummer's salesmanship, the buyer can approach the drummer to close the deal. Here the QR Code would primarily be for a non-drummer buyer, one that has not yet downloaded the drummer app and become a buyer or a drummer. In operation of this embodiment, the buyer then tells the drummer that he wants to close the deal. The drummer may ask the buyer how he or she wants the deal delivered (i.e., via a text, email, scanning a QR Code, etc.) In either form of delivery, if the buyer has not yet downloaded the drummer app, the buyer is first prompted to download the app. Thus, if the user scans a QR Code, the user can be directed to an app download. Advantageously, this also allows the downloads of the drummer app to be associated with a drummer and a merchant and a deal. Similarly, if the buyer uses the deal and loves it, the buyer can forward it to his friends that are not drummers. The recipients can also then download the drummer app. This results in the buyer automatically becoming a drummer also.

It should also be appreciated that in a tiered sales force scenario, a conversion of a deal may be attributable to one or more drummers. For instance, a deal may be converted by a drummer that is the grandson of another drummer. Thus, in this scenario, the grandfather, father and child may all be drummers that are associated with the conversion. However, it is also anticipated that a drummer may be associated with more than one other drummer. As such, the QR code can be generated to include the identification of each drummer involved in the conversion of the deal. Further, in some embodiments, a merchant may generate a QR code for Drummer_A. Drummer_A may receive the QR code and generate a new QR code that includes the original QR code and adds in a next tiered drummer. This can be repeated for several layers of a networked sales force.

The main navigation, or a secondary level of navigation may include a variety of other actions typical to mobile apps and webapps. For instance, in the illustrated embodiment in FIG. 8, the secondary navigation 850 includes a Contact Us 851 screen, a Settings 852 screen, a FAQ 853 or about us screen, a Privacy 854 screen to present the merchants data privacy policies and a Terms and Conditions 855 screen.

Referring to FIG. 9, the general flow of the buyer app is illustrated. The buyer app 900, is user specific and thus, requires a user login 901 to grant access to the system by the buyer. The login access operates to ensure that buyer specific information is available and presented to the buyer logging into the system and, offers protection of the system and system data against adversarial forces.

Once the buyer has successfully entered login 901 credentials, the buyer is presented with the main navigation screens. The user can scroll between these screen by swiping his or her finger, actuating a navigation arrow or other indicia, using a pull down menu or the like. The main navigation screens are illustrated as including the following screens: Home screen 910, Notifications screen 911, QR Code Scanner screen 912, Offer Explorer screen 913, Saved Offers screen 914, Profile screen 915, Settings screen 916 and Switch to Drummer screen 917.

Figure 9B:
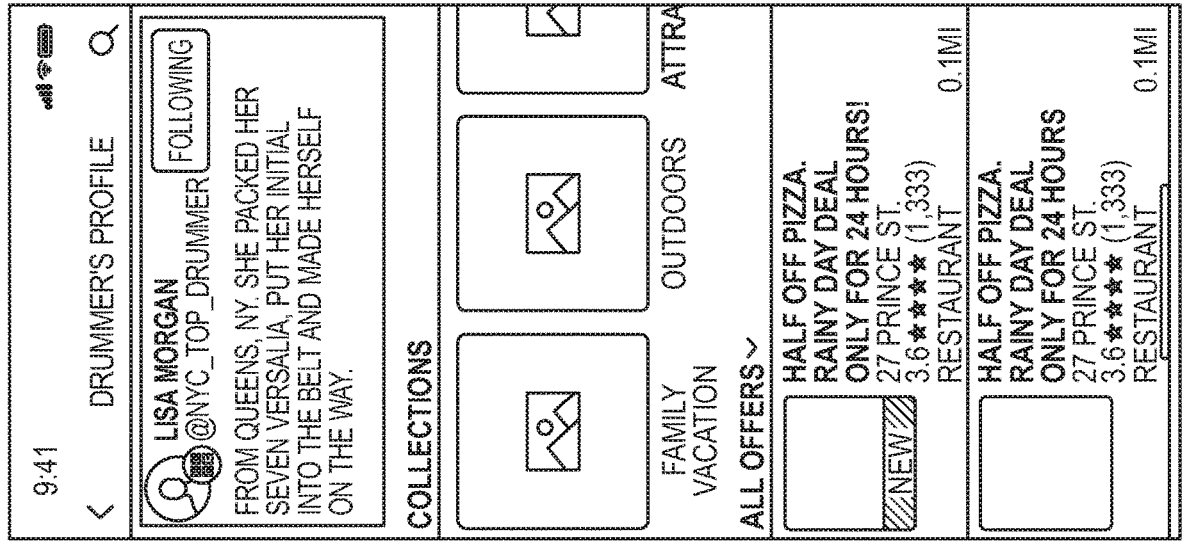
Figure 9A:
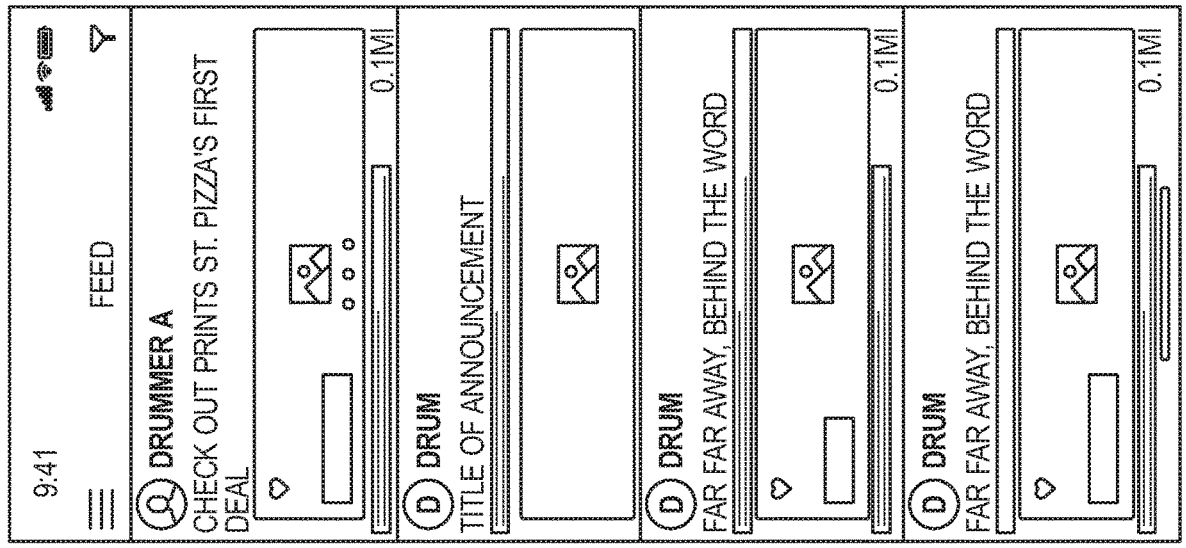

The Home screen 910 typically may include the feed of deals available for the buyer. As such, the buyer can scroll through the various deals that have been sent to him from one or more drummers and then select one to either convert or obtain more information. The Home screen 910 also includes a menu for accessing the other functions of the main navigation. FIG. 9A illustrates a non-limiting example of the feed portion of an exemplary Home screen 910. From the Home screen 910, the buyer may also transition to the Drummers I Follow screen 920. The Drummers I Follow screen 920 may list the drummers that the buyer follows for various reasons, such as the buyer likes the deals the drummer gets, just likes working with the particular drummer, etc. The Drummers I Follow screen 920 may simply provide thumbnails or a list of the drummers that are currently followed. In some embodiments, the Drummers I Follow screen 920 may include a tab or the ability to swipe to a list of drummers that are suggested that the buyer follow. The drummers could be selected by the system for a variety of reasons such as profile matches, commonality in deal types offered and converted, etc. For each of the drummers listed in the Drummers I Follow screen 920, the buyer may select one of the drummers to transition to the Drummer Profile screen 921.

Exemplary Drummer Profile screens 921 may provide personal information about the drummer, such as where the drummer is from, the drummer's record or statistics, type of deals that the drummer has available (i.e. collections) and specific offers that the dealer is promoting. For instance, the Drummer Profile screen 921 may include a section of thumbnails that the buyer can scroll through to see what the drummer is offering at this time. Also, the buyer may select one of the collections presented on the Drummer Profile screen 921 to transition to a Collection of Offers screen 931 that presents more detail about the offers within the collection. FIG. 9B is a non-limiting example of a Drummer Profile screen 921.

Figure 9D:
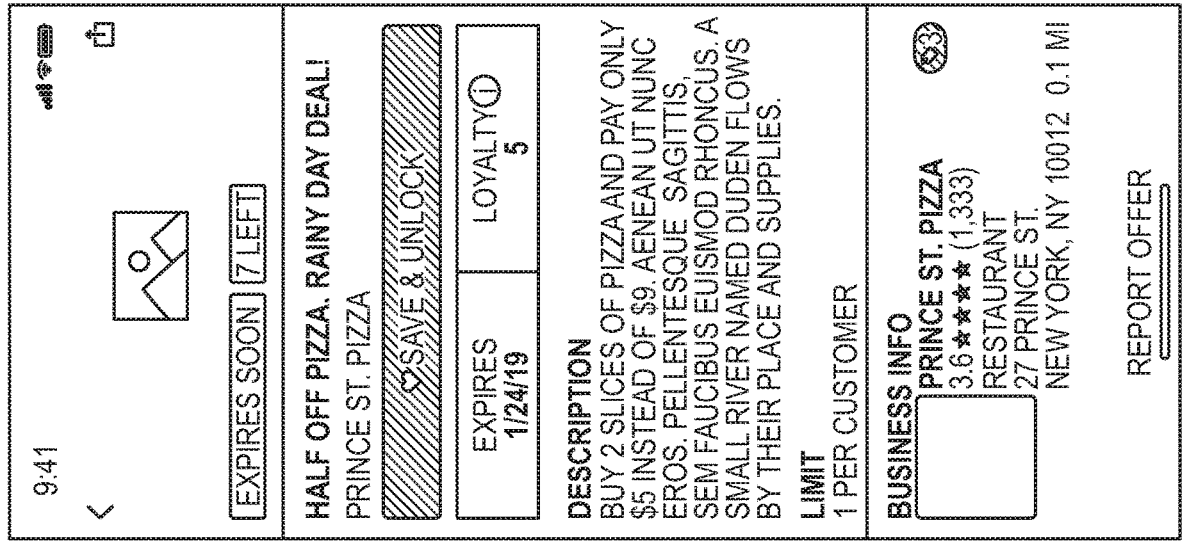
Figure 9C:
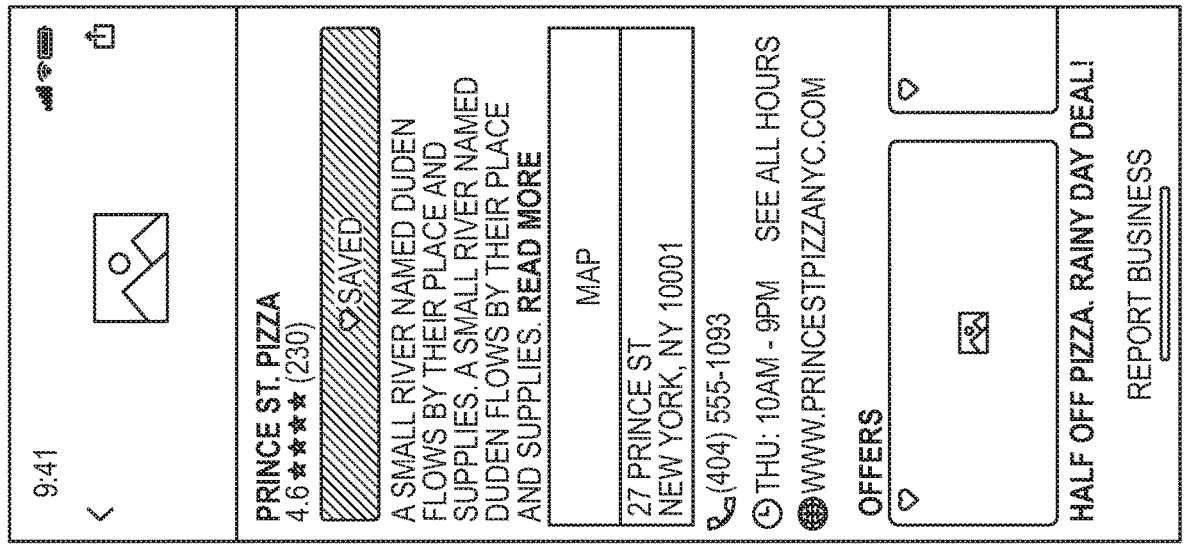

In addition to examining the Drummer Profile screen 921, the buyer may also transition to a Business Profile screen 922 to take a deeper dive on a business that is presenting an offer. Thus, from the Drummers I Follow screen 920, the Home screen 910, or any other screen that presents information about an offer, the buyer can actuate the merchant name, such as a hyper-link, to transition to the Business Profile screen 922. The Business Profile screen 922 can include information about the merchant, present feedback and ratings from other customers and present other offers that the merchant is pushing at the time. The buyer can mark the merchant as a favorite on the Business Profile screen 922 and initiate a communication with the merchant, such as by email, SMS, telephone, etc. The Business Profile screen 922 may also link to a mapping app to provide travel directions for the buyer. Further, the buyer can transition to a Rate Business screen 932 to enter information about the merchant and the quality of the redeemed offer. FIG. 9C illustrates a non-limiting example of a Business Profile screen 922.

Figure 9E:
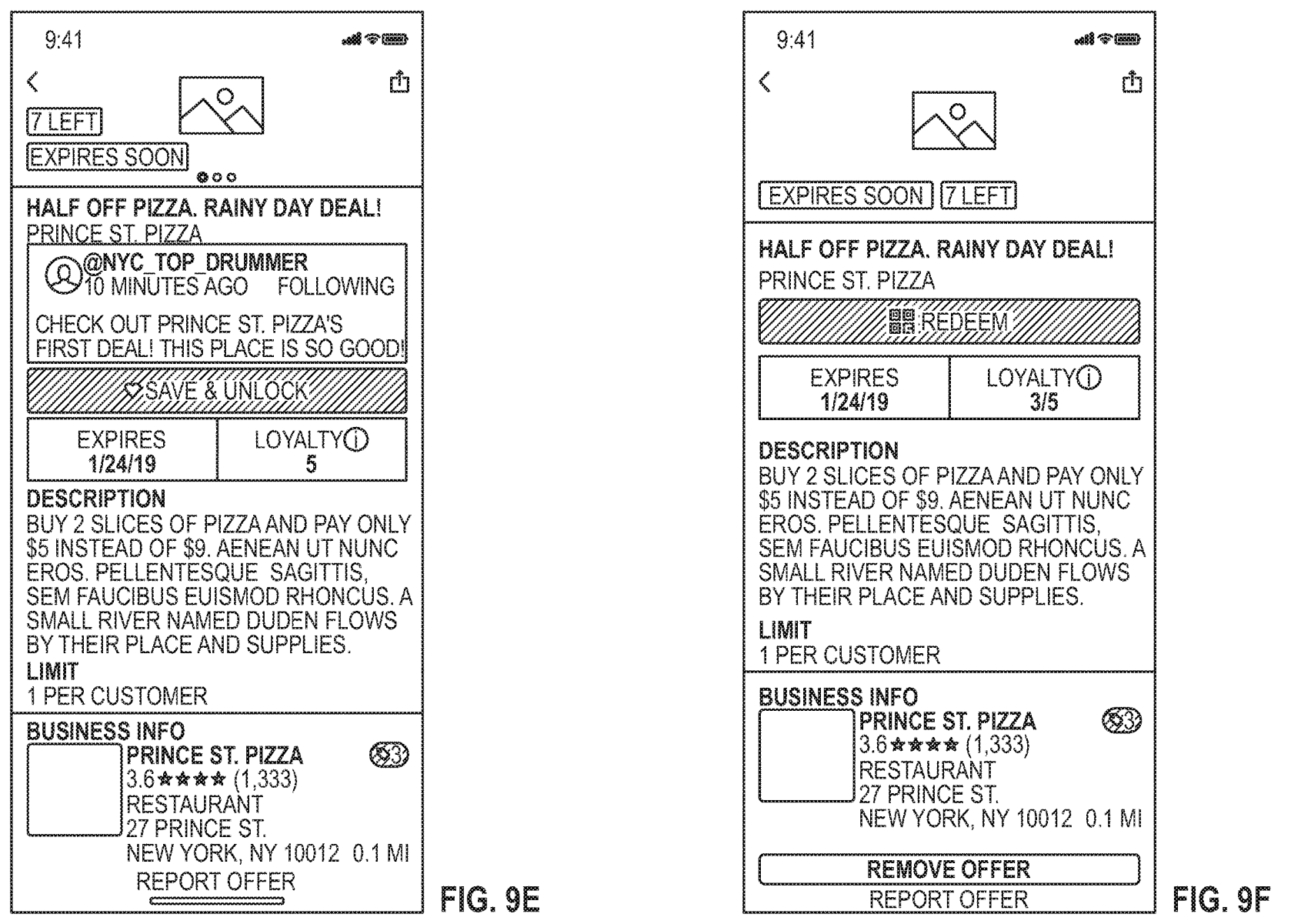

On any of the afore-mentioned screens and subsequently mentioned screens that present information about an offer, the buyer can select the offer to transition to an Offer Detail screen 923. The Offer Detail screen 923 presents detailed information about the offer to assist the buyer in making a decision. Typically, an Offer Detail screen 923 would include information about the offer, such has how many are left and when the offer expires; details related to the offer such as what is available and at what price; general information about the merchant, such as consumer ratings, location and contact information; and who the drummer is, if any, that is offering the deal. Depending on the screen the buyer was viewing before transitioning to the Offer Detail screen 923, the Offer Detail screen 923 may include different kinds and levels of information. For instance, if the buyer transitions to the Offer Detail screen 923 from a screen presenting offers, the Offer Detail screen 923 may include more information about the drummer than if the buyer transitioned from the Drummers I Follow screen 920. The various screens may also include a button to save the offer. FIG. 9D is a non-limiting example of an Offer Detail screen 923 at one level of detail and FIG. 9E is a non-limiting example at a different level of detail. When viewing the Offer Detail screen 923, the buyer may wish to tag or flag the offer as a favorite or one that the buyer may be interested in later or want to suggest to a friend. The buyer would then transition to the Flag Offer screen 933 where the particular offer can be flagged.

A Notifications screen 911 can be used to notify the buyer regarding the status of any deals that the buyer is following, such as the expiration of the deal, if the maximum number of conversions for a deal is being approached, etc. In addition, the Notifications screen 911 can inform the buyer of new deals, refunds for deals, deal conversion confirmations, etc. The buyer may also choose to have the notifications pushed to the Buyer App 900 or require the buyer to login to retrieve notifications. Further, the buyer can have the notifications forwarded to the buyer's resident SMS or texting app.

The Scanner screen 912 is activated when the buyer wants to scan a QR code to put a deal into the buyer's deal list. The Scanner screen 912 typically includes a window that is fed by the mobile devices camera. The buyer can orient the mobile device such that the QR Code is fully displayed within the window of the Scanner screen 912. At this point, some embodiments will automatically detect the presence of the QR code and scan it or, the user may actuate a trigger or button to scan the QR code. The deal associated with the QR code is then loaded into the buyers deal or offer list. Such deals may then appear in the buyer's feed on the Home screen 910 and/or the Saved Offers screen 914. In other embodiments, the QR code or other code can be sent to the buyer device and recognized by the buyer app, or a code can be manually input into the buyer app.

The main navigation may include a Saved screen 914, which may display a list or thumbnails of businesses and/or offers that the buyer has saved. The Saved screen 914 may include a list of an array of thumbnails identifying various levels of information about the saved offers. The buyer can select any of the offers to transition to the Saved Offers screen 924. At the Saved Offers screen 924, the buyer can view more detail about the offer as well as deciding to unlock, redeem or delete the offer. FIG. 9F is a non-limiting example of a Saved Offers screen 924. Likewise, the buyer can select a merchant that is affiliated with an offer presented on the Saved screen 914. Such an action would transition to the Saved Business Profile screen 925. At this screen, the buyer can view further detail information about the business similar to what is presented in Business Profile 922, with the exception that the user can select to remove the merchant from the saved list, or to prioritize the merchant as a most favored merchant.

The main navigation may also include a Profile screen 915 where the buyer can input or select particular information that specifically pertains to the buyer. Such information may include the buyer's interest, the buyer's dislikes, and other demographic information about the buyer. The Profile screen 915 may also include statistical information about the buyer, such as the number of offers that are being followed, the number of offers redeemed, the number of drummers being followed, etc. The main navigation may also include a Settings screen 916 where the buyer can perform general administrative functions such as changing passwords, putting in contact information, setting actions for notifications, reviewing the terms of service and privacy policy, sign out, etc.

Finally, the main navigation may include a screen or function to allow the buyer to switch from the buyer app to the drummer app. It should be appreciated that a drummer can also be a buyer and vice versa. As such, the Switch to Drummer screen 917 allows the buyer to automatically switch to the drummer app without having to log out and log back in to the drummer app.

Referring to FIG. 10, the general flow of the drummer app is illustrated. The drummer app 1000, is user specific and thus, requires a user login 1001 to grant access to the system by the drummer. The login access operates to ensure that drummer specific information is available and presented to the drummer logging into the system and, offers protection of the system and system data against adversarial forces.

Figure 10B:
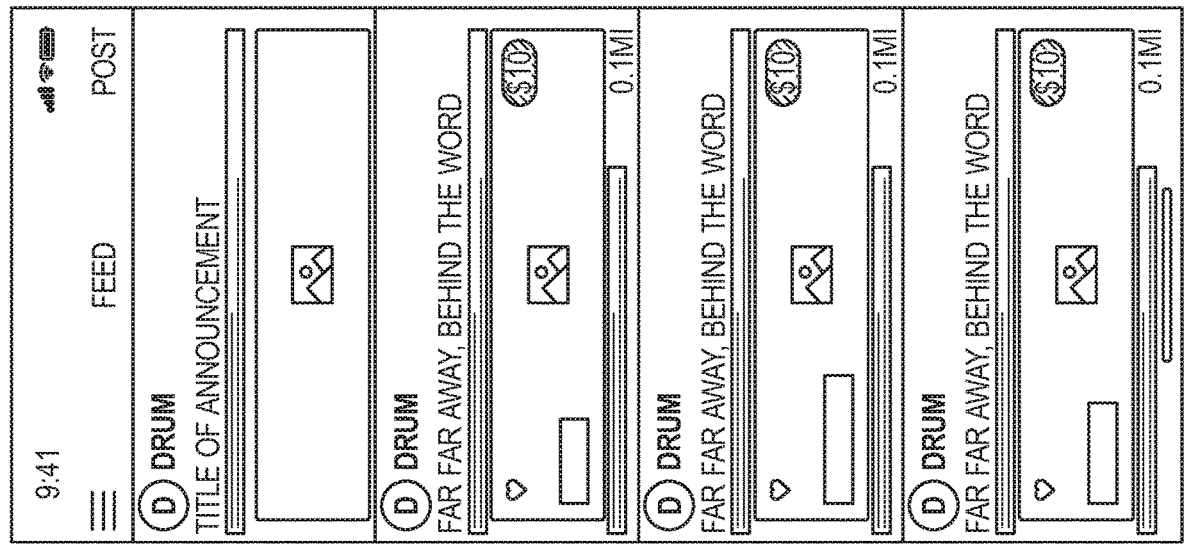
FIGS. 10A-10T are exemplary screens that could be displayed by the exemplary drummer application of FIG. 10.
Figure 10A:
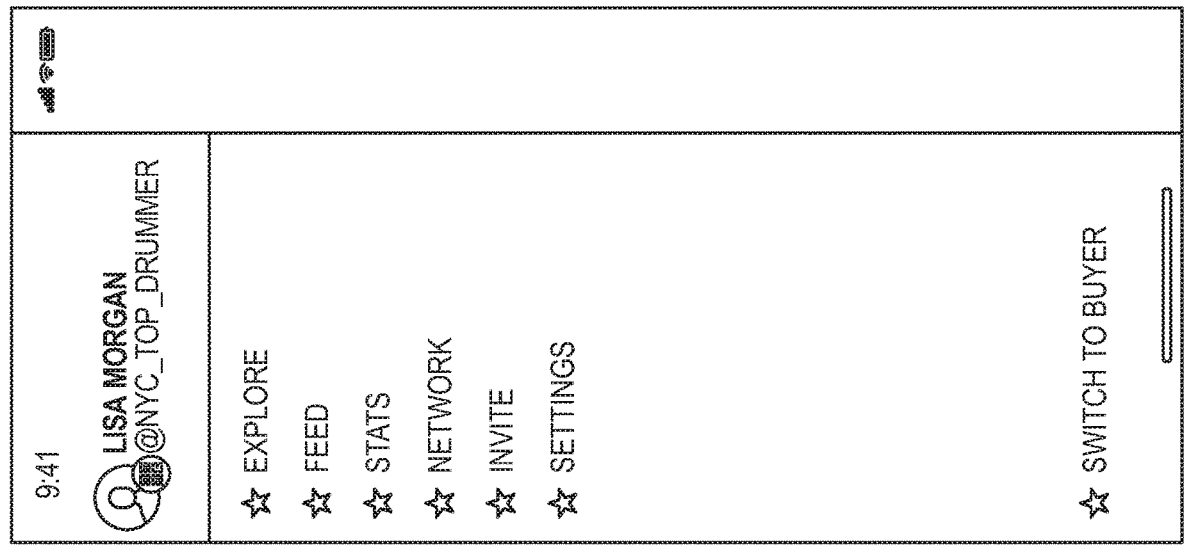
Figures 10C, 10D:
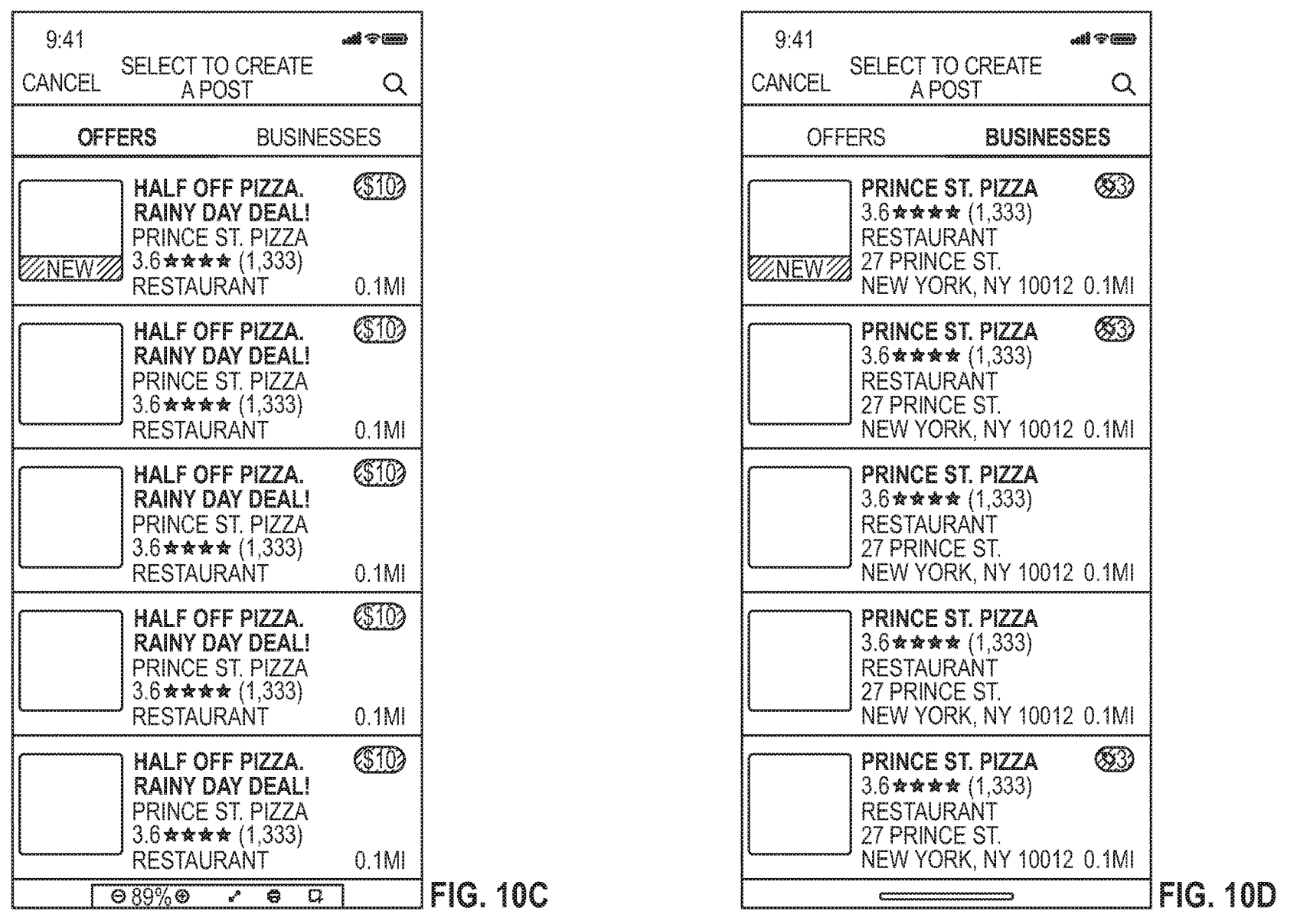
Figures 10E, 10F:
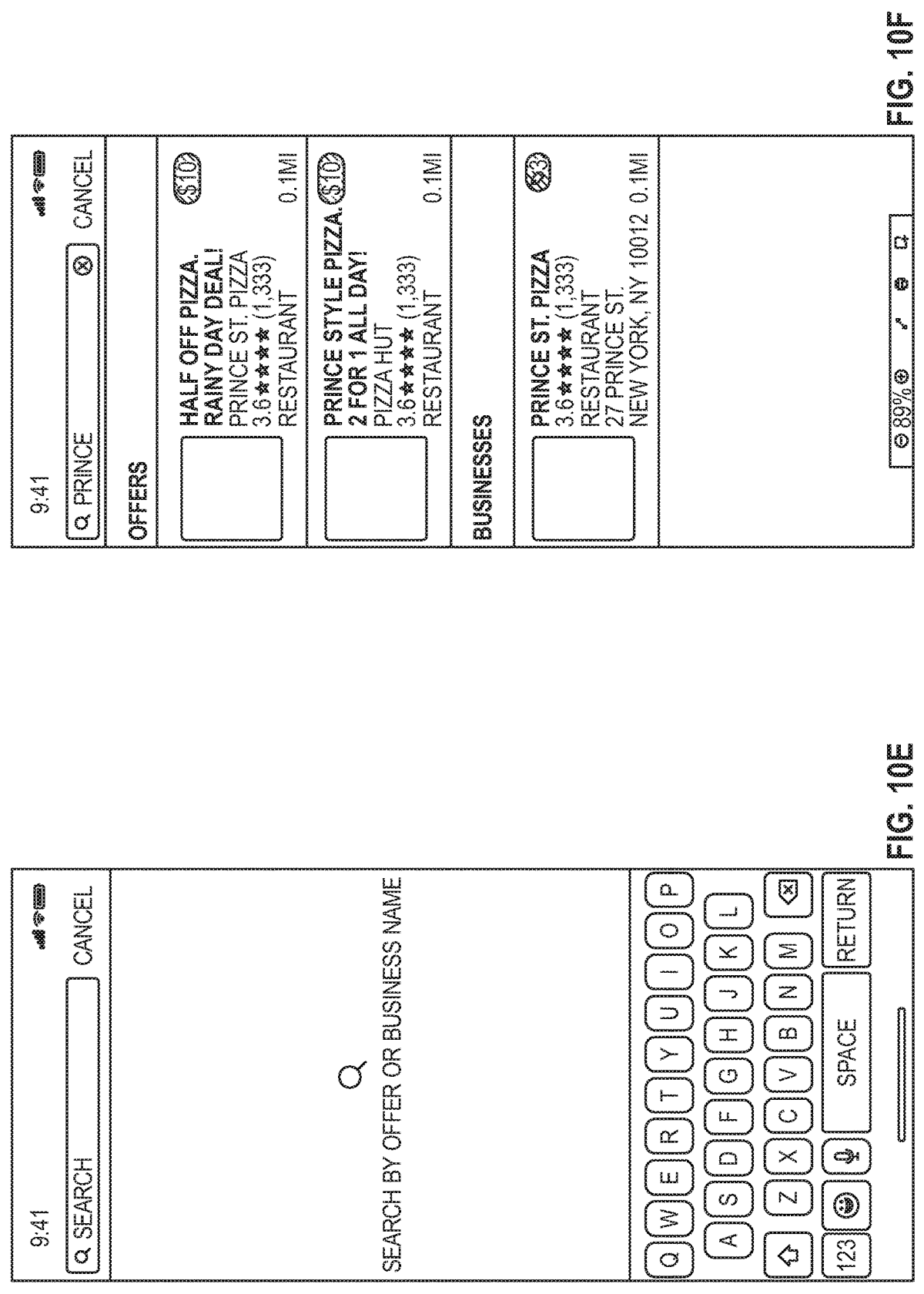
Figure 10H:
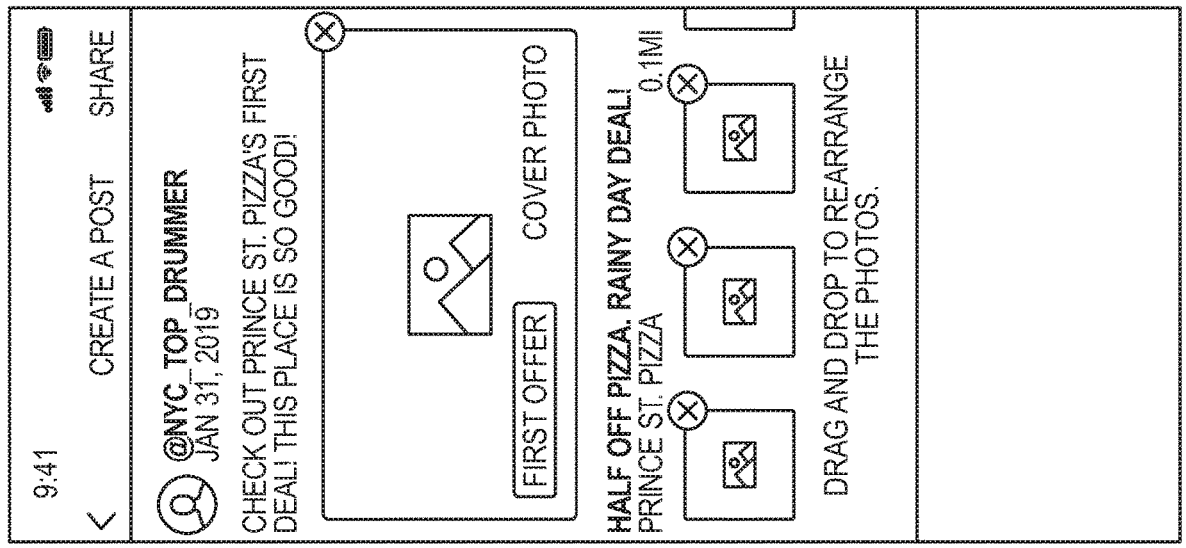
Figure 10G:
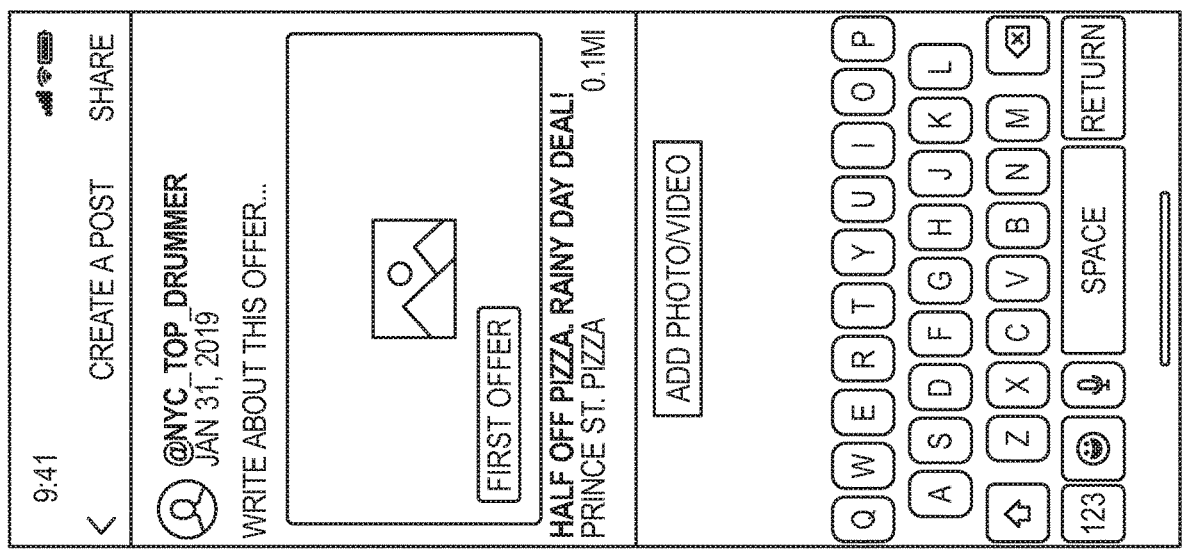

Once the drummer has successfully entered login 1001 credentials, the drummer may be presented with a main menu with links to the main navigation pages or, the drummer may simply be directed to one of the main navigation screens and the drummer can scroll between these screens by swiping his or her finger, actuating a navigation arrow or other indicium, using a pull down menu or the like. FIG. 10A is a non-limiting example of a main menu screen that presents buttons or links to the main navigation screens. The main navigation screens are illustrated as including the following screens: Feed screen 10, Home or Explore Deals screen 1011, Network screen 1012, Profile screen 1013, Stats screen 1014, Invite screen 1015, Settings screen 1016 and Switch to Buyer screen 1017.

The Feed screen 1010 presents the drummer with a list or array of deals that the drummer has available to share with buyers. The drummer can scroll through the list to view the deals or offers, select one to view in more detail, mark one or more as favorites, least favorites or deleted, and/or offer one to a buyer. FIG. 10B illustrates a non-limiting example of a Feed screen 1010. Some embodiments may also provide search and filtering of the feed. If the drummer wishes to present one of the offers, or post the offer, the drummer can actuate a post button after selecting a particular offer. If the drummer wishes to create a new offer to post, the drummer can active the post button without selecting an already created offer. Once selected, the drummer's mobile device transitions to a Create a Post screen sequence 1020.

An exemplary Create a Post screen 1020 presents one or more examples of offers that the drummer can select to build off of or, one or more businesses to select for creating the offer. The drummer may also be presented with a search button so that the drummer can search for specific words related to a desired offer or specific business names. After the search, the drummer app may display one or more offers and/or one or more businesses identified by the search criteria. The drummer can then be presented with an edit screen to enable the drummer to upload photos and create text to describe the offer, etc. Once the offer is completed, the drummer can select to share the offer. The drummer can share the offer with a single customer or class of customers, and/or share is publicly depending on the embodiment. FIGS. 10C-10H present non-limiting examples of screens that could be used in implementing the process of creating and/or posting an offer.

When an offer is shared, the drummer app may transition to the Flag screen 1030. In the Flag screen 1030, the offer can be flagged as having been shared or ready for sharing. Further, the drummer app may present sharing options to the drummer. The sharing options may include one or more drummer selectable methods including, but not limited to, sending a QR code, posting it to a website or online bulletin board, sending the offer as an SMS, a link, email or posting on a social media site.

Figures 10I, 10J:
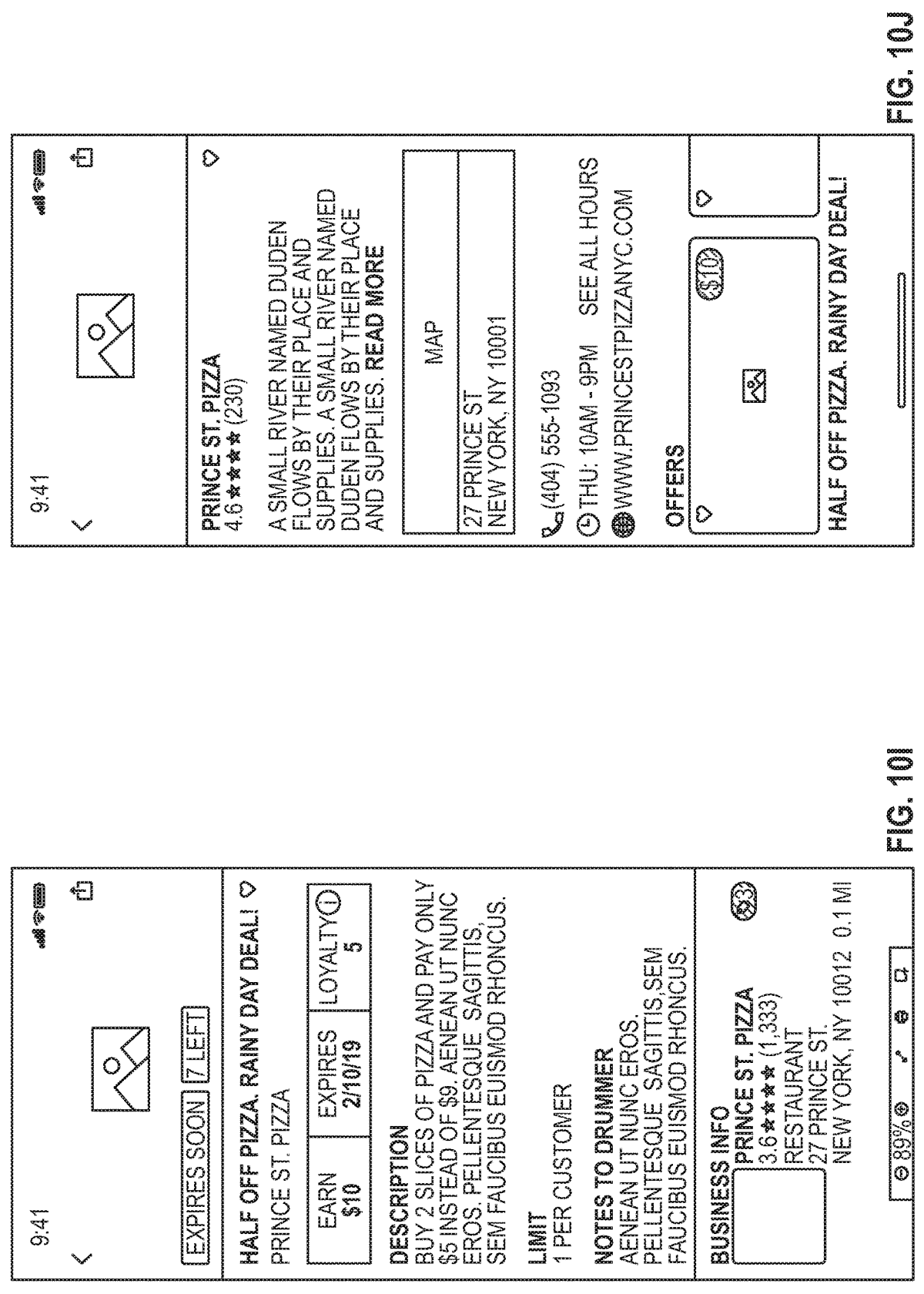

From the Feed screen 1010 the drummer may select an offer to examine more closely. In such a situation, the drummer app may transition to the Deal Detail screen 1021. An exemplary Deal Detail screen 1021 can include a graphic or photo related to the deal, and present further information pertaining to the deal. The presented information may include, but is not limited to, an indication of when the deal will expire, how many more conversions are available for the deal (i.e., maximum number of sales if any such limitation exists), a descriptive title, the name of the business associated with the offer, a detailed description of the offer, limitations of the offer such as the number of times a customer can accept the offer, information about the business associated with the offer, and information to be used by the drummer. The drummer information may include, but is not limited to, the amount of money the drummer will earn if the offer is converted, the expiration date of the offer, the loyalty points that will be earned by the drummer and further notes to simply assist the drummer in closing a deal. From the Deal Detail screen 1021 the drummer may also be able to share the deal. FIG. 10I is a non-limiting example of a Deal Detail screen 1021.

From the Feed screen 1010 the drummer may select a business or merchant to examine more closely. In such a situation, the drummer app may transition to the Business Detail screen 1031. An exemplary Business Detail screen 1031 can include one or more graphics or photographs related to the business, feedback ratings from customers regarding the business (such as comments and rankings), the address, telephone number, hours of operation and website of the business. FIG. 10J is a non-limiting example of a Business Detail screen 1031.

Figure 10K:
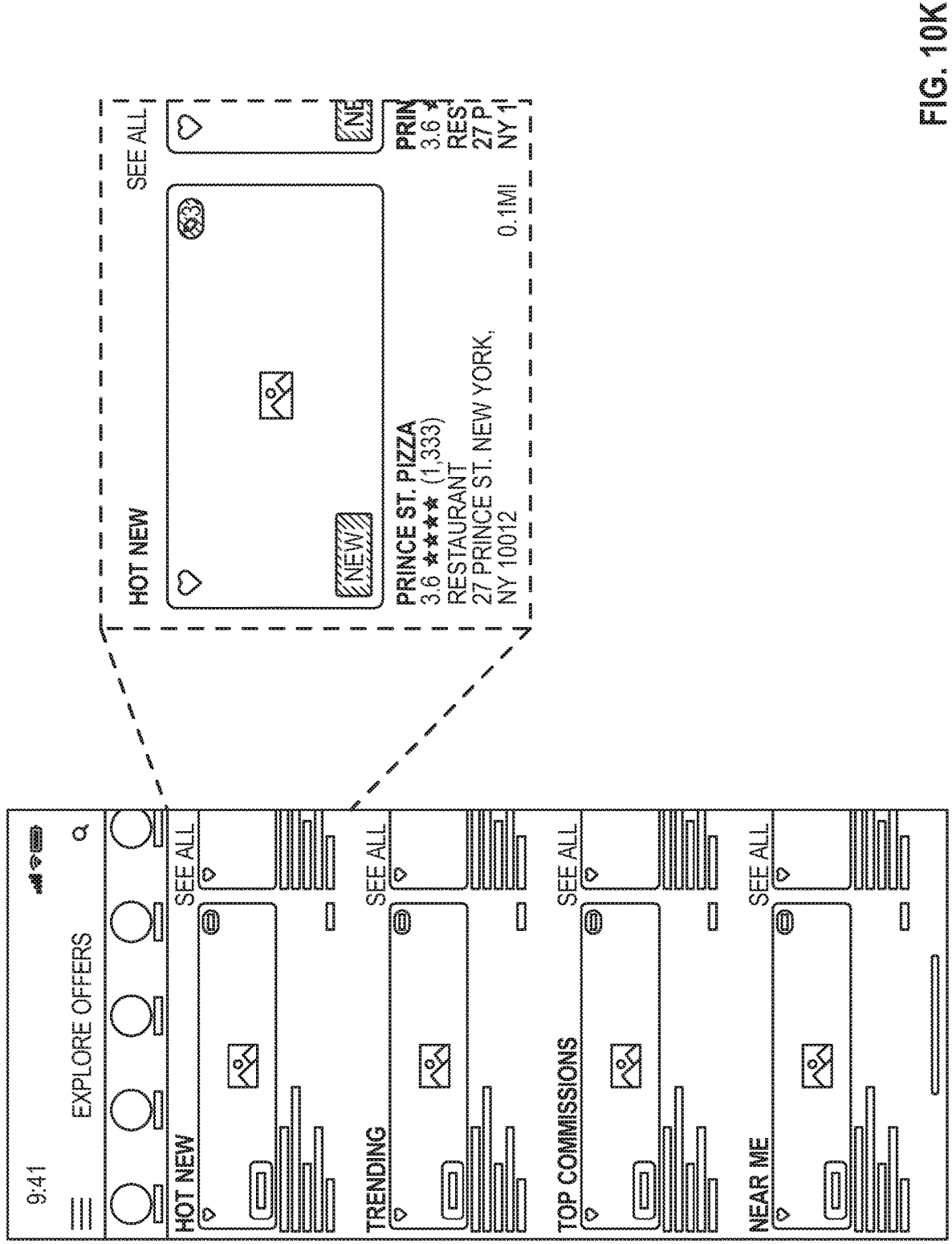
Figures 10L, 10M:
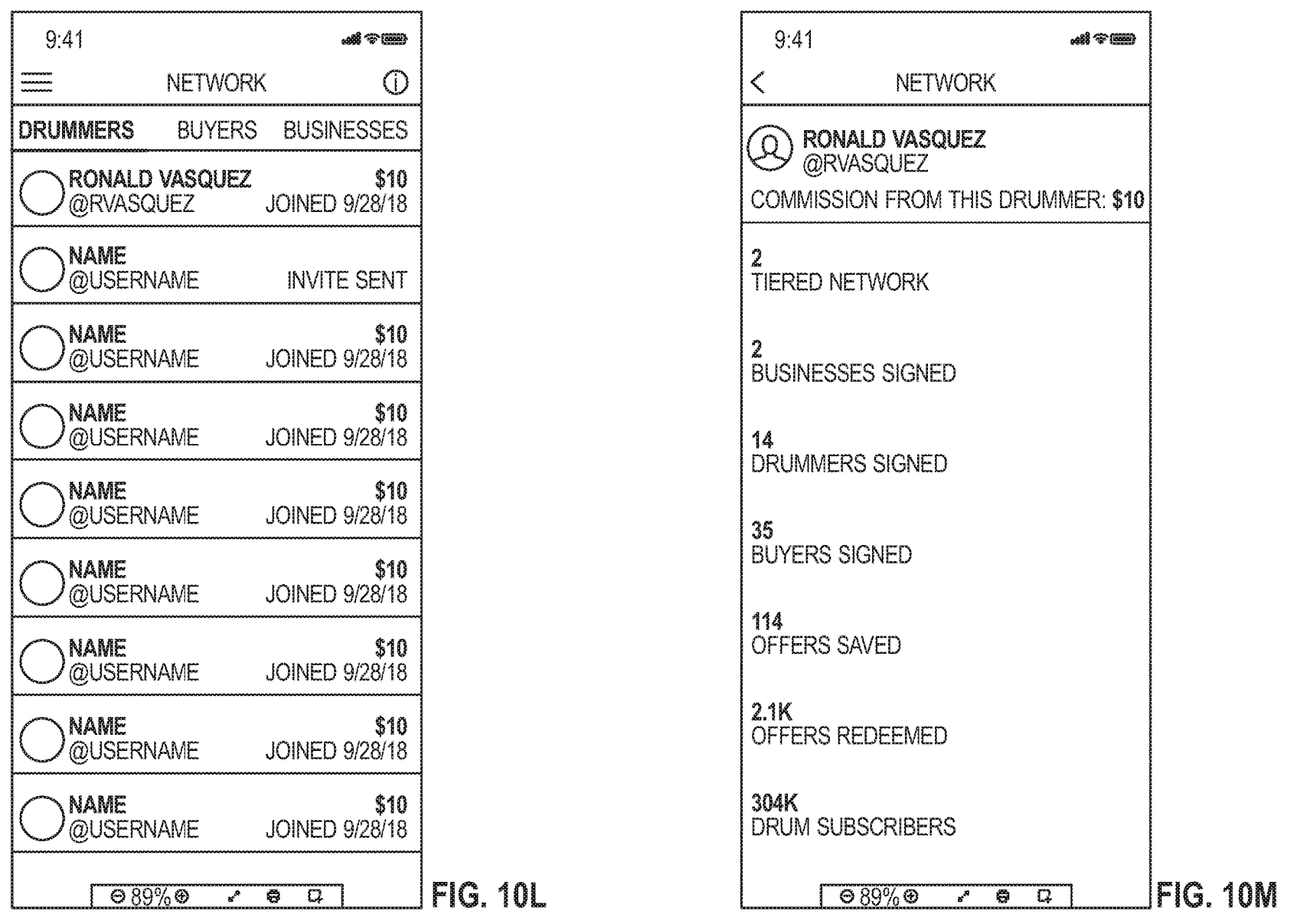
Figures 10N, 10O:
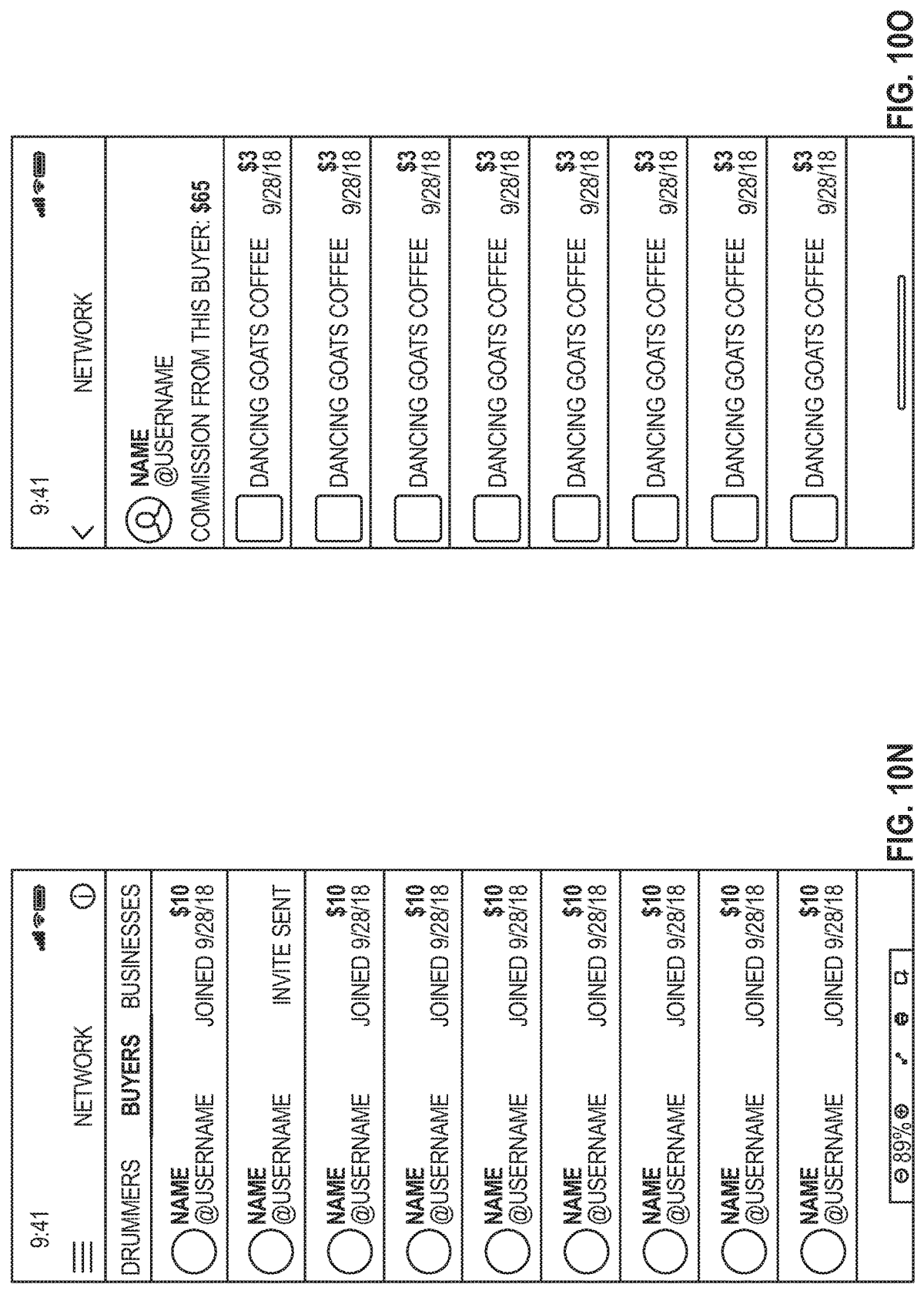
Figures 10P, 10Q:
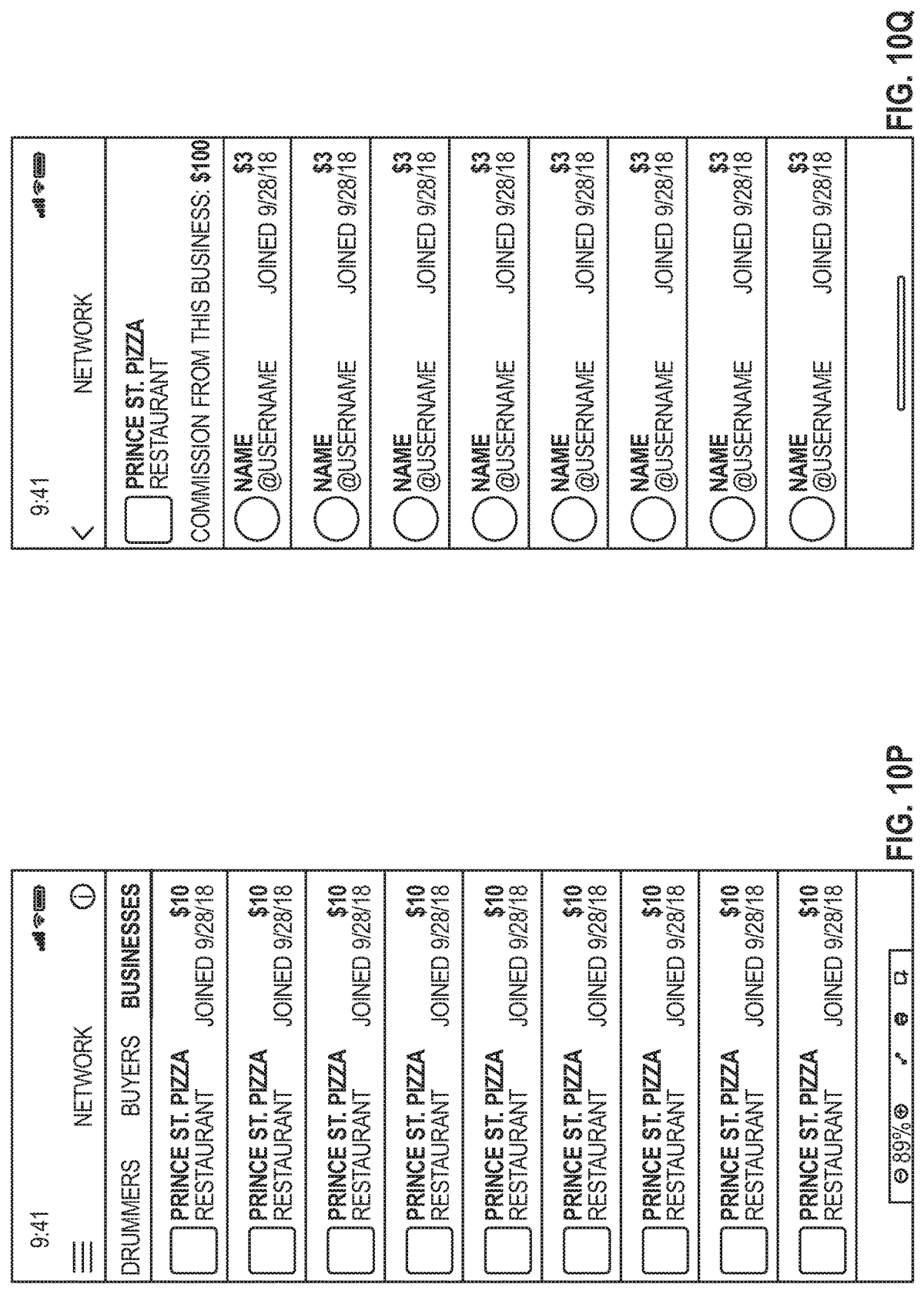

The Explore Deals or Home screen 1011 presents a list or array of offers that the drummer can peruse for potential posting or sharing. The drummer may be presented with filters to narrow in on the listed offers. For instance, the drummer could select to see all of the offers, offers related to personal services, offers related to retail, offers related to health and fitness, offers related to entertainment, as a few non-limiting examples. In addition, the offers may be sorted based on various categories. For instance, a grouping of "Hot and New" offers may be displayed, along with a group of Trending offers, Top Commissions, offers Near Me, etc. Each of the displayed offers may include a graphic or photograph related to the offer and further instructions regarding the business as well as the ability to create a new offer. FIG. 10K is a non-limiting example of an Explore Deals screen 1011.

From the Explore Deals screen 1011, similar to the Feed screen 1010, the drummer may select an offer to examine more closely. In such a situation, the drummer app may transition to the Deal Detail screen 1021. An exemplary Deal Detail screen 1021 can include a graphic or photo related to the deal, and present further information pertaining to the deal. The presented information may include, but is not limited to, an indication of when the deal will expire, how many more times are available for the deal to be offered (if any such limitation exists), a descriptive title, the name of the business associated with the offer, a detailed description of the offer, limitations of the offer such as the number of times a customer can accept the offer, information about the business associated with the offer, and information to be used by the drummer. The drummer information may include, but is not limited to, the amount of money the drummer will earn if the offer is converted, the expiration date of the offer, the loyalty points that will be earned by the drummer and further notes to simply assist the drummer in closing a deal. From the Deal Detail screen 1021 the drummer may also be able to share the deal. FIG. 10I is a non-limiting example of a Deal Detail screen 1021.

From the Explore Deals screen 1011, similar to the Feed screen 1010, the drummer may select a business or merchant to examine more closely. In such a situation, the drummer app may transition to the Business Detail screen 1031. An exemplary Business Detail screen 1031 can include one or more graphics or photographs related to the business, feedback ratings from customers regarding the business (such as comments and rankings), the address, telephone number, hours of operation and website of the business. FIG. 10J is a non-limiting example of a Business Detail screen 1031.

The Network screen 1012 may help a drummer to keep track of drummers, buyers and businesses that are associated with the drummer, as well as to track commissions earned from the other drummers, buyers and businesses that are in the drummer's network. An exemplary Network screen 1012 may allow the user to view each of the drummers, buyers and businesses in that drummer's network and to see a quick snapshot of the commissions received from each. In some embodiments, the Network screen 1012 may include a series of screens that the drummer can swipe between or the drummer app may allow the drummer to sort the network by category (such as drummers, buyers, businesses or performance levels, etc.). Further, the Network screen 1012 may allow the drummer to select one of the entities within the drummer's network to take a deeper dive. For instance, a deeper dive may allow a drummer to see that activity of another network drummer such as, but not limited to, the tiered network the network drummer is in or the tier within the drummers network that the network drummer resides, the businesses signed by the network drummer, the drummers signed by the network drummer, the buyers signed by the network drummer, offers that have been redeemed by the whole network and the total number of drum subscribers within the network or within the entire system. Similarly, the commission attributed to a particular buyer can also be examined in greater detail. For instance, a list of each of the purchases made by that buyer could be listed in chronological order or separated out by categories, and the amount of commission received for each transaction could be broken out. Also, similarly, the commission obtained from each business or merchant can be viewed in greater detail. For instance, each of the deals that have been promoted for a business can be listed with that commission and date associated with each such deal. Further, other deals that have not been pushed by the drummer and/or the drummer's network can be viewed to identify commission that was missed by the drummer. It will be appreciated that a wide variety of this type of information can be presented in a wide variety of manners. FIGS. 10L-10Q illustrate non-limiting examples of some screens that could be presented in the set of screens included in the Network screen 1012.

Figure 10S:
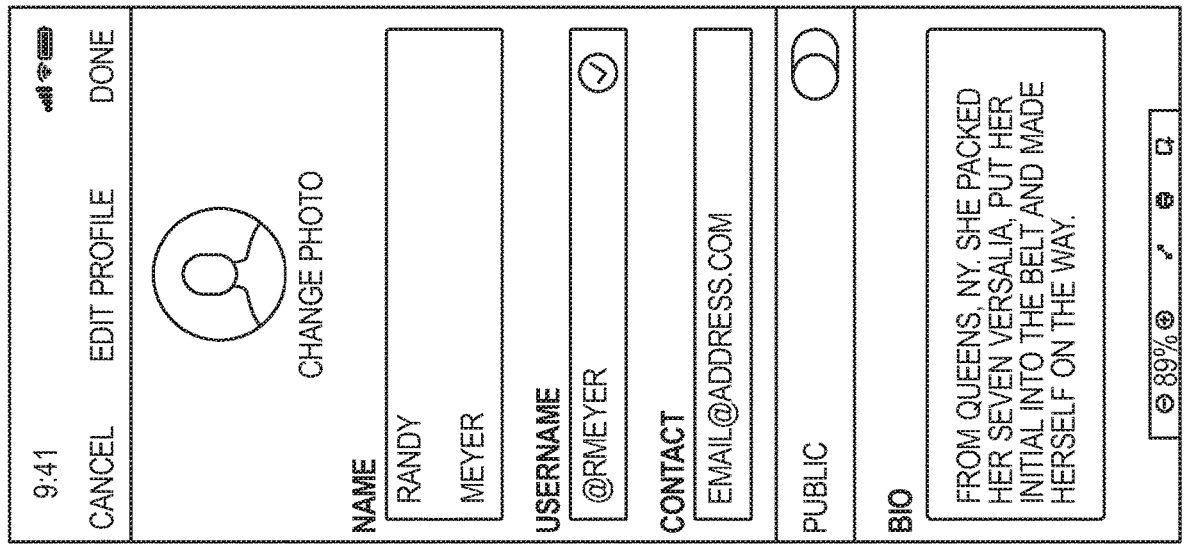
Figure 10R:
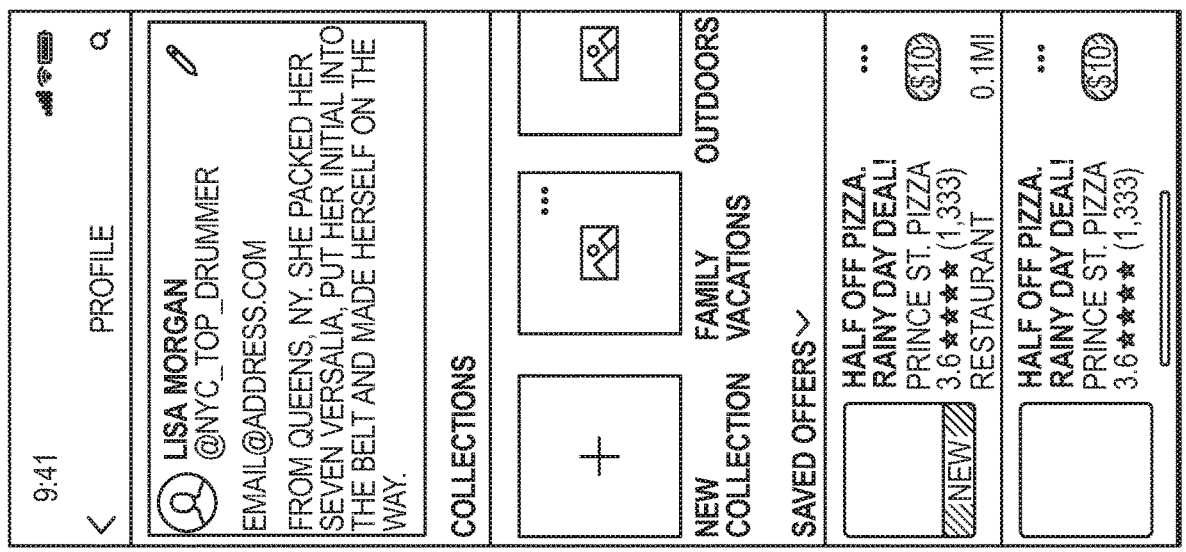

The Profile screen 1013 allows a drummer to input or select particular information that specifically pertains to the drummer. Such information may include the drummer's history, contact information, interests and other information including, but not limited to, collections, saved offers, etc. The profile screen 1013 may also include an edit feature to allow the drummer to update and/or change the information. FIGS. 10R-10S present non-limiting examples of the Profile screen 1013.

In some embodiments, the Profile screen 1013 may give the drummer access to a Create New Collection screen 1022 and/or Collection Detail screen 1023. This functionality of an exemplary drummer app enables the drummer to create a new collection of offers that can be more readily scanned by a buyer, can be offered up to a drummer in the drummer's network, etc. The drummer would have the ability to create, edit and view the collections.

Figure 10T:

The Stats screen 1014 allows a drummer to review his or her performance statistics. In exemplary embodiments, the Stats screen 1014 enables the drummer to look at the number of offers that have been saved, shared, and/or redeemed. The drummer may view the statistics for various time periods, such as today, last week, last month, last 6 months, last year, all or a custom range. The drummer may also view his or her own statistics or the statistics of drummers within the drummer's network or the drummer's entire network. Those skilled in the art will appreciate that additional information may also be presented in the Stats screen 1014. FIG. 10T is a non-limiting example of a Stats screen 1014.

The drummer app 1000 may include other screens such as an Invite screen 1015 and Setting screen 1016. The Invite screen 1015 may allow the drummer to send offers to buyers, send requests to merchants or businesses to solicit offers to be presented by the drummer, invitations to other drummers to share an offer or join a network, etc. In the Settings screen 1016 the drummer can set up various parameters of how the drummer app 1000 operates, such as enabling push notifications, updating contact information, gain access to the FAQ/Tutorials screen 1024, review the Terms of Service and Privacy Policy, provide feedback to the drummer system, etc. In addition, the drummer can enter, edit and/or delete banking information for which commissions received would be transferred.

The drummer app may also include the ability for the drummer to transfer money to other drummers, buyers or businesses through the drum app. The drummer may select an account to transfer the funds from, select a destination, and then initiate the transfer and receive confirmation once completed.

The Switch to Buyer or function allows the drummer to switch from the drummer app to the buyer app. It should be appreciated that a drummer can also be a buyer and vice versa. As such, the Switch to Buyer screen 1017 allows the drummer to automatically switch to the buyer app without having to log out and log back in to the system.

In the various embodiments, other screens are also anticipated for implementing various other features of the business app, buyer app and drummer app.

Certain steps in the processes or process flows described in this specification naturally precede others for the solution to function as described. However, the solution is not limited to the order of the steps described if such order or sequence does not alter the functionality of the solution. That is, it is recognized that some steps may performed before, after, or parallel (substantially simultaneously with) other steps without departing from the scope and spirit of the solution. In some instances, certain steps may be omitted or not performed without departing from the solution. Also, in some instances, multiple actions depicted and described as unique steps in the present disclosure may be comprised within a single step. Further, words such as "thereafter", "then", "next", "subsequently", etc. are not intended to limit the order of the steps. These words are simply used to guide the reader through the description of the exemplary method.

Additionally, one of ordinary skill in programming is able to write computer code or identify appropriate hardware and/or circuits to implement the disclosed solution without difficulty based on the flow charts and associated description in this specification, for example. Therefore, disclosure of a particular set of program code instructions or detailed hardware devices (such as a server) are not considered necessary for an adequate understanding of how to make and use the invention. The functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another.

A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A distributed system that operates to implement conversion services on behalf of a plurality of entities, the distributed system comprising:
   a deal defining system including an interface to receive a parameter definition of a plurality of deals associated with one or more entities;
   a mobile telephone running an application that operates as a drummer device communicatively coupled to the deal defining system over a network, wherein the drummer device is associated with a single particular drummer account that is associated with a single drummer entity, and the drummer device accesses the associated drummer account over the network;
   a plurality of distributed buyer devices, wherein each distributed buyer device is associated with a single consumer entity;
   a merchant personal computing device ("PCD"); and
   a settlement engine;
   wherein the drummer device, each of the distributed buyer devices and the deal defining system include a processor, a memory and a program,
   wherein the drummer device: (a) is associated with the single particular drummer account, (b) accesses the deal defining system, wherein the particular drummer entity can select any of the plurality of deals, (c) accesses a unique ID, wherein the unique ID is created by the deal defining system and uniquely identifies a particular deal that is being selected, a particular drummer entity associated with the distributed device being used to select the particular deal, at least one or more other drummer entities associated with the particular drummer entity, and a compensation sharing structure between the particular drummer entity and the at least one or more other drummer entities, wherein the compensation sharing structure establishes a tiered compensation schedule for the particular drummer entity and the at least one or more other drummer entities for sharing a portion of the revenue generated when a particular distributed buyer device is used to purchase the particular deal, and (d) share the unique ID with one or more distributed buyer devices; and
   wherein each of the plurality of distributed buyer devices: (a) receives one or more unique IDs, and (b) presents the one or more unique IDs to the merchant PCD;
   the merchant PCD receives the unique ID from the particular distributed buyer device and transmits the unique ID to the settlement engine;
   the settlement engine including a second processor, a second memory and a second program that when executed by the respective second processor receives the unique ID as a conversion notification indicating that a buyer has utilized the unique ID to convert the deal, the settlement engine responds to the reception of the conversion notification by:
   converting the deal;
   extracting from the buyer a conversion value required for converting the deal; and
   directing a compensation value to the particular drummer entity associated with the unique ID and the at least one or more other drummer entities associated with the particular drummer entity in accordance with the compensation sharing structure.

2. The distributed system of claim 1, further comprising a control engine, which includes a control processor, a control memory and a control program that when executed by the respective control processor provides a control interface to enter parameters that define a marketing effort for the entity, the parameters comprising: the geographic region to target, the number of drummers for each geographic region and the demographics of customers.

3. The distributed system of claim 1, wherein the deal defining engine receives a parameter definition of one or more benefits on behalf of an entity by receiving a description of the benefit, a consumer cost for the benefit, and a conversion share for the drummer.

4. The distributed system of claim 1, further comprising a monitoring engine, wherein the monitoring engine comprises an interface to the drummer device that conveys information pertaining to the compensation value received for the particular drummer when the drummer device access the monitoring engine.

5. The distributed system of claim 1, further comprising a monitoring engine, wherein the monitoring engine comprises a user interface that conveys information pertaining to activity related to the benefits.

6. The distributed system of claim 1, further comprising a monitoring engine, wherein the monitoring engine comprises an interface that conveys statistics related to the activity of each of the benefits for an entity, comprising a number of shares, a number of conversions, and demographics of the customers.

7. The distributed system of claim 1, wherein the drummer device shares the unique ID by transmitting it to any of the plurality of distributed buyer devices.

8. The distributed system of claim 1, wherein the drummer device shares the unique ID by displaying the unique ID on a display of the drummer device for scanning by any of the plurality of distributed buyer devices.

9. The distributed system of claim 2 further comprising a monitoring engine, wherein the monitoring engine comprises an interface to the drummer device that conveys information pertaining to the compensation value received for the particular drummer entity when the drummer device accesses the monitoring engine, wherein the drummer entities and consumer entities gain access to the functions of the distributed system.

10. The distributed system of claim 9, wherein the deal defining engine, the settlement engine, the control engine and the monitoring engine are at least partially embodied on a network accessible server.

* * * * *